United States Patent
Bito et al.

(10) Patent No.: US 7,656,589 B2
(45) Date of Patent: Feb. 2, 2010

(54) ZOOM LENS SYSTEM, IMAGING DEVICE AND CAMERA

(75) Inventors: Takakazu Bito, Osaka (JP); Keiki Yoshitsugu, Hyogo (JP); Shinji Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 5 days.

(21) Appl. No.: 12/017,548

(22) Filed: Jan. 22, 2008

(65) Prior Publication Data

US 2008/0252992 A1  Oct. 16, 2008

(30) Foreign Application Priority Data

Jan. 22, 2007 (JP) ............... 2007-011844
Jan. 22, 2007 (JP) ............... 2007-011845
Jan. 22, 2007 (JP) ............... 2007-011846

(51) Int. Cl.
   *G02B 15/14* (2006.01)
(52) U.S. Cl. ...................... 359/683; 359/676
(58) Field of Classification Search ............. 359/554, 359/557, 676, 683, 686, 687
See application file for complete search history.

(56) References Cited

U.S. PATENT DOCUMENTS

| | | | |
|---|---|---|---|
| 6,404,561 B1 | 6/2002 | Isono et al. | |
| 7,336,426 B2 * | 2/2008 | Nakatani et al. | ............ 359/683 |
| 7,342,730 B2 * | 3/2008 | Yoneyama | ............... 359/763 |

FOREIGN PATENT DOCUMENTS

| | | |
|---|---|---|
| JP | 2001-194590 | 7/2001 |
| JP | 2005-017915 | 1/2005 |
| JP | 2006-113453 | 4/2006 |

* cited by examiner

*Primary Examiner*—David N Spector
(74) *Attorney, Agent, or Firm*—McDermott Will & Emery LLP

(57) ABSTRACT

An object is to provide: a zoom lens system that has a reduced overall length, a high resolution, and a variable magnification ratio as high as 9 or greater and that is satisfactorily adaptable for wide-angle image taking where the view angle at a wide-angle limit is 70° or greater; an imaging device employing this zoom lens system; and a thin and compact camera. The zoom lens system has a plurality of lens units each consisting of at least one lens element, and, in order from the object side to the image side, comprises a first lens unit having positive optical power, a second lens unit having negative optical power, a third lens unit having positive optical power, a fourth lens unit and a fifth lens unit. In zooming from a wide-angle limit to a telephoto limit at the time of image taking, at least the first lens unit and the second lens unit move in an optical axis direction, while the fourth lens unit and the fifth lens unit each consists of one lens element. An imaging device and a camera employ this zoom lens system.

46 Claims, 48 Drawing Sheets

ZOOM LENS SYSTEM, IMAGING DEVICE AND CAMERA

BACKGROUND OF THE INVENTION

1. Field of the Invention

The present invention relates to a zoom lens system, an imaging device and a camera. In particular, the present invention relates to: a zoom lens system that has a reduced overall length, a high resolution, and a variable magnification ratio as high as 9 or greater and that is satisfactorily adaptable for wide-angle image taking where the view angle at a wide-angle limit is 70° or greater; an imaging device employing this zoom lens system; and a thin and compact camera employing this imaging device.

2. Description of the Background Art

With recent progress in the development of solid-state image sensors such as a CCD (Charge Coupled Device) and a CMOS (Complementary Metal-Oxide Semiconductor) having a high pixel, digital still cameras and digital video cameras are rapidly spreading that employ an imaging device including an imaging optical system of high optical performance corresponding to the above-mentioned solid-state image sensors of a high pixel.

Among these, various zoom lens systems have been proposed that can realize a compact type camera provided with, in addition to a high resolution, a zoom function of high magnification such as a variable magnification ratio as high as approximately 9 or greater.

For example, Japanese Laid-Open Patent Publication No. 2006-113453 discloses a zoom lens that, in order from the object side to the image side, comprises three lens units of positive, negative and positive, and further a subsequent lens unit, wherein intervals between the individual lens units vary such that the interval between the first lens unit and the second lens unit increases and the interval between the second lens unit and the third lens unit decreases at a telephoto limit in comparison with a wide-angle limit, and wherein a negative lens where the Abbe number and the partial dispersion ratio satisfy a particular relation is included in the third lens unit. In this zoom lens disclosed in Japanese Laid-Open Patent Publication No. 2006-113453, chromatic aberration is compensated satisfactory in a wide zoom range, so that high optical performance is obtained.

Further, Japanese Laid-Open Patent Publication No. 2005-017915 discloses a zoom lens that, in order from the object side to the image side, comprises five lens units of positive, negative, positive, positive and positive, wherein intervals between the individual lens units vary such that at least the interval between the first lens unit and the second lens unit increases while the interval between the third lens unit and the second lens unit decreases and the interval between the fourth lens unit and the third lens unit decreases during magnification change from a wide-angle limit to a telephoto limit, and wherein the interval at a wide-angle limit and the interval at a telephoto limit between the third lens unit and the fourth lens satisfy a particular relation. This zoom lens disclosed in Japanese Laid-Open Patent Publication No. 2005-017915 has a high variable magnification ratio, a high brightness, a small number of lenses, a low price, and compactness.

Moreover, Japanese Laid-Open Patent Publication No. 2001-194590 discloses an imaging lens device provided with: a zoom lens that, in order from the object side to the image side, comprises two lens units of positive and negative and further a subsequent lens unit, wherein during magnification change from a wide-angle limit to a telephoto limit, the second lens unit moves such as to be always located on the image side relative to a position at a wide-angle limit, wherein the first lens unit consists of three or fewer lenses, in total, including at least one negative lens and at least one positive lens, and wherein at least one positive lens in the first lens unit has particular refractive index and Abbe number; and an image sensor. This zoom lens disclosed in Japanese Laid-Open Patent Publication No. 2001-194590 has high performance, and has a reduced size and a high variable magnification simultaneously.

Nevertheless, although the zoom lens disclosed in Japanese Laid-Open Patent Publication No. 2006-113453 has high optical performance and simultaneously a high magnification zoom function such as a variable magnification ratio of approximately 9 to 10 or the like, this zoom lens does not have a configuration applicable to wide-angle image taking where the view angle at a wide-angle limit is, for example, 70° or greater.

Further, the two zoom lenses disclosed in Japanese Laid-Open Patent Publication No. 2005-017915 and Japanese Laid-Open Patent Publication No. 2001-194590 also have a high magnification zoom function and simultaneously a reduced size, but do not have a configuration satisfactorily suitable for wide-angle image taking where the view angle at a wide-angle limit is, for example, 70° or greater.

SUMMARY OF THE INVENTION

An object of the present invention is to provide: a zoom lens system that has a reduced overall length, a high resolution, and a variable magnification ratio as high as 9 or greater and that is satisfactorily adaptable for wide-angle image taking where the view angle at a wide-angle limit is 70° or greater; an imaging device employing this zoom lens system; and a compact camera employing this imaging device.

(I) The above-mentioned object is achieved by a zoom lens system, an imaging device and a camera described below. That is, the present invention relates to:

a zoom lens system comprising a plurality of lens units each consisting of at least one lens element, wherein the zoom lens system, in order from the object side to the image side, comprises: a first lens unit having positive optical power; a second lens unit having negative optical power; a third lens unit having positive optical power; a fourth lens unit; and a fifth lens unit, wherein in zooming from a wide-angle limit to a telephoto limit at the time of image taking, at least the first lens unit and the second lens unit move in an optical axis direction, and wherein the fourth lens unit and the fifth lens unit each consists of one lens element;

an imaging device capable of outputting an optical image of an object as an electric image signal, comprising a zoom lens system that forms the optical image of the object and an image sensor that converts the optical image formed by the zoom lens system into the electric image signal, wherein in the zoom lens system, a plurality of lens units each consisting of at least one lens element are provided, wherein the zoom lens system, in order from the object side to the image side, comprises: a first lens unit having positive optical power; a second lens unit having negative optical power; a third lens unit having positive optical power; a fourth lens unit; and a fifth lens unit, wherein in zooming from a wide-angle limit to a telephoto limit at the time of image taking, at least the first lens unit and the second lens unit move in an optical axis direction, and wherein the fourth lens unit and the fifth lens unit each consists of one lens element; and a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, a plurality of lens units each composed of at least one lens element are provided, wherein the zoom lens system, in order from the object side to the image side, comprises: a first lens unit having positive optical power; a second lens unit having negative optical power; a third lens unit having positive optical power; a fourth lens unit; and a fifth lens unit, wherein in zooming from a wide-angle limit to a telephoto limit at the time of image taking, at least the first lens unit and the second lens unit move in an optical axis direction, and wherein the fourth lens unit and the fifth lens unit each consists of one lens element.

The above-mentioned object is achieved by a zoom lens system, an imaging device and a camera described below. That is, the present invention relates to:

a zoom lens system comprising a plurality of lens units each consisting of at least one lens element, wherein the zoom lens system, in order from the object side to the image side, comprises at least: a first lens unit having positive optical power; a second lens unit having negative optical power; a third lens unit having positive optical power; and a fourth lens unit having positive optical power, wherein in zooming from a wide-angle limit to a telephoto limit at the time of image taking, the first lens unit, the second lens unit, the third lens unit and the fourth lens unit move in an optical axis direction, and wherein the following condition (II-1) is satisfied:

$$3.0 < D_{a11}/(f_W \times \tan \omega_W) < 8.0 \quad \text{(II-1)}$$

(here, $9.0 < f_T/f_W < 13.0$ and $35 < \omega_W$)

where, $D_{a11}$ is an optical axial total thickness of the lens units consisting of the first lens unit, the second lens unit, the third lens unit and the fourth lens unit, $f_W$ is a focal length of the entire system at a wide-angle limit, $f_T$ is a focal length of the entire system at a telephoto limit, and $\omega_W$ is an incident half view angle at a wide-angle limit;

an imaging device capable of outputting an optical image of an object as an electric image signal, comprising a zoom lens system that forms the optical image of the object and an image sensor that converts the optical image formed by the zoom lens system into the electric image signal, wherein in the zoom lens system, a plurality of lens units each consisting of at least one lens element are provided, wherein the zoom lens system, in order from the object side to the image side, comprises at least: a first lens unit having positive optical power; a second lens unit having negative optical power; a third lens unit having positive optical power; and a fourth lens unit having positive optical power, wherein in zooming from a wide-angle limit to a telephoto limit at the time of image taking, the first lens unit, the second lens unit, the third lens unit and the fourth lens unit move in an optical axis direction, and wherein the following condition (II-1) is satisfied:

$$3.0 < D_{a11}/(f_W \times \tan \omega_W) < 8.0 \quad \text{(II-1)}$$

(here, $9.0 < f_T/f_W < 13.0$ and $35 < \omega_W$)

where, $D_{a11}$ an optical axial total thickness of the lens units consisting of the first lens unit, the second lens unit, the third lens unit and the fourth lens unit, $f_W$ is a focal length of the entire system at a wide-angle limit, $f_T$ is a focal length of the entire system at a telephoto limit, and $\omega_W$ is an incident half view angle at a wide-angle limit; and a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, a plurality of lens units each consisting of at least one lens element are provided, wherein the zoom lens system, in order from the object side to the image side, comprises at least: a first lens unit having positive optical power; a second lens unit having negative optical power; a third lens unit having positive optical power; and a fourth lens unit having positive optical power, wherein in zooming from a wide-angle limit to a telephoto limit at the time of image taking, the first lens unit, the second lens unit, the third lens unit and the fourth lens unit move in an optical axis direction, and wherein the following condition (II-1) is satisfied:

$$3.0 < D_{a11}/(f_W \times \tan \omega_W) < 8.0 \quad \text{(II-1)}$$

(here, $9.0 < f_T/f_W < 13.0$ and $35 < \omega_W$)

where, $D_{a11}$ is an optical axial total thickness of the lens units consisting of the first lens unit, the second lens unit, the third lens unit and the fourth lens unit, $f_W$ is a focal length of the entire system at a wide-angle limit, $f_T$ is a focal length of the entire system at a telephoto limit, and $\omega_W$ is an incident half view angle at a wide-angle limit.

(III) The above-mentioned object is achieved by a zoom lens system, an imaging device and a camera described below. That is, the present invention relates to:

a zoom lens system comprising a plurality of lens units each consisting of at least one lens element, wherein the zoom lens system, in order from the object side to the image side, comprises: a first lens unit having positive optical power; a second lens unit having negative optical power; a third lens unit having positive optical power;

and a subsequent lens unit including at least one lens unit having positive optical power, wherein in zooming from a wide-angle limit to a telephoto limit at the time of image taking, at least the first lens unit, the second lens unit and the third lens unit move in an optical axis direction while the second lens unit moves such that a position at a wide-angle limit is located on the object side relative to a position at a telephoto limit, and wherein the following conditions (III-1) and (III-2) are satisfied:

$$1.0 < f_W \cdot f_3/(f_W \times \tan \omega_W)^2 < 5.0 \quad \text{(III-1)}$$

$$0.1 < f_3/f_T < 0.4 \quad \text{(III-2)}$$

(here, $z=f_T/f_W>9.0$)
where,
$f_3$ is a composite focal length of the third lens unit,
$f_W$ is a focal length of the entire system at a wide-angle limit,
$f_T$ is a focal length of the entire system at a telephoto limit, and
$\omega_W$ is an incident half view angle at a wide-angle limit;

an imaging device capable of outputting an optical image of an object as an electric image signal, comprising a zoom lens system that forms the optical image of the object and an image sensor that converts the optical image formed by the zoom lens system into the electric image signal, wherein in the zoom lens system, a plurality of lens units each consisting of at least one lens element are provided, wherein the zoom lens system, in order from the object side to the image side, comprises: a first lens unit having positive optical power; a second lens unit having negative optical power; a third lens unit having positive optical power; and a subsequent lens unit including at least one lens unit having positive optical power, wherein in zooming from a wide-angle limit to a telephoto limit at the time of image taking, at least the first lens unit, the second lens unit and the third lens unit move in an optical axis direction while the second lens unit moves such that a position at a wide-angle limit is located on the object side relative to a position at a telephoto limit, and wherein the following conditions (III-1) and (III-2) are satisfied:

$$1.0 < f_W \cdot f_3/(f_W \times \tan \omega_W)^2 < 5.0 \quad \text{(III-1)}$$

$$0.1 < f_3/f_T < 0.4 \quad \text{(III-2)}$$

(here, $z=f_T/f_W>9.0$)
where,
$f_3$ is a composite focal length of the third lens unit,
$f_W$ is a focal length of the entire system at a wide-angle limit,
$f_T$ is a focal length of the entire system at a telephoto limit, and
$\omega_W$ is an incident half view angle at a wide-angle limit; and a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, a plurality of lens units each consisting of at least one lens element are provided, wherein the zoom lens system, in order from the object side to the image side, comprises: a first lens unit having positive optical power; a second lens unit having negative optical power; a third lens unit having positive optical power; and a subsequent lens unit including at least one lens unit having positive optical power, wherein in zooming from a wide-angle limit to a telephoto limit at the time of image taking, at least the first lens unit, the second lens unit and the third lens unit move in an optical axis direction, while the second lens unit moves such that a position at a wide-angle limit is located on the object side relative to a position at a telephoto limit, and wherein the following conditions (III-1) and (III-2) are satisfied:

$$1.0 < f_W \cdot f_3/(f_W \times \tan \omega_W)^2 < 5.0 \quad \text{(III-1)}$$

$$0.1 < f_3/f_T < 0.4 \quad \text{(III-2)}$$

(here, $z=f_T/f_W>9.0$)
where,
$f_3$ is a composite focal length of the third lens unit,
$f_W$ is a focal length of the entire system at a wide-angle limit,
$f_T$ is a focal length of the entire system at a telephoto limit, and
$\omega_W$ is an incident half view angle at a wide-angle limit.

According to the present invention, a zoom lens system can be provided that has a reduced overall length, a high resolution, and a variable magnification ratio as high as 9 or greater, more specifically, approximately 9 to 13, and that is satisfactorily adaptable for wide-angle image taking where the view angle at a wide-angle limit is 70° or greater, more specifically, approximately 76°. Further, according to the present invention, an imaging device employing this zoom lens system and a thin and compact camera employing this imaging device can be provided.

These and other objects, features, aspects and effects of the present invention will become clearer on the basis of the following detailed description with reference to the accompanying drawings.

BRIEF DESCRIPTION OF THE DRAWINGS

FIG. 12(a) is a lateral aberration diagram at an image point of 75% of the maximum image height in a basic state where image blur compensation is not performed at a telephoto limit of a zoom lens system according to Example I-4; FIG. 12(b) is a lateral aberration diagram at an axial image point in a basic state where image blur compensation is not performed at a telephoto limit of a zoom lens system according to Example I-4; FIG. 12(c) is a lateral aberration diagram at an image point of −75% of the maximum image height in a basic state where image blur compensation is not performed at a telephoto limit of a zoom lens system according to Example I-4; FIG. 12(d) is a lateral aberration diagram at an image point of 75% of the maximum image height in an image blur compensation state at a telephoto limit of a zoom lens system according to Example I-4; FIG. 12(e) is a lateral aberration diagram at an axial image point in an image blur compensation state at a telephoto limit of a zoom lens system according to Example I-4.

FIG. 14(*b*) is a lens arrangement diagram showing an infinity in-focus condition at a middle position (an intermediate focal length condition) of a zoom lens system according to Embodiment II-1 (Example II-1); FIG. 14(*c*) is a lens arrangement diagram showing an infinity in-focus condition at a telephoto limit of a zoom lens system according to Embodiment II-1 (Example II-1);

FIG. 15(*b*) is a longitudinal aberration diagram in an infinity in-focus condition at a middle position (an intermediate focal length condition) of a zoom lens system according to Example II-1; FIG. 15(*c*) is a longitudinal aberration diagram in an infinity in-focus condition at a telephoto limit of a zoom lens system according to Example II-1;

FIG. 16(*b*) is a lateral aberration diagram at an axial image point in a basic state where image blur compensation is not performed at a telephoto limit of a zoom lens system according to Example II-1; FIG. 16(*c*) is a lateral aberration diagram at an image point of −75% of the maximum image height in a basic state where image blur compensation is not performed at a telephoto limit of a zoom lens system according to Example II-1; FIG. 16(*d*) is a lateral aberration diagram at an image point of 75% of the maximum image height in an image blur compensation state at a telephoto limit of a zoom lens system according to Example II-1; FIG. 16(*e*) is a lateral aberration diagram at an axial image point in an image blur compensation state at a telephoto limit of a zoom lens system according to Example II-1; FIG. 16(*f*) is a lateral aberration diagram at an image point of −75% of the maximum image height in an image blur compensation state at a telephoto limit of a zoom lens system according to Example II-1;

FIG. 17(*b*) is a lens arrangement diagram showing an infinity in-focus condition at a middle position (an intermediate focal length condition) of a zoom lens system according to Embodiment II-2 (Example II-2); FIG. 17(*c*) is a lens arrangement diagram showing an infinity in-focus condition at a telephoto limit of a zoom lens system according to Embodiment II-2 (Example II-2);

FIG. 18(*b*) is a longitudinal aberration diagram in an infinity in-focus condition at a middle position (an intermediate focal length condition) of a zoom lens system according to Example II-2; FIG. 18(*c*) is a longitudinal aberration diagram in an infinity in-focus condition at a telephoto limit of a zoom lens system according to Example II-2;

FIG. 19(*b*) is a lateral aberration diagram at an axial image point in a basic state where image blur compensation is not performed at a telephoto limit of a zoom lens system according to Example II-2; FIG. 19(*c*) is a lateral aberration diagram at an image point of −75% of the maximum image height in a basic state where image blur compensation is not performed at a telephoto limit of a zoom lens system according to Example II-2; FIG. 19(*d*) is a lateral aberration diagram at an image point of 75% of the maximum image height in an image blur compensation state at a telephoto limit of a zoom lens system according to Example II-2; FIG. 19(*e*) is a lateral aberration diagram at an axial image point in an image blur compensation state at a telephoto limit of a zoom lens system according to Example II-2; FIG. 19(*f*) is a lateral aberration diagram at an image point of −75% of the maximum image height in an image blur compensation state at a telephoto limit of a zoom lens system according to Example II-2;

FIG. 20(*b*) is a lens arrangement diagram showing an infinity in-focus condition at a middle position (an intermediate focal length condition) of a zoom lens system according to Embodiment II-3 (Example II-3); FIG. 20(*c*) is a lens arrangement diagram showing an infinity in-focus condition at a telephoto limit of a zoom lens system according to Embodiment II-3 (Example II-3);

FIG. 21(*b*) is a longitudinal aberration diagram in an infinity in-focus condition at a middle position (an intermediate focal length condition) of a zoom lens system according to Example II-3; FIG. 21(*c*) is a longitudinal aberration diagram in an infinity in-focus condition at a telephoto limit of a zoom lens system according to Example II-3;

FIG. 22(*b*) is a lateral aberration diagram at an axial image point in a basic state where image blur compensation is not performed at a telephoto limit of a zoom lens system according to Example II-3; FIG. 22(*c*) is a lateral aberration diagram at an image point of −75% of the maximum image height in a basic state where image blur compensation is not performed at a telephoto limit of a zoom lens system according to Example II-3; FIG. 22(*d*) is a lateral aberration diagram at an image point of 75% of the maximum image height in an image blur compensation state at a telephoto limit of a zoom lens system according to Example II-3; FIG. 22(*e*) is a lateral aberration diagram at an axial image point in an image blur compensation state at a telephoto limit of a zoom lens system according to Example II-3; FIG. 22(*f*) is a lateral aberration diagram at an image point of −75% of the maximum image height in an image blur compensation state at a telephoto limit of a zoom lens system according to Example II-3;

FIG. 23(*b*) is a lens arrangement diagram showing an infinity in-focus condition at a middle position (an intermediate focal length condition) of a zoom lens system according to Embodiment II-4 (Example II-4); FIG. 23(c) is a lens arrangement diagram showing an infinity in-focus condition at a telephoto limit of a zoom lens system according to Embodiment II-4 (Example II-4);

DESCRIPTION OF THE PREFERRED EMBODIMENTS

Embodiments I-1 to I-4

Figure 1:
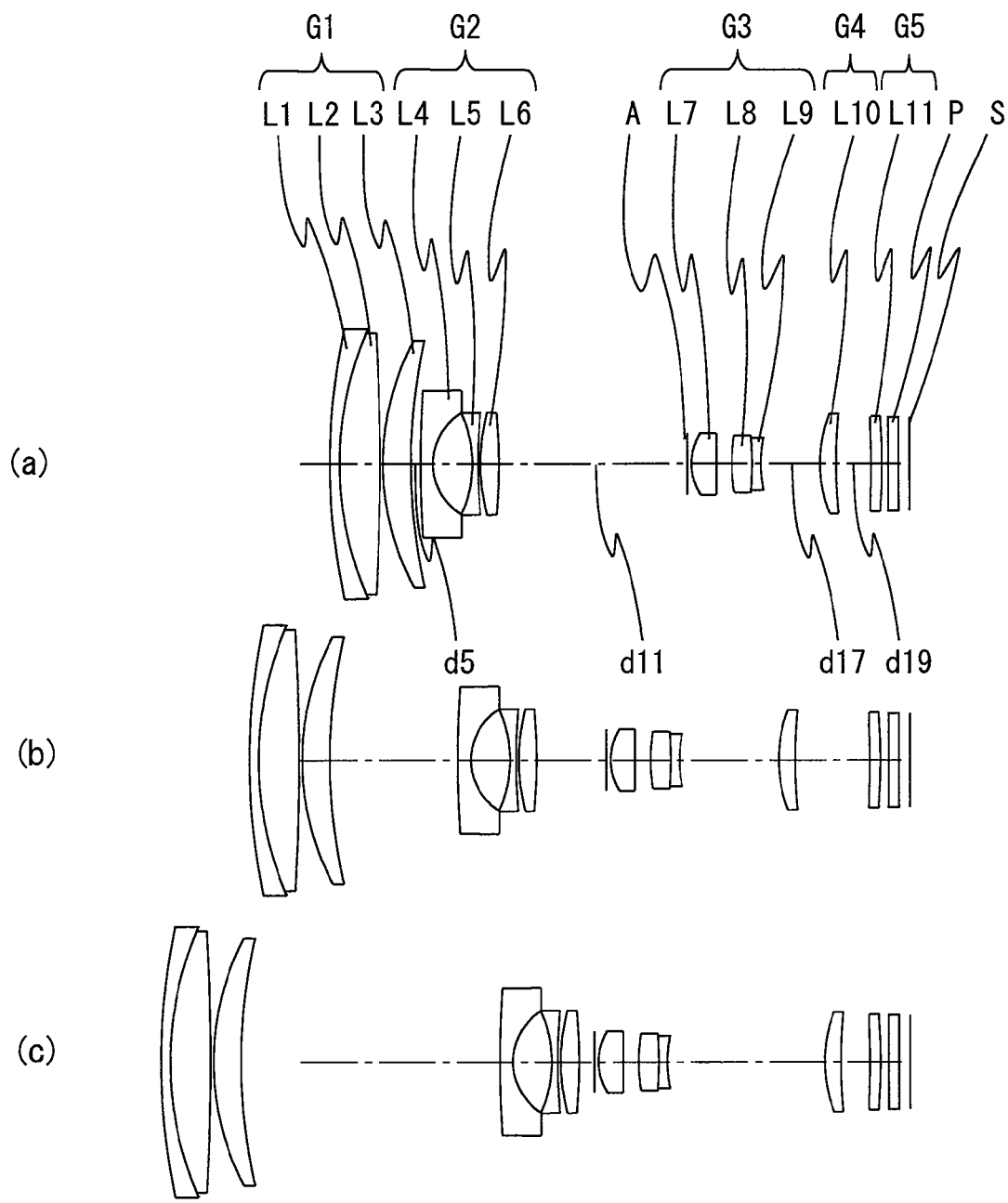
FIG. 1(a) is a lens arrangement diagram showing an infinity in-focus condition at a wide-angle limit of a zoom lens system according to Embodiment I-1 (Example I-1)
FIG. 1(b) is a lens arrangement diagram showing an infinity in-focus condition at a middle position (an intermediate focal length condition) of a zoom lens system according to Embodiment I-1 (Example I-1)
FIG. 1(c) is a lens arrangement diagram showing an infinity in-focus condition at a telephoto limit of a zoom lens system according to Embodiment I-1 (Example I-1)
Figure 4:
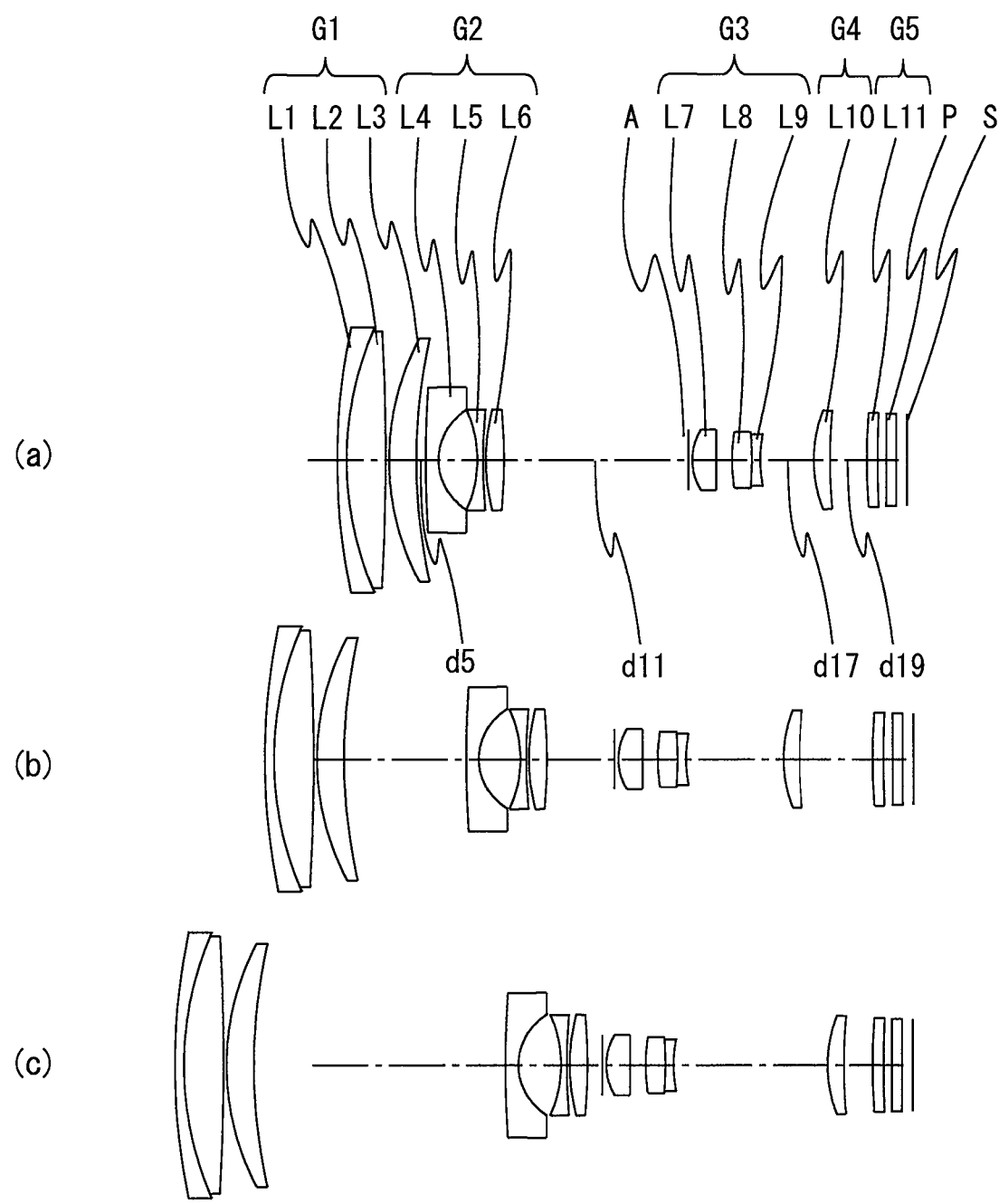
FIG. 4(a) is a lens arrangement diagram showing an infinity in-focus condition at a wide-angle limit of a zoom lens system according to Embodiment I-2 (Example I-2)
FIG. 4(b) is a lens arrangement diagram showing an infinity in-focus condition at a middle position (an intermediate focal length condition) of a zoom lens system according to Embodiment I-2 (Example I-2)
FIG. 4(c) is a lens arrangement diagram showing an infinity in-focus condition at a telephoto limit of a zoom lens system according to Embodiment I-2 (Example I-2)
Figure 7:
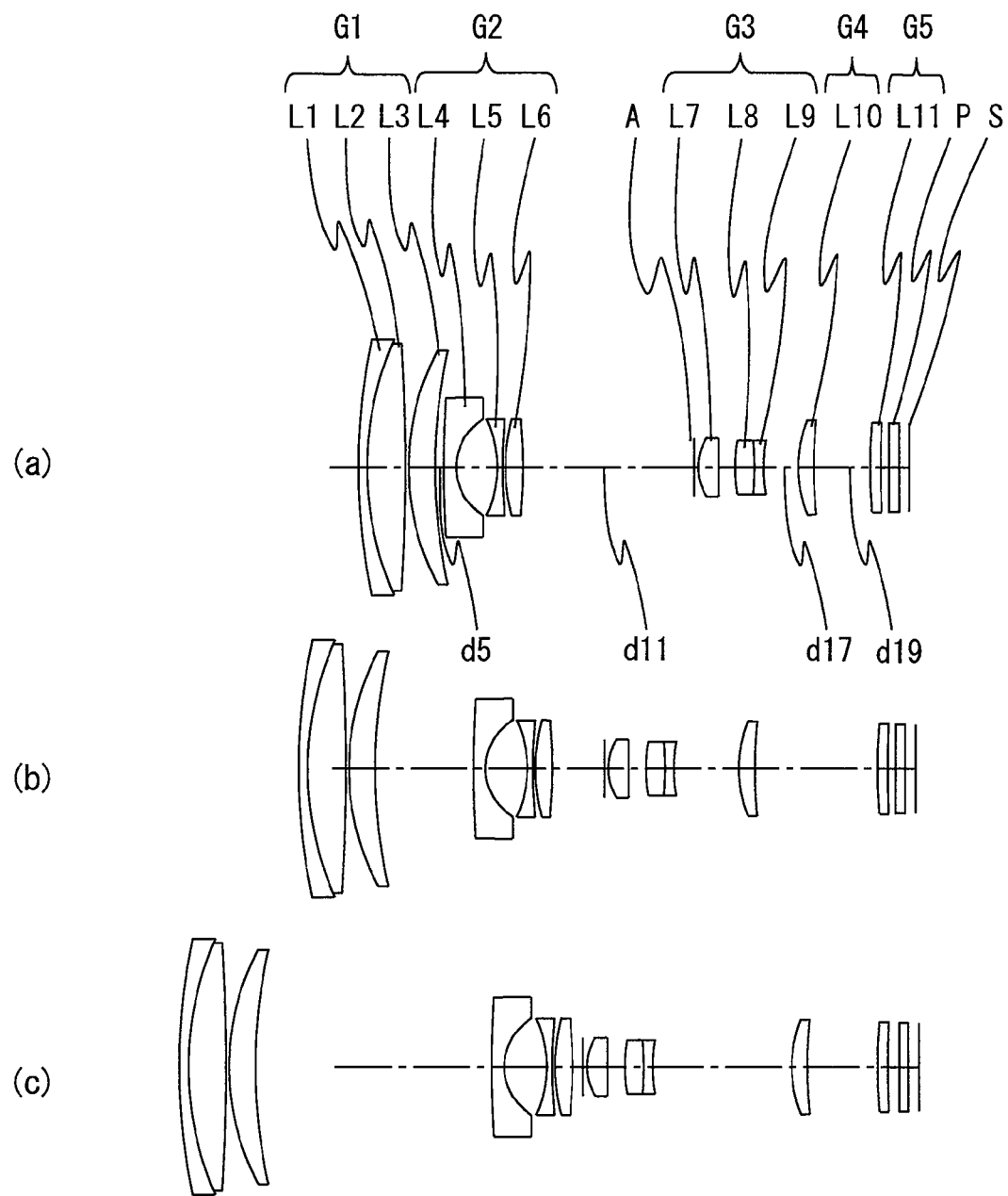
FIG. 7(a) is a lens arrangement diagram showing an infinity in-focus condition at a wide-angle limit of a zoom lens system according to Embodiment I-3 (Example I-3)
FIG. 7(b) is a lens arrangement diagram showing an infinity in-focus condition at a middle position (an intermediate focal length condition) of a zoom lens system according to Embodiment I-3 (Example I-3)
FIG. 7(c) is a lens arrangement diagram showing an infinity in-focus condition at a telephoto limit of a zoom lens system according to Embodiment I-3 (Example I-3)
Figure 10:
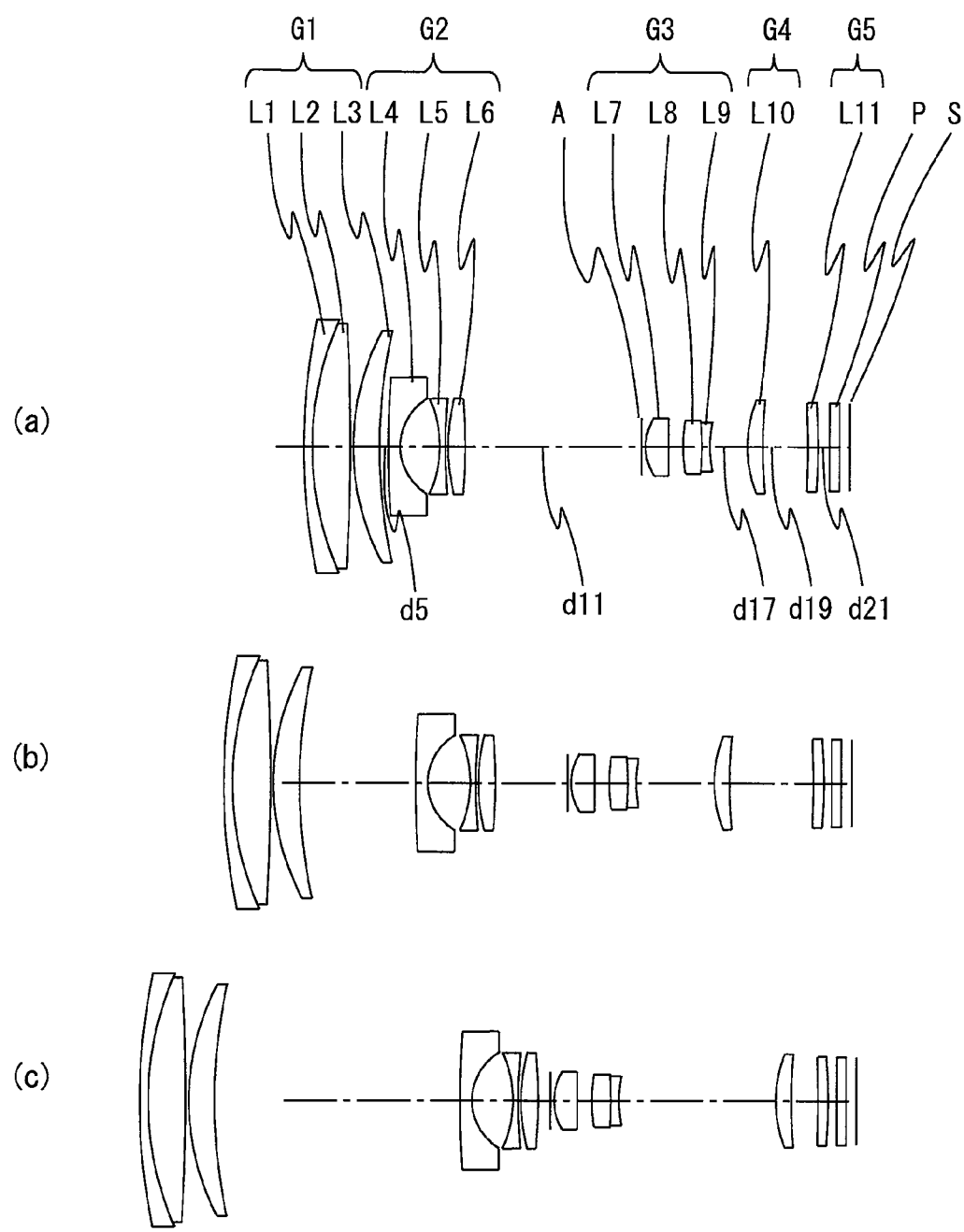
FIG. 10(a) is a lens arrangement diagram showing an infinity in-focus condition at a wide-angle limit of a zoom lens system according to Embodiment I-4 (Example I-4)
FIG. 10(b) is a lens arrangement diagram showing an infinity in-focus condition at a middle position (an intermediate focal length condition) of a zoom lens system according to Embodiment I-4 (Example I-4)
FIG. 10(c) is a lens arrangement diagram showing an infinity in-focus condition at a telephoto limit of a zoom lens system according to Embodiment I-4 (Example I-4)

FIG. 1 is a lens arrangement diagram of a zoom lens system according to Embodiment I-1. FIG. 4 is a lens arrangement diagram of a zoom lens system according to Embodiment I-2. FIG. 7 is a lens arrangement diagram of a zoom lens system according to Embodiment I-3. FIG. 10 is a lens arrangement diagram of a zoom lens system according to Embodiment I-4. In FIGS. 1, 4, 7 and 10, part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$).

Each zoom lens system according to Embodiments I-1 to I-4, in order from the object side to the image side, comprises: a first lens unit G1 having positive optical power; a second lens unit G2 having negative optical power; a diaphragm A; a third lens unit G3 having positive optical power; a fourth lens unit G4 having positive optical power; and a fifth lens unit G5 having positive optical power. In FIGS. 1, 4, 7 and 10, the straight line located on the most right-hand side indicates the position of an image surface S. On the object side relative to this, a plane parallel plate P such as an optical low-pass filter, a face plate of an image sensor or the like is provided. In the zoom lens system according to Embodiments I-1 to I-4, these lens units are arranged in a desired optical power construction, so that a high variable magnification ratio of 9 or greater, more specifically, approximately 9 to 13, is achieved. As such, with maintaining high optical performance, size reduction is realized in the entire lens system.

As shown in FIG. 1, in the zoom lens system according to Embodiment I-1, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment I-1, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment I-1, the third lens unit G3, in order from the object side to the image side, comprises: a bi-convex seventh lens element L7; a bi-convex eighth lens element L8; and a bi-concave ninth lens element L9. Among these, the eighth lens element L8 and the ninth lens element L9 are cemented with each other.

Moreover, in the zoom lens system according to Embodiment I-1, the fourth lens unit G4 comprises solely a positive meniscus tenth lens element L10 with the convex surface facing the object side.

Further, in the zoom lens system according to Embodiment I-1, the fifth lens unit G5 comprises solely a bi-convex eleventh lens element L11.

In the zoom lens system according to Embodiment I-1, in zooming from a wide-angle limit to a telephoto limit, the first lens unit G1 and the third lens unit G3 move to the object side, while the second lens unit G2 moves to the image side, and while the fourth lens unit G4 moves with locus of a convex to the object side with changing the interval with the third lens unit G3. The fifth lens unit G5 is fixed relative to the image surface.

As shown in FIG. 4, in the zoom lens system according to Embodiment I-2, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment I-2, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment I-2, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Moreover, in the zoom lens system according to Embodiment I-2, the fourth lens unit G4 comprises solely a positive meniscus tenth lens element L10 with the convex surface facing the object side.

Moreover, in the zoom lens system according to Embodiment I-2, the fifth lens unit G5 comprises solely a positive meniscus eleventh lens element L11 with the convex surface facing the object side.

In the zoom lens system according to Embodiment I-2, in zooming from a wide-angle limit to a telephoto limit, the first lens unit G1 and the third lens unit G3 move to the object side, while the second lens unit G2 moves to the image side, and while the fourth lens unit G4 moves with locus of a convex to the object side with changing the interval with the third lens unit G3. The fifth lens unit G5 is fixed relative to the image surface.

As shown in FIG. 7, in the zoom lens system according to Embodiment I-3, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment I-3, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment I-3, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment I-3, the fourth lens unit G4 comprises solely a bi-convex tenth lens element L10.

Moreover, in the zoom lens system according to Embodiment I-3, the fifth lens unit G5 comprises solely a positive meniscus eleventh lens element L11 with the convex surface facing the object side.

In the zoom lens system according to Embodiment I-3, in zooming from a wide-angle limit to a telephoto limit, the first lens unit G1 and the third lens unit G3 move to the object side, while the second lens unit G2 moves to the image side, and while the fourth lens unit G4 moves with locus of a convex to the object side with changing the interval with the third lens unit G3. The fifth lens unit G5 is fixed relative to the image surface.

As shown in FIG. 10, in the zoom lens system according to Embodiment I-4, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment I-4, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment I-4, the third lens unit G3, in order from the object side to the image side, comprises: a bi-convex seventh lens element L7; a bi-convex eighth lens element L8; and a bi-concave ninth lens element L9. Among these, the eighth lens element L8 and the ninth lens element L9 are cemented with each other.

Moreover, in the zoom lens system according to Embodiment I-4, the fourth lens unit G4 comprises solely a positive meniscus tenth lens element L10 with the convex surface facing the object side.

Moreover, in the zoom lens system according to Embodiment I-4, the fifth lens unit G5 comprises solely a positive meniscus eleventh lens element L11 with the convex surface facing the image side.

In the zoom lens system according to Embodiment I-4, in zooming from a wide-angle limit to a telephoto limit, the first lens unit G1 and the third lens unit G3 move to the object side, while the second lens unit G2 and the fifth lens unit G5 move to the image side. Further, the fourth lens unit G4 moves with locus of a convex to the object side with changing the interval with the third lens unit G3.

As described above, the zoom lens system according to Embodiments I-1 to I-4 has a plurality of lens units each consisting of at least one lens element, and in order from the object side to the image side, comprises a first lens unit having positive optical power, a second lens unit having negative optical power, a third lens unit having positive optical power, a fourth lens unit having positive optical power and a fifth lens unit having positive optical power. However, in the present invention, no particular limitation is placed on the optical power of the fourth lens unit and the fifth lens unit that constitute the zoom lens system. From the perspective that the overall optical length is reduced satisfactorily and that the construction of a camera employing this zoom lens system becomes satisfactorily compact, it is preferable that both the fourth lens unit and the fifth lens unit have positive optical power like in Embodiments I-1 to I-4. However, any one of the fourth lens unit and the fifth lens unit may have negative optical power. Alternatively, both may have negative optical power.

Further, in the zoom lens system according to Embodiments I-1 to I-4, the fourth lens unit and the fifth lens unit each consists of one lens element. Thus, in addition to that the zoom lens system has a high resolution and a high variable magnification ratio and is adaptable for wide-angle image taking, a compact lens system having a reduced overall length is realized.

Here, in the zoom lens system according to Embodiments I-1 to I-4, the first lens unit and the second lens unit each consists of three lens elements. However, the number of lens elements constituting the first lens unit and the second lens unit is not limited to three, and may be changed appropriately in accordance with the desired configuration of the entire zoom lens system.

Further, in the zoom lens system according to Embodiments I-1 to I-4, among a plurality of the lens units, at least the first lens unit, the second lens unit, the third lens unit and the fourth lens unit are moved in an optical axis direction so that zooming is performed from a wide-angle limit to a telephoto limit at the time of image taking. Among these lens units, for example, the third lens unit moves in a direction perpendicular to the optical axis, so that image blur caused by hand blurring, vibration and the like can be compensated optically.

In the present invention, when the image blur is to be compensated optically, the third lens unit moves in a direction perpendicular to the optical axis as described above, so that image blur is compensated in a state that size increase in the entire zoom lens system is suppressed and a compact construction is realized and that excellent imaging characteristics such as small decentering coma aberration and decentering astigmatism are satisfied.

Conditions are described below that are preferable to be satisfied by a zoom lens system like the zoom lens system according to Embodiments I-1 to I-4, in order from the object side to the image side, comprising a first lens unit having positive optical power, a second lens unit having negative optical power, a third lens unit having positive optical power, a fourth lens unit and a fifth lens unit, wherein in zooming from a wide-angle limit to a telephoto limit at the time of image taking, at least the first lens unit and the second lens unit move in an optical axis direction, and wherein the fourth lens unit and the fifth lens unit each consists of one lens element. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

Further, for example, in a zoom lens system like the zoom lens system according to Embodiments I-1 to I-4, it is preferable that the following condition (I-1) is satisfied.

$$0.1 < (R_{4R} + R_{4F})/(R_{4R} - R_{4F}) < 3.0 \tag{I-1}$$

where, $R_{4F}$ is a radius of curvature of an object side lens surface of the lens element constituting the fourth lens unit, and $R_{4R}$ is a radius of curvature of an image side lens surface of the lens element constituting the fourth lens unit.

The condition (I-1) relates to the shape factor of the fourth lens unit. When the value exceeds the upper limit of the condition (I-1), the optical power of the fourth lens unit is reduced. This causes a tendency that the amount of movement during focusing becomes large. In contrast, when the value goes below the lower limit of the condition (I-1), the generated amount of curvature of field increases, and hence causes difficulty in achieving satisfactory aberration compensation.

Here, when at least one of the following conditions (I-1)' and (I-1)'' is satisfied, the above-mentioned effect is achieved more successfully.

$$0.6 < (R_{4R} + R_{4F})/(R_{4R} - R_{4F}) \tag{I-1)'}$$

$$(R_{4R} + R_{4F})/(R_{4R} - R_{4F}) < 2.2 \tag{I-1)''}$$

Further, for example, in a zoom lens system like the zoom lens system according to Embodiments I-1 to I-4, it is preferable that the following condition (I-2) is satisfied.

$$1.0 < (D_{3T}/D_{3W})/(D_{4T}/D_{4W}) < 9.0 \tag{I-2}$$

(here, $Z = f_T/f_W > 9.0$)
where, $D_{3W}$ is an optical axial distance between the third lens unit and the fourth lens unit at a wide-angle limit, $D_{3T}$ is an optical axial distance between the third lens unit and the fourth lens unit at a telephoto limit, $D_{4W}$ is an optical axial distance between the fourth lens unit and the fifth lens unit at a wide-angle limit, $D_{4T}$ is an optical axial distance between the fourth lens unit and the fifth lens unit at a telephoto limit, $f_W$ is a focal length of the entire system at a wide-angle limit, and $f_T$ is a focal length of the entire system at a telephoto limit.

The condition (I-2) relates to the positional relations between the third lens unit and the fourth lens unit and between the fourth lens unit and the fifth lens unit. When the value exceeds the upper limit of the condition (I-2), the amount of movement of the third lens unit increases. Thus, in particular, the overall optical length at a telephoto limit increases. This causes difficulty in size reduction. In contrast, when the value goes below the lower limit of the condition (I-2), the amount of movement of the fourth lens unit increases, and hence the optical power decreases. This causes a possibility that the amount of movement of the lens unit increases during focusing.

Here, when at least one of the following conditions (I-2)' and (I-2)'' is satisfied, the above-mentioned effect is achieved more successfully.

$$7.5 < (D_{3T}/D_{3W})/(D_{4T}/D_{4W}) < 9.0 \tag{I-2)'}$$

$$1.0 < (D_{3T}/D_{3W})/(D_{4T}/D_{4W}) < 4.0 \tag{I-2)''}$$

(here, $Z = f_T/f_W > 9.0$)

Further, for example, in a zoom lens system like the zoom lens system according to Embodiments I-1 to I-4, it is preferable that the following condition (I-3) is satisfied.

$$3.0 < f_4/f_W < 6.0 \tag{I-3}$$

(here, $Z = f_T/f_W > 9.0$)
where, $f_4$ is a focal length of the lens element constituting the fourth lens unit, $f_W$ is a focal length of the entire system at a wide-angle limit, and $f_T$ is a focal length of the entire system at a telephoto limit.

The condition (I-3) relates to the focal length of the lens element constituting the fourth lens unit. When the value exceeds the upper limit of the condition (I-3), the optical power of the fourth lens unit is reduced. This causes a tendency that the amount of movement during zooming becomes large. In contrast, when the value goes below the lower limit of the condition (I-3), generation of curvature of field during focusing increases, and hence causes difficulty in achieving satisfactory aberration compensation.

Here, when at least one of the following conditions (I-3)' and (I-3)'' is satisfied, the above-mentioned effect is achieved more successfully.

$$5.1 < f_4/f_W \tag{I-3)'}$$

$$f_4/f_W < 5.8 \tag{I-3)''}$$

(here, $Z = f_T/f_W > 9.0$)

Further, in a zoom lens system like the zoom lens system according to Embodiments I-1 to I-4 in which the third lens unit moves in a direction perpendicular to the optical axis, it is preferable that the entire system satisfies the following conditions (I-4) and (I-5).

$$Y_T > Y \tag{I-4}$$

$$1.0 < (Y/Y_T)/(f/f_T) < 2.0 \tag{I-5}$$

(here, $Z = f_T/f_W > 9.0$)
where, f is a focal length of the entire system, $f_T$ is a focal length of the entire system at a telephoto limit, Y is an amount of movement in a direction perpendicular to the optical axis at the time of maximum blur compensation in the third lens unit with a focal length f of the entire system, $Y_T$ is an amount of movement in a direction perpendicular to the optical axis at the time of maximum blur compensation in the third lens unit with a focal length $f_T$ of the entire system at a telephoto limit, and $f_W$ is a focal length of the entire system at a wide-angle limit.

The conditions (I-4) and (I-5) relate to the amount of movement at the time of maximum blur compensation in the third lens unit that moves in a direction perpendicular to the optical axis. In the case of a zoom lens system, when the compensation angle is constant over the entire zoom range, a larger zoom ratio requires a larger amount of movement of the lens unit or the lens element that moves in a direction perpendicular to the optical axis. On the contrary, a smaller zoom ratio requires merely a smaller amount of movement of the lens unit or the lens element that moves in a direction perpendicular to the optical axis. When the condition (I-4) is not satisfied, alternatively when the value exceeds the upper limit of the condition (I-5), blur compensation becomes excessive. This causes a possibility of enhanced degradation in the optical performance. In contrast, when the value goes below the lower limit of the condition (I-5), a possibility of insufficient blur compensation arises.

Here, when at least one of the following conditions (I-5)' and (I-5)" is satisfied, the above-mentioned effect is achieved more successfully.

$$1.3 < (Y/Y_T)/(f/f_T) \quad \text{(I-5)'}$$

$$(Y/Y_T)/(f/f_T) < 1.5 \quad \text{(I-5)''}$$

(here, $Z = f_T/f_W > 9.0$)

Here, as described above, the zoom lens system according to Embodiments I-1 to I-4 is a zoom lens system that has a five-unit construction of positive, negative, positive, positive and positive, and that, in order from the object side to the image side, comprises: a first lens unit G1 having positive optical power; a second lens unit G2 having negative optical power; a diaphragm A; a third lens unit G3 having positive optical power; a fourth lens unit G4 having positive optical power; and a fifth lens unit G5 having positive optical power. However, the present invention is not limited to this configuration. For example, a five-unit construction of a positive, negative, positive, negative and positive configuration, a positive, negative, positive, positive and negative configuration, or a positive, negative, positive, negative and negative configuration may be employed that consist of a first lens unit having positive optical power, a second lens unit having negative optical power, a third lens unit having positive optical power, a fourth lens unit and a fifth lens unit. Such a zoom lens system can be used suitably, for example, in a digital still camera according to Embodiment I-5 described later and in an imaging device employed in this.

Here, the lens units constituting the zoom lens system according to Embodiments I-1 to I-4 consist exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Embodiment I-5

Figure 13:
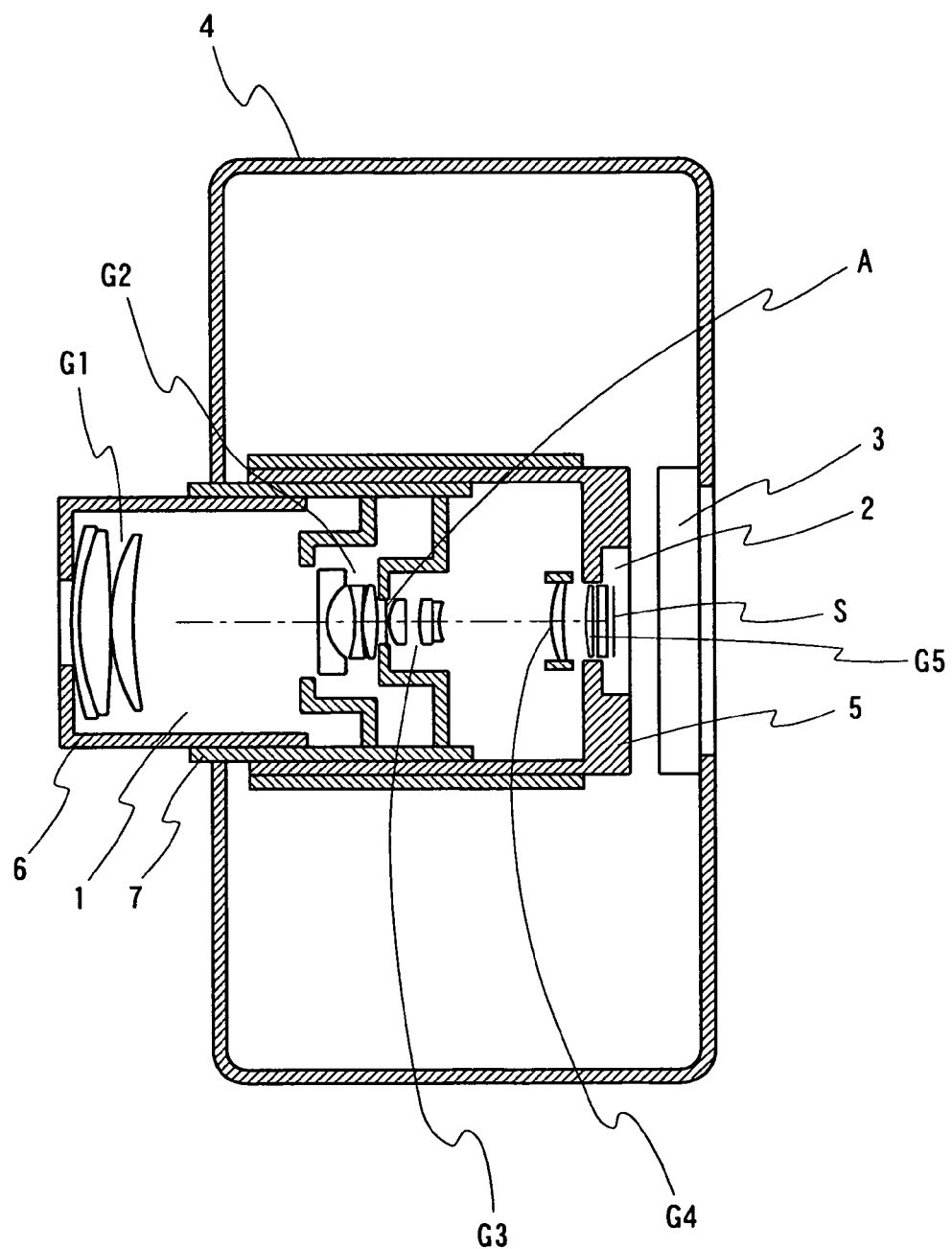
FIG. 13 is a schematic construction diagram of a digital still camera according to Embodiment I-5.

FIG. 13 is a schematic construction diagram of a digital still camera according to Embodiment I-5. In FIG. 13, the digital still camera comprises: an imaging device having a zoom lens system 1 and an image sensor 2 consisting of a CCD; a liquid crystal display monitor 3; and a body 4. The employed zoom lens system 1 is a zoom lens system according to Embodiment I-1. In FIG. 13, the zoom lens system 1 comprises a first lens unit G1, a second lens unit G2, a diaphragm A, a third lens unit G3, a fourth lens unit G4 and a fifth lens unit G5. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the third lens unit G3 and the fourth lens unit G4 move to predetermined positions relative to the image sensor 2, so that magnification change can be achieved ranging from a wide-angle limit to a telephoto limit. The fourth lens unit G4 is movable in an optical axis direction by a motor for focus adjustment.

As such, the zoom lens system according to Embodiment I-1 is employed in a digital still camera, a small digital still camera is obtained that has a high resolution and high capability of correcting the curvature of field and that has a short overall optical length at the time of non-use. Here, in the digital still camera shown in FIG. 13, any one of the zoom lens systems according to Embodiments I-2 to I-4 may be employed in place of the zoom lens system according to Embodiment I-1. Further, the optical system of the digital still camera shown in FIG. 13 is applicable also to a digital video camera for moving images. In this case, moving images with high resolution can be acquired in addition to still images.

Further, an imaging device comprising a zoom lens system according to Embodiments I-1 to I-4 described above and an image sensor such as a CCD or a CMOS may be applied to a mobile telephone, a PDA (Personal Digital Assistance), a surveillance camera in a surveillance system, a Web camera, a vehicle-mounted camera or the like.

Embodiments II-1 to II-5

Figure 14:
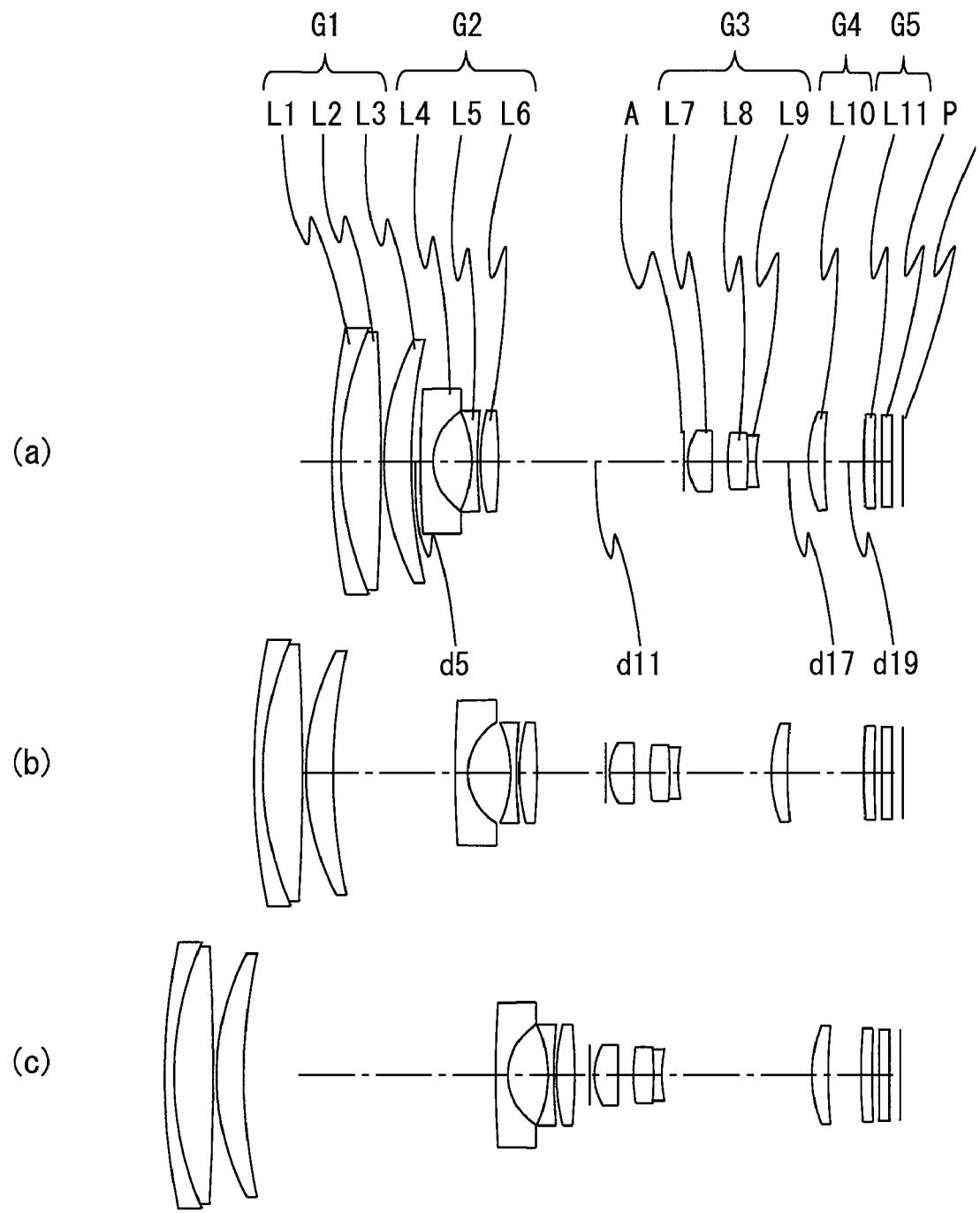
FIG. 14(*a*) is a lens arrangement diagram showing an infinity in-focus condition at a wide-angle limit of a zoom lens system according to Embodiment II-1 (Example II-1)
Figure 17:
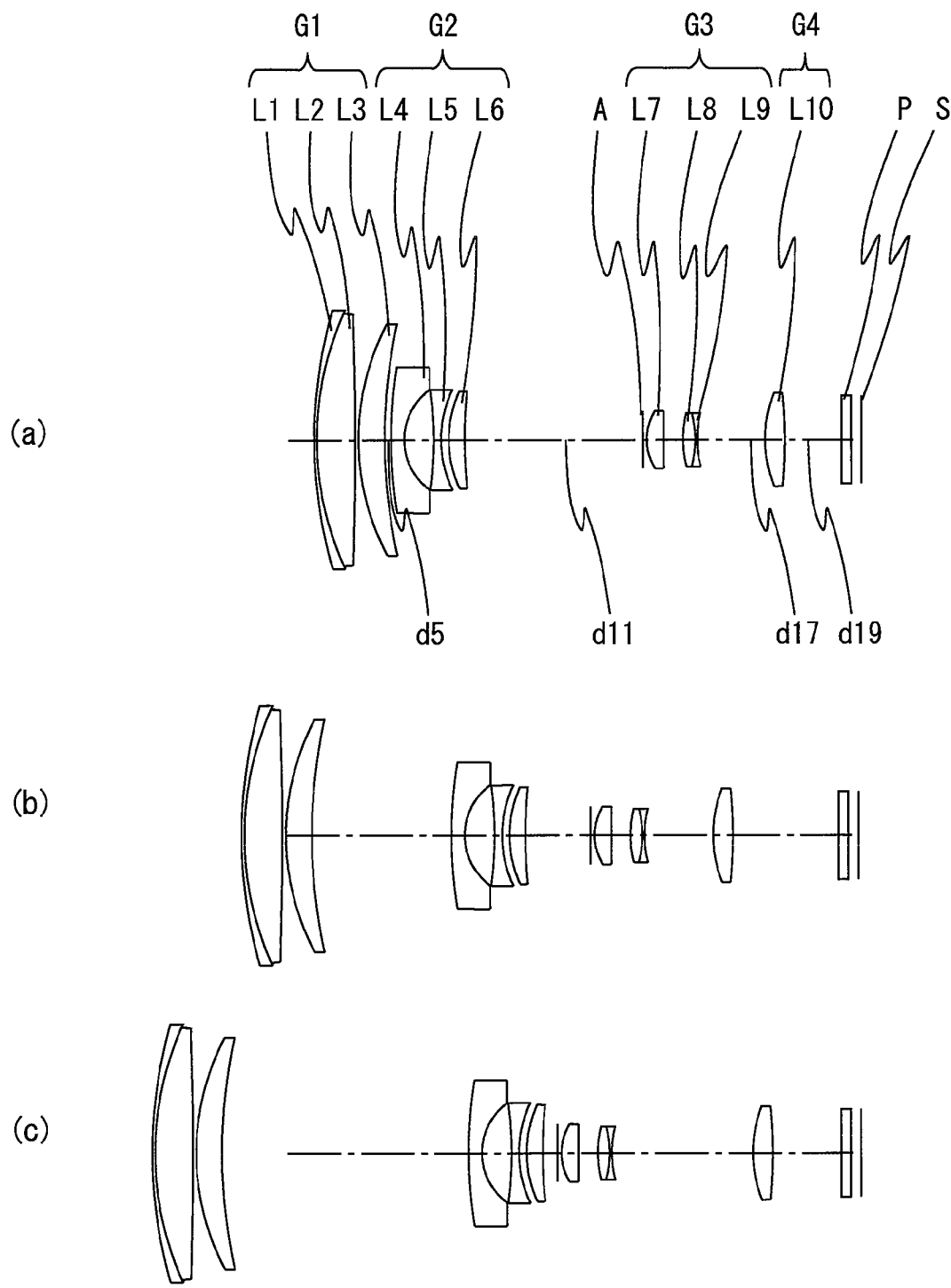
FIG. 17(*a*) is a lens arrangement diagram showing an infinity in-focus condition at a wide-angle limit of a zoom lens system according to Embodiment II-2 (Example II-2)
Figure 20:
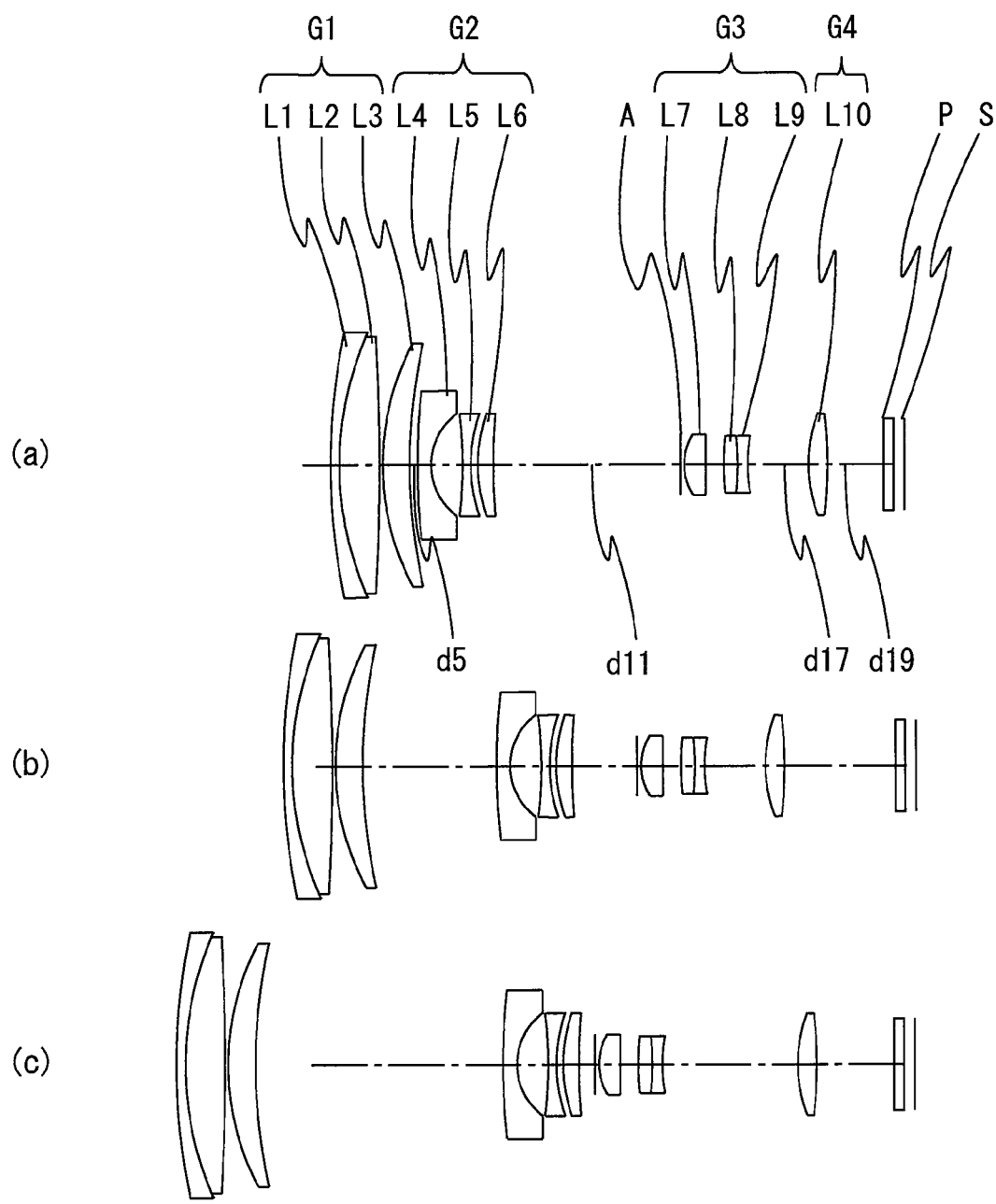
FIG. 20(*a*) is a lens arrangement diagram showing an infinity in-focus condition at a wide-angle limit of a zoom lens system according to Embodiment II-3 (Example II-3)
Figure 23:
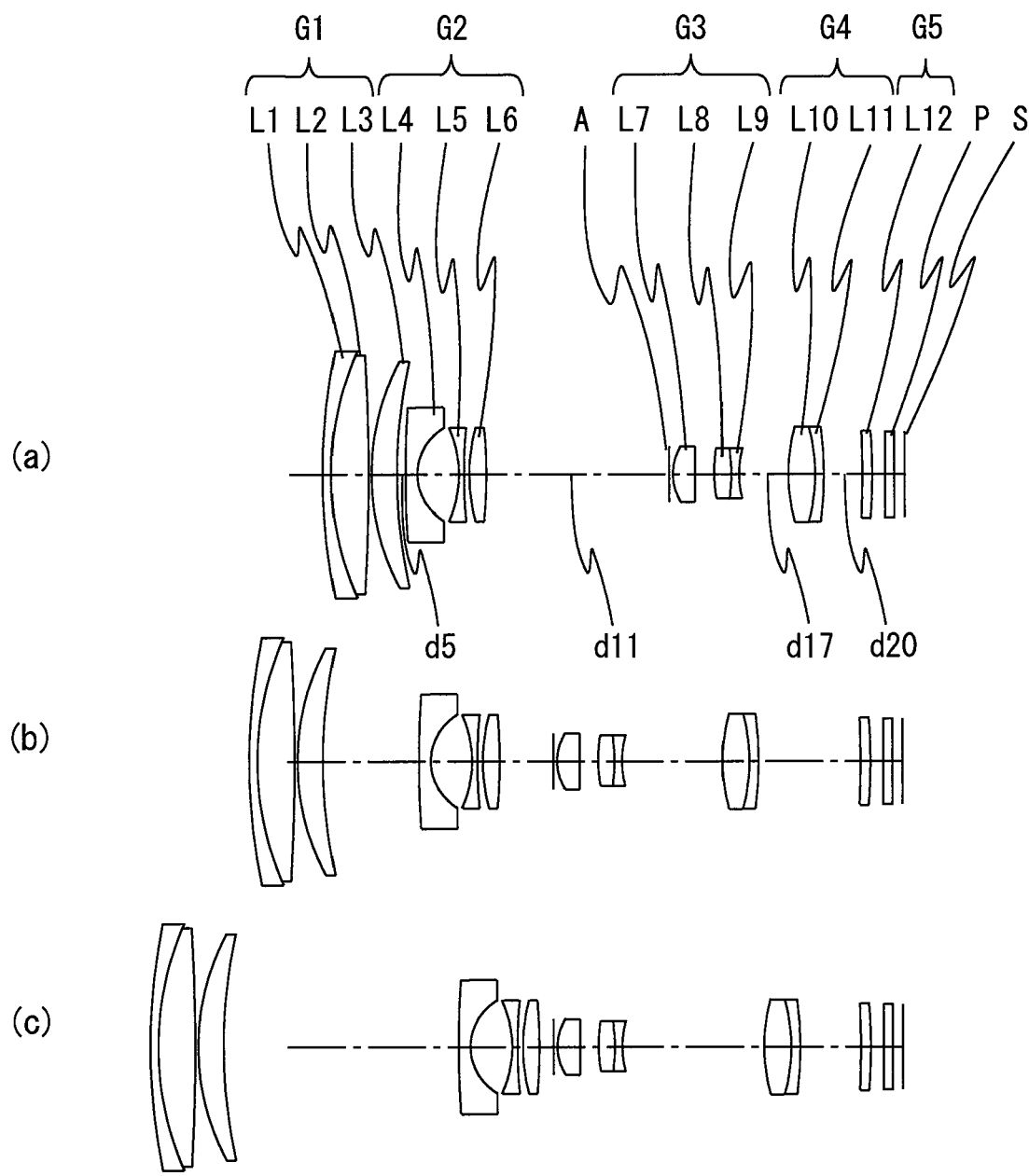
FIG. 23(*a*) is a lens arrangement diagram showing an infinity in-focus condition at a wide-angle limit of a zoom lens system according to Embodiment II-4 (Example II-4)
Figure 26:
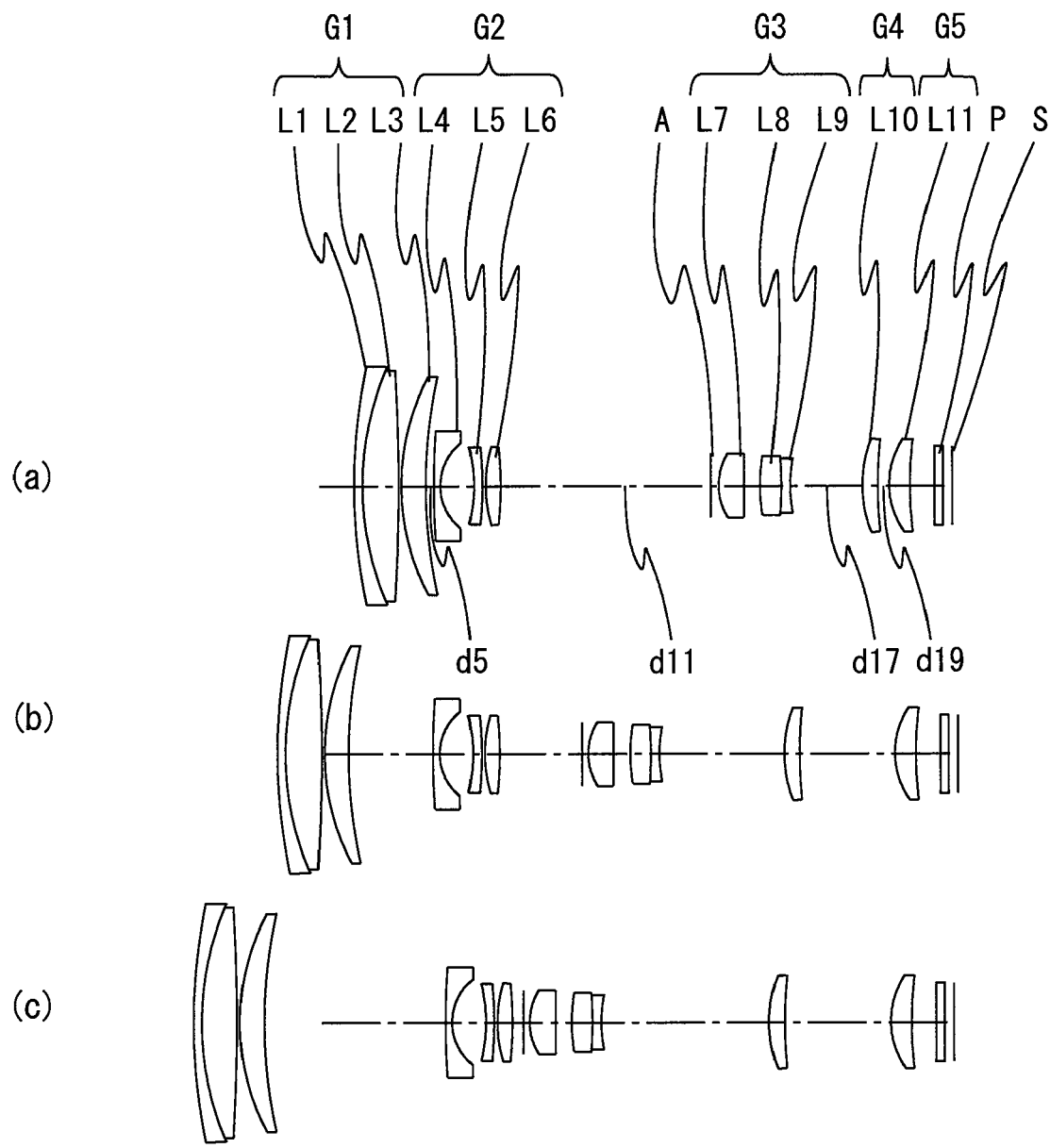
FIG. 26(a) is a lens arrangement diagram showing an infinity in-focus condition at a wide-angle limit of a zoom lens system according to Embodiment II-5 (Example II-5)
FIG. 26(b) is a lens arrangement diagram showing an infinity in-focus condition at a middle position (an intermediate focal length condition) of a zoom lens system according to Embodiment II-5 (Example II-5)
FIG. 26(c) is a lens arrangement diagram showing an infinity in-focus condition at a telephoto limit of a zoom lens system according to Embodiment II-5 (Example II-5)

FIG. 14 is a lens arrangement diagram of a zoom lens system according to Embodiment II-1. FIG. 17 is a lens arrangement diagram of a zoom lens system according to Embodiment II-2. FIG. 20 is a lens arrangement diagram of a zoom lens system according to Embodiment II-3. FIG. 23 is a lens arrangement diagram of a zoom lens system according to Embodiment II-4. FIG. 26 is a lens arrangement diagram of a zoom lens system according to Embodiment II-5. In FIGS. 14, 17, 20, 23 and 26, part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$).

Each zoom lens system according to Embodiments II-1, II-4 and II-5, in order from the object side to the image side, comprises: a first lens unit G1 having positive optical power;

a second lens unit G2 having negative optical power; a diaphragm A; a third lens unit G3 having positive optical power; a fourth lens unit G4 having positive optical power; and a fifth lens unit G5 having positive optical power. Further, each zoom lens system according to Embodiments II-2 and II-3, in order from the object side to the image side, comprises: a first lens unit G1 having positive optical power; a second lens unit G2 having negative optical power; a diaphragm A; a third lens unit G3 having positive optical power; and a fourth lens unit G4 having positive optical power. In FIGS. 14, 17, 20, 23 and 26, the straight line located on the most right-hand side indicates the position of an image surface S. On the object side relative to this, a plane parallel plate P such as an optical low-pass filter, a face plate of an image sensor or the like is provided. In the zoom lens system according to Embodiments II-1 to II-5, these lens units are arranged in a desired optical power construction, so that a high variable magnification ratio of 9 or greater, more specifically, approximately 9 to 13, is achieved. As such, with maintaining high optical performance, size reduction is realized in the entire lens system.

As shown in FIG. 14, in the zoom lens system according to Embodiment II-1, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment II-1, the second lens unit G2, in order from the object side to the image side, comprises: a negative meniscus fourth lens element L4 (most object side lens element 2a) with the convex surface facing the object side; a bi-concave fifth lens element L5 (lens element 2b); and a bi-convex sixth lens element L6 (lens element 2c). Among these, the fourth lens element L4 (most object side lens element 2a) has two aspheric surfaces.

Further, in the zoom lens system according to Embodiment II-1, the third lens unit G3, in order from the object side to the image side, comprises: a positive meniscus seventh lens element L7 with the convex surface facing the object side; a bi-convex eighth lens element L8; and a bi-concave ninth lens element L9 (most image side lens element). Among these, the eighth lens element L8 and the ninth lens element L9 are cemented with each other.

Further, in the zoom lens system according to Embodiment II-1, the fourth lens unit G4 comprises solely a positive meniscus tenth lens element L10 (most object side lens element (one lens element)) with the convex surface facing the object side.

Moreover, in the zoom lens system according to Embodiment II-1, the fifth lens unit G5 comprises solely a positive meniscus eleventh lens element L11 with the convex surface facing the object side.

In the zoom lens system according to Embodiment II-1, in zooming from a wide-angle limit to a telephoto limit, the first lens unit G1 and the third lens unit G3 move to the object side, while the second lens unit G2 moves to the image side, and while the fourth lens unit G4 moves with locus of a convex to the object side with changing the interval with the third lens unit G3. The fifth lens unit G5 is fixed relative to the image surface.

As shown in FIG. 17, in the zoom lens system according to Embodiment II-2, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment II-2, the second lens unit G2, in order from the object side to the image side, comprises: a negative meniscus fourth lens element L4 (most object side lens element 2a) with the convex surface facing the object side; a bi-concave fifth lens element L5 (lens element 2b); and a positive meniscus sixth lens element L6 (lens element 2c) with the convex surface facing the object side. Among these, the fourth lens element L4 (most object side lens element 2a) has two aspheric surfaces.

Further, in the zoom lens system according to Embodiment II-2, the third lens unit G3, in order from the object side to the image side, comprises: a positive meniscus seventh lens element L7 with the convex surface facing the object side; a bi-convex eighth lens element L8; and a bi-concave ninth lens element L9 (most image side lens element). Among these, the eighth lens element L8 and the ninth lens element L9 are cemented with each other.

Further, in the zoom lens system according to Embodiment II-2, the fourth lens unit G4 comprises solely a bi-convex tenth lens element L10 (most object side lens element (one lens element)).

In the zoom lens system according to Embodiment II-2, in zooming from a wide-angle limit to a telephoto limit, the first lens unit G1 and the third lens unit G3 move to the object side, while the second lens unit G2 moves to the image side, and while the fourth lens unit G4 moves with locus of a convex to the object side with changing the interval with the third lens unit G3.

As shown in FIG. 20, in the zoom lens system according to Embodiment II-3, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment II-3, the second lens unit G2, in order from the object side to the image side, comprises: a negative meniscus fourth lens element L4 (most object side lens element 2a) with the convex surface facing the object side; a bi-concave fifth lens element L5 (lens element 2b); and a positive meniscus sixth lens element L6 (lens element 2c) with the convex surface facing the object side. Among these, the fourth lens element L4 (most object side lens element 2a) has two aspheric surfaces.

Further, in the zoom lens system according to Embodiment II-3, the third lens unit G3, in order from the object side to the image side, comprises: a positive meniscus seventh lens element L7 with the convex surface facing the object side; a bi-convex eighth lens element L8; and a bi-concave ninth lens element L9 (most image side lens element). Among these, the eighth lens element L8 and the ninth lens element L9 are cemented with each other.

Further, in the zoom lens system according to Embodiment II-3, the fourth lens unit G4 comprises solely a bi-convex tenth lens element L10 (most object side lens element (one lens element)).

In the zoom lens system according to Embodiment II-3, in zooming from a wide-angle limit to a telephoto limit, the first lens unit G1 and the third lens unit G3 move to the object side, while the second lens unit G2 moves to the image side, and while the fourth lens unit G4 moves with locus of a convex to the object side with changing the interval with the third lens unit G3.

As shown in FIG. 23, in the zoom lens system according to Embodiment II-4, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment II-4, the second lens unit G2, in order from the object side to the image side, comprises: a negative meniscus fourth lens element L4 (most object side lens element 2a) with the convex surface facing the object side; a bi-concave fifth lens element L5 (lens element 2b); and a bi-convex sixth lens element L6 (lens element 2c). Among these, the fourth lens element L4 (most object side lens element 2a) has two aspheric surfaces.

Further, in the zoom lens system according to Embodiment II-4, the third lens unit G3, in order from the object side to the image side, comprises: a positive meniscus seventh lens element L7 with the convex surface facing the object side; a bi-convex eighth lens element L8; and a bi-concave ninth lens element L9 (most image side lens element). Among these, the eighth lens element L8 and the ninth lens element L9 are cemented with each other.

Further, in the zoom lens system according to Embodiment II-4, the fourth lens unit G4, in order from the object side to the image side, comprises: a bi-convex tenth lens element L10 (most object side lens element); and a negative meniscus eleventh lens element L11 with the convex surface facing the image side. The tenth lens element L10 and the eleventh lens element L11 are cemented with each other.

Moreover, in the zoom lens system according to Embodiment II-4, the fifth lens unit G5 comprises solely a positive meniscus twelfth lens element L12 with the convex surface facing the image side.

In the zoom lens system according to Embodiment II-4, in zooming from a wide-angle limit to a telephoto limit, the first lens unit G1 and the third lens unit G3 move to the object side, while the second lens unit G2 moves to the image side, and while the fourth lens unit G4 moves with locus of a convex to the object side with changing the interval with the third lens unit G3. The fifth lens unit G5 is fixed relative to the image surface.

As shown in FIG. 26, in the zoom lens system according to Embodiment II-5, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiment II-5, the second lens unit G2, in order from the object side to the image side, comprises: a negative meniscus fourth lens element L4 (most object side lens element 2a) with the convex surface facing the object side; a bi-concave fifth lens element L5 (lens element 2b); and a bi-convex sixth lens element L6 (lens element 2c).

Further, in the zoom lens system according to Embodiment II-5, the third lens unit G3, in order from the object side to the image side, comprises: a positive meniscus seventh lens element L7 with the convex surface facing the object side; a bi-convex eighth lens element L8; and a bi-concave ninth lens element L9 (most image side lens element). Among these, the eighth lens element L8 and the ninth lens element L9 are cemented with each other.

Further, in the zoom lens system according to Embodiment II-5, the fourth lens unit G4 comprises solely a positive meniscus tenth lens element L10 (most object side lens element (one lens element)) with the convex surface facing the object side.

Moreover, in the zoom lens system according to Embodiment II-5, the fifth lens unit G5 comprises solely a positive meniscus eleventh lens element L11 with the convex surface facing the object side.

In the zoom lens system according to Embodiment II-5, in zooming from a wide-angle limit to a telephoto limit, the first lens unit G1, the third lens unit G3 and the fourth lens unit G4 move to the object side, while the second lens unit G2 moves with locus of a convex to the object side with changing the interval with the first lens unit G1 and the third lens unit G3. The fifth lens unit G5 is fixed relative to the image surface.

Here, as described above, the zoom lens system according to Embodiments II-1 to II-5 comprises a plurality of lens units each consisting of at least one lens element. However, as long as the zoom lens system, in order from the object side to the image side, comprises at least a first lens unit having positive optical power, a second lens unit having negative optical power, a third lens unit having positive optical power and a fourth lens unit having positive optical power, the number of lens units that constitute the zoom lens system is not limited to a particular value. For example, like in Embodiments II-1, II-4 and II-5, only a fifth lens unit having positive optical power may be provided adjacent to the image side of the fourth lens unit. Alternatively, like in Embodiments II-2 and II-3, the fourth lens unit may serve as the most image side lens unit. Yet another configuration may be employed.

In the zoom lens system according to the present invention, from the perspective of more satisfactory compensation of various aberration performances such as distortion and more satisfactory adaptation for wide-angle image taking, it is preferable that the second lens unit, in order from the object side to the image side, comprises at least: a most object side lens element 2a having negative optical power; a lens element 2b having negative optical power; and a lens element 2c having positive optical power, and that the two surfaces of the most object side lens element 2a are aspheric.

In the zoom lens system according to the present invention, from the perspective of more satisfactory compensation of various aberration performances such as distortion and further reduction of the overall length, it is preferable that the image side surface of the most image side lens element of the third lens unit and the object side surface of the most object side lens element of the fourth lens unit are both provided with a shape convex to the object side.

In the zoom lens system according to Embodiments II-1 to II-5, the first lens unit consists of three lens elements. As such, it is preferable that the first lens unit consists of three lens elements. However, the number of lens elements constituting the first lens unit is not limited to three, and may be changed appropriately in accordance with a desired configuration of the entire zoom lens system.

Further, in the zoom lens system according to Embodiments II-1 to II-5, the entire lens system consists of 12 or fewer lens elements, while the first lens unit, the second lens unit and the third lens unit each consists of three or fewer lens elements. This reduces the overall length. Such a zoom lens system realizes particularly thin and compact imaging device and camera.

Further, in the zoom lens system according to Embodiments II-1 to II-5, among a plurality of the lens units, the first lens unit, the second lens unit, the third lens unit and the fourth lens unit are moved in an optical axis direction so that zooming is performed from a wide-angle limit to a telephoto limit at the time of image taking. Among these lens units, for example, the third lens unit moves in a direction perpendicular to the optical axis, so that image blur caused by hand blurring, vibration and the like can be compensated optically.

In the present invention, when the image blur is to be compensated optically, the third lens unit moves in a direction perpendicular to the optical axis as described above, so that image blur is compensated in a state that size increase in the entire zoom lens system is suppressed and a compact construction is realized and that excellent imaging characteristics such as small decentering coma aberration and decentering astigmatism are satisfied.

Conditions are described below that are preferable to be satisfied by a zoom lens system like the zoom lens system according to Embodiments II-1 to II-5, in order from the object side to the image side, comprising at least a first lens unit having positive optical power, a second lens unit having negative optical power, a third lens unit having positive optical power and a fourth lens unit having positive optical power, wherein in zooming from a wide-angle limit to a telephoto limit at the time of image taking, the first lens unit, the second lens unit, the third lens unit and the fourth lens unit move in an optical axis direction. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

For example, in a zoom lens system like the zoom lens system according to Embodiments II-1 to II-5, the following condition (II-1) is satisfied.

$$3.0 < D_{a11}/(f_W \times \tan \omega_W) < 8.0 \quad \text{(II-1)}$$

(here, $9.0 < f_T/f_W < 13.0$ and $35 < \omega_W$)
where,
$D_{a11}$ is an optical axial total thickness of the lens units consisting of the first lens unit, the second lens unit, the third lens unit and the fourth lens unit,
$f_W$ is a focal length of the entire system at a wide-angle limit,
$f_T$ is a focal length of the entire system at a telephoto limit, and
$\omega_W$ is an incident half view angle at a wide-angle limit.

The condition (II-1) relates to the total thickness of the lens units. When the value exceeds the upper limit of the condition (II-1), the total thickness of the lens units increases. This causes difficulty in the size reduction at the time of barrel retraction in particular. In contrast, when the value goes below the lower limit of the condition (II-1), difficulty arises in achieving satisfactory aberration compensation. In particular, the optical power of the third lens unit cannot be ensured sufficiently, and hence spherical aberration increases.

As such, in the zoom lens system according to the present invention, the optical axial total thickness of the lens units consisting of the first lens unit, the second lens unit, the third lens unit and the fourth lens unit is set to fall within an appropriate range. Thus, in contrast to the conventional zoom lens system, the zoom lens system according to the present invention has a reduced overall length, a high resolution, and a variable magnification ratio as high as 9 or greater, more specifically, approximately 9 to 13, and is satisfactorily adaptable for wide-angle image taking where the view angle at a wide-angle limit is 70° or greater, more specifically, approximately 76°.

Here, when at least one of the following conditions (II-1)' and (II-1)" is satisfied, the above-mentioned effect is achieved more successfully.

$$4.0 < D_{a11}/(f_W + \tan \omega_W) \quad \text{(II-1)'}$$

$$D_{a11}/(f_W \times \tan \omega_W) < 6.5 \quad \text{(II-1)''}$$

(here, $9.0 < f_T/f_W < 13.0$ and $35 < \omega_W$)

Further, in a zoom lens system like the zoom lens system according to Embodiments II-1 to II-5 in which the first lens unit consists of three lens elements, it is preferable that the following condition (II-2) is satisfied.

$$1.5 < (D_{1T} - D_{1W})/D_1 < 4.0 \quad \text{(II-2)}$$

(here, $9.0 < f_T/f_W < 13.0$ and $35 < \omega_W$)
where,
$D_{1W}$ is an optical axial distance between the first lens unit and the second lens unit at a wide-angle limit,
$D_{1T}$ is an optical axial distance between the first lens unit and the second lens unit at a telephoto limit,
$D_1$ is an optical axial distance from the most object side surface to the most image side surface of the first lens unit,
$f_W$ is a focal length of the entire system at a wide-angle limit,
$f_T$ is a focal length of the entire system at a telephoto limit, and
$\omega_W$ is an incident half view angle at a wide-angle limit.

The condition (II-2) relates to the movement of the first lens unit. When the value exceeds the upper limit of the condition (II-2), the amount of movement of the first lens unit increases. Further, the overall optical length at a telephoto limit increases. This causes difficulty in size reduction. In contrast, when the value goes below the lower limit of the condition (II-2), the optical power of the first lens unit increases. These cause difficulty in compensation of aberrations such as curvature of field.

Here, when at least one of the following conditions (II-2)' and (II-2)" is satisfied, the above-mentioned effect is achieved more successfully.

$$2.3 < (D_{1T} - D_{1W})/D_1 \quad \text{(II-2)'}$$

$$(D_{1T} - D_{1W})/D_1 < 3.8 \quad \text{(II-2)''}$$

(here, $9.0 < f_T/f_W < 13.0$ and $35 < \omega_W$)

Further, in a zoom lens system like the zoom lens system according to Embodiments II-1 to II-5 in which the image side surface of the most image side lens element of the third lens unit and the object side surface of the most object side lens element of the fourth lens unit are both convex to the object side, it is preferable that the following condition (II-3) is satisfied.

$$0.2 < D_{3W}/D_{3T} < 0.6 \quad \text{(II-3)}$$

(here, $9.0 < f_T/f_W < 13.0$ and $35 < \omega_W$)
where,
$D_{3W}$ is an optical axial distance from a position on the most image side on the optical axis of the third lens unit to a position on the most object side on the optical axis of the fourth lens unit at a wide-angle limit,
$D_{3T}$ is an optical axial distance from a position on the most image side on the optical axis of the third lens unit to a position on the most object side on the optical axis of the fourth lens unit at a telephoto limit,
$f_W$ is a focal length of the entire system at a wide-angle limit,
$f_T$ is a focal length of the entire system at a telephoto limit, and
$\omega_W$ is an incident half view angle at a wide-angle limit.

The condition (II-3) relates to the positional relation between the third lens unit and the fourth lens unit. When the value exceeds the upper limit of the condition (II-3), the overall optical length at a telephoto limit increases, and hence difficulty arises in size reduction. In contrast, when the value goes below the lower limit of the condition (II-3), the amount of movement of the third lens unit increases. Thus, in particular, the overall optical length at a telephoto limit increases. This causes difficulty in size reduction.

Here, when at least one of the following conditions (II-3)' and (II-3)" is satisfied, the above-mentioned effect is achieved more successfully.

$$0.3 < D_{3W}/D_{3T} \quad \text{(II-3)'}$$

$$D_{3W}/D_{3T} < 0.5 \quad \text{(II-3)"}$$

(here, $9.0 < f_T/f_W < 13.0$ and $35 < \omega_W$)

Further, in a zoom lens system like the zoom lens system according to Embodiments II-1 to II-5 in which the third lens unit moves in a direction perpendicular to the optical axis, it is preferable that the entire system satisfies the following conditions (II-4) and (II-5).

$$Y_T > Y \quad \text{(II-4)}$$

$$1.0 < (Y/Y_T)/(f/f_T) < 2.0 \quad \text{(II-5)}$$

(here, $9.0 < f_T/f_W < 13.0$ and $35 < \omega_W$)
where,

Y is an amount of movement in a direction perpendicular to the optical axis at the time of maximum blur compensation in the third lens unit with a focal length f of the entire system, $Y_T$ is an amount of movement in a direction perpendicular to the optical axis at the time of maximum blur compensation in the third lens unit with a focal length $f_T$ of the entire system at a telephoto limit, f is a focal length of the entire system, $f_W$ is a focal length of the entire system at a wide-angle limit, $f_T$ is a focal length of the entire system at a telephoto limit, and $\omega_W$ is an incident half view angle at a wide-angle limit.

The conditions (II-4) and (II-5) relate to the amount of movement at the time of maximum blur compensation in the third lens unit that moves in a direction perpendicular to the optical axis. In the case of a zoom lens system, when the compensation angle is constant over the entire zoom range, a larger zoom ratio requires a larger amount of movement of the lens unit or the lens element that moves in a direction perpendicular to the optical axis. On the contrary, a smaller zoom ratio requires merely a smaller amount of movement of the lens unit or the lens element that moves in a direction perpendicular to the optical axis. When the condition (II-4) is not satisfied, alternatively when the value exceeds the upper limit of the condition (II-5), blur compensation becomes excessive. This causes a possibility of enhanced degradation in the optical performance. In contrast, when the value goes below the lower limit of the condition (II-5), a possibility of insufficient blur compensation arises.

Here, when at least one of the following conditions (II-5)' and (II-5)" is satisfied, the above-mentioned effect is achieved more successfully.

$$1.2 < (Y/Y_T)/(f/f_T) \quad \text{(II-5)'}$$

$$(Y/Y_T)/(f/f_T) < 1.5 \quad \text{(II-5)"}$$

(here, $9.0 < f_T/f_W < 13.0$ and $35 < \omega_W$)

Here, as described above, each zoom lens system according to Embodiments II-1, II-4 and II-5 is a zoom lens system that has a five-unit construction of positive, negative, positive, positive and positive, and that, in order from the object side to the image side, comprises: a first lens unit G1 having positive optical power; a second lens unit G2 having negative optical power; a diaphragm A; a third lens unit G3 having positive optical power; a fourth lens unit G4 having positive optical power; and a fifth lens unit G5 having positive optical power. Further, as described above, each zoom lens system according to Embodiments II-2 and II-3 is a zoom lens system that has a four-unit construction of positive, negative, positive and positive, and that, in order from the object side to the image side, comprises: a first lens unit G1 having positive optical power; a second lens unit G2 having negative optical power; a diaphragm A; a third lens unit G3 having positive optical power; and a fourth lens unit G4 having positive optical power. However, the present invention is not limited to these configurations. For example, various constructions like a five-unit construction of positive, negative, positive, positive and negative may be employed that comprise at least: a first lens unit having positive optical power; a second lens unit having negative optical power; a third lens unit having positive optical power; and a fourth lens unit having positive optical power. Such a zoom lens system can be used suitably, for example, in a digital still camera according to Embodiment II-6 described later and in an imaging device employed in this.

Here, the lens units constituting the zoom lens system according to Embodiments I-1 to I-4 consist exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Embodiment II-6

Figure 29:
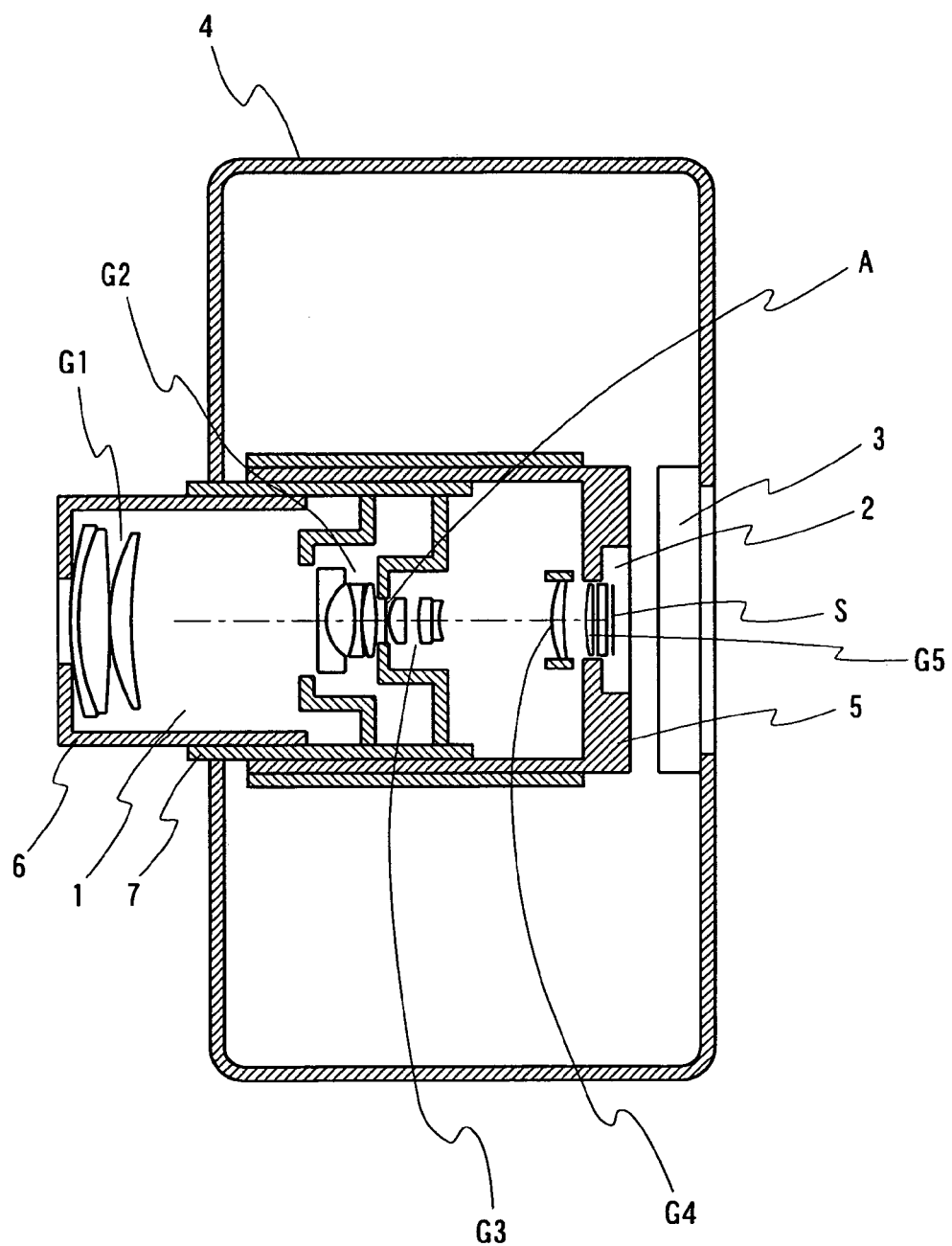
FIG. 29 is a schematic construction diagram of a digital still camera according to Embodiment II-6.

FIG. 29 is a schematic construction diagram of a digital still camera according to Embodiment II-6. In FIG. 29, the digital still camera comprises: an imaging device having a zoom lens system 1 and an image sensor 2 consisting of a CCD; a liquid crystal display monitor 3; and a body 4. The employed zoom lens system 1 is a zoom lens system according to Embodiment II-1. In FIG. 29, the zoom lens system 1 comprises a first lens unit G1, a second lens unit G2, a diaphragm A, a third lens unit G3, a fourth lens unit G4 and a fifth lens unit G5. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the third lens unit G3 and the fourth lens unit G4 move to predetermined positions relative to the image sensor 2, so that magnification change can be achieved ranging from a wide-angle limit to a telephoto limit. The fourth lens unit G4 is movable in an optical axis direction by a motor for focus adjustment.

As such, the zoom lens system according to Embodiment II-1 is employed in a digital still camera, a small digital still camera is obtained that has a high resolution and high capability of correcting the curvature of field and that has a short overall optical length at the time of non-use. Here, in the digital still camera shown in FIG. 29, any one of the zoom lens systems according to Embodiments II-2 to II-5 may be employed in place of the zoom lens system according to Embodiment II-1. Further, the optical system of the digital still camera shown in FIG. 29 is applicable also to a digital video camera for moving images. In this case, moving images with high resolution can be acquired in addition to still images.

Further, an imaging device comprising a zoom lens system according to Embodiments II-1 to II-5 described above and an image sensor such as a CCD or a CMOS may be applied to a mobile telephone, a PDA (Personal Digital Assistance), a surveillance camera in a surveillance system, a Web camera, a vehicle-mounted camera or the like.

Embodiments III-1 to III-6

Figure 30:
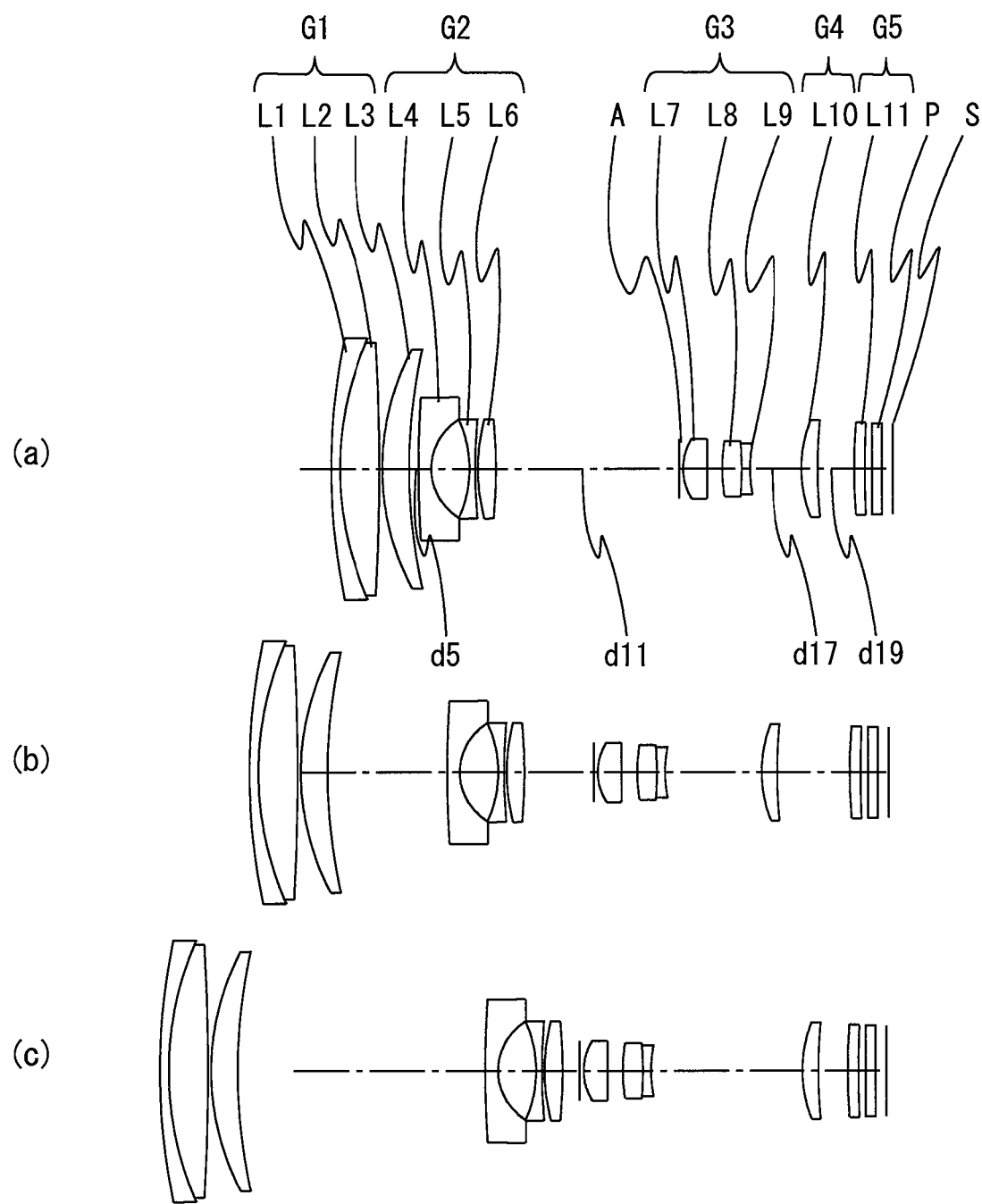
FIG. 30(a) is a lens arrangement diagram showing an infinity in-focus condition at a wide-angle limit of a zoom lens system according to Embodiment III-1 (Example III-1)
FIG. 30(b) is a lens arrangement diagram showing an infinity in-focus condition at a middle position (an intermediate focal length condition) of a zoom lens system according to Embodiment III-1 (Example III-1)
FIG. 30(c) is a lens arrangement diagram showing an infinity in-focus condition at a telephoto limit of a zoom lens system according to Embodiment III-1 (Example III-1)
Figure 33:
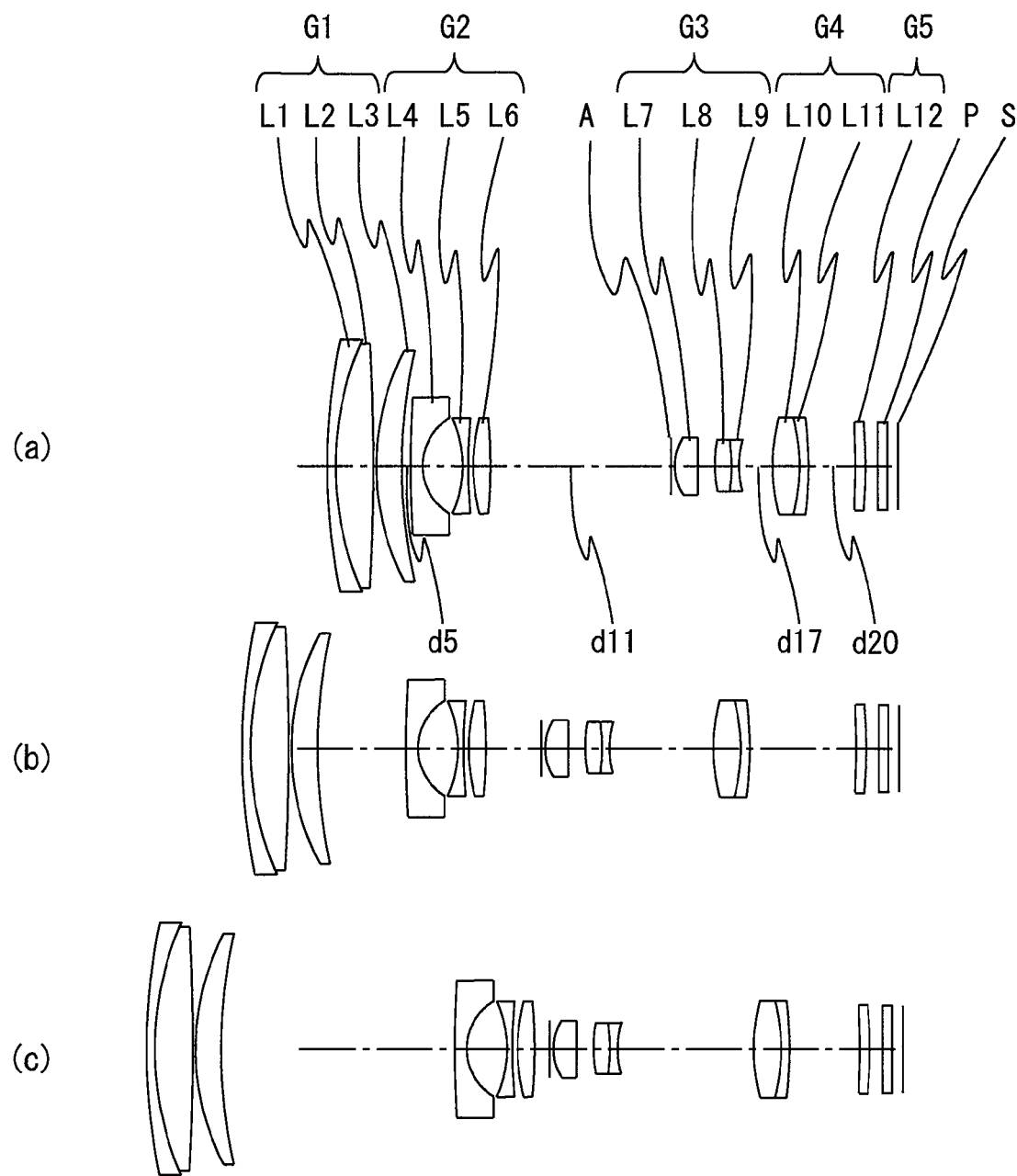
FIG. 33(a) is a lens arrangement diagram showing an infinity in-focus condition at a wide-angle limit of a zoom lens system according to Embodiment III-2 (Example III-2)
FIG. 33(b) is a lens arrangement diagram showing an infinity in-focus condition at a middle position (an intermediate focal length condition) of a zoom lens system according to Embodiment III-2 (Example III-2)
FIG. 33(c) is a lens arrangement diagram showing an infinity in-focus condition at a telephoto limit of a zoom lens system according to Embodiment III-2 (Example III-2)
Figure 36:
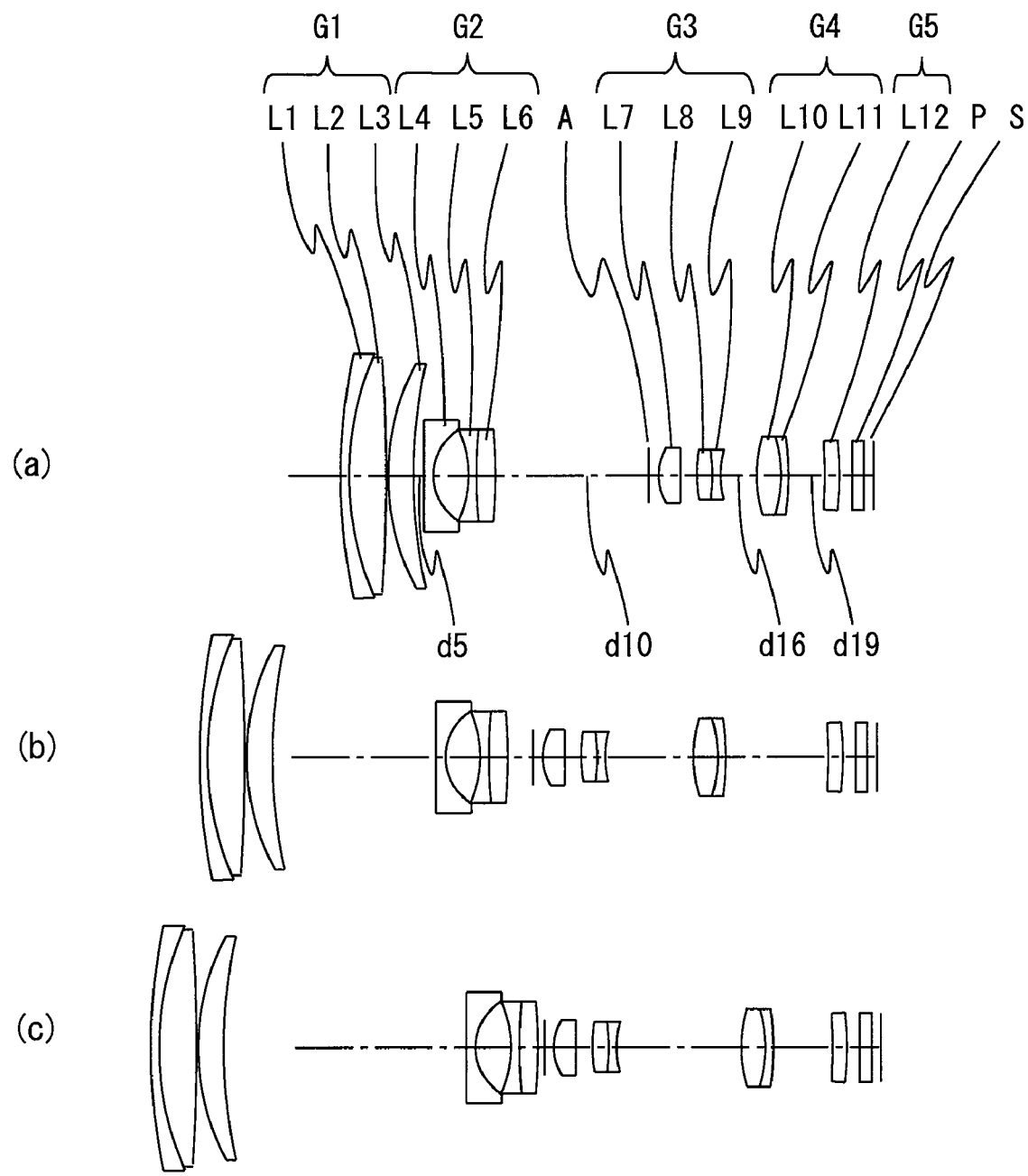
FIG. 36(a) is a lens arrangement diagram showing an infinity in-focus condition at a wide-angle limit of a zoom lens system according to Embodiment III-3 (Example III-3)
FIG. 36(b) is a lens arrangement diagram showing an infinity in-focus condition at a middle position (an intermediate focal length condition) of a zoom lens system according to Embodiment III-3 (Example III-3)
FIG. 36(c) is a lens arrangement diagram showing an infinity in-focus condition at a telephoto limit of a zoom lens system according to Embodiment III-3 (Example III-3)
Figure 39:
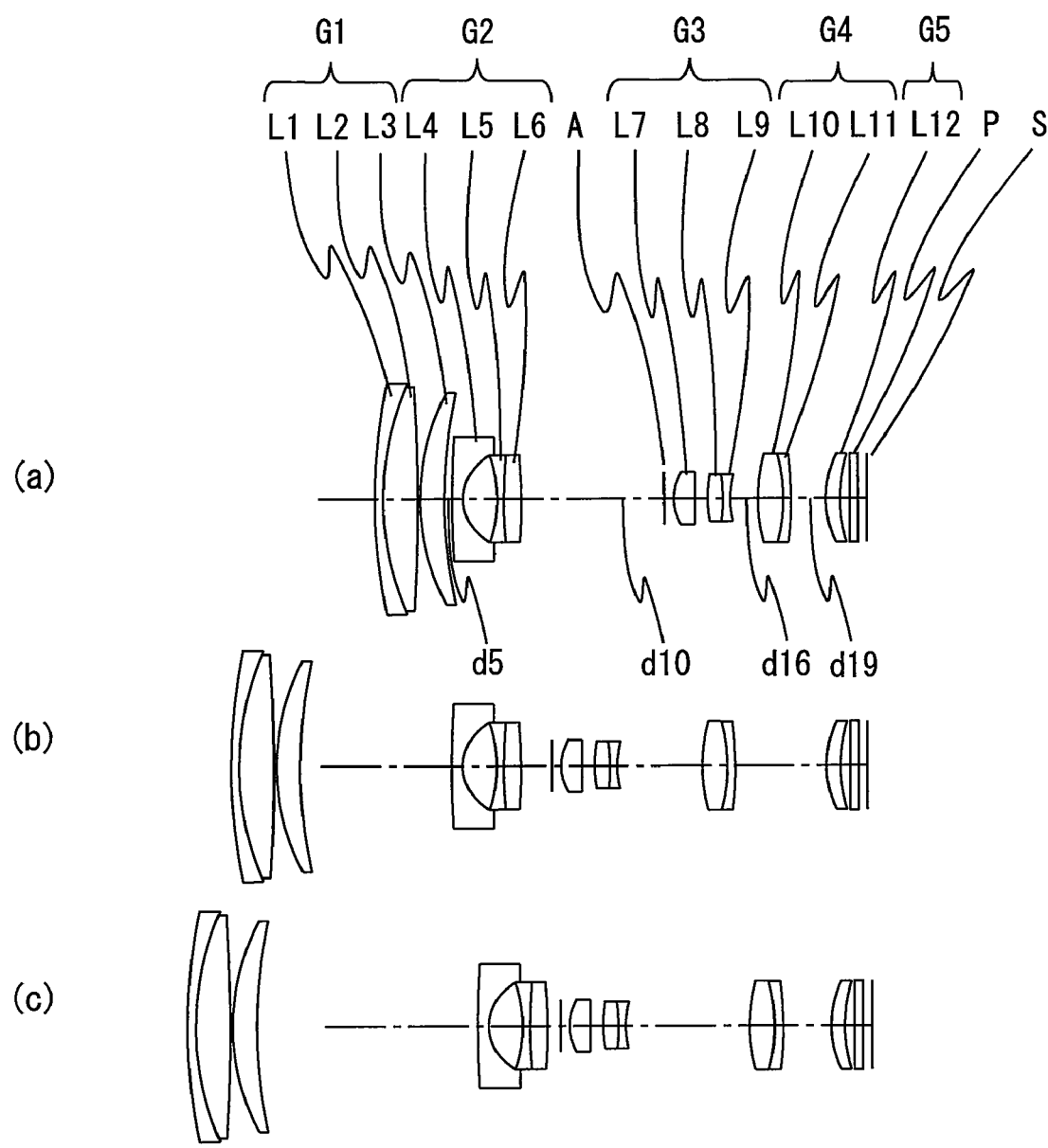
FIG. 39(a) is a lens arrangement diagram showing an infinity in-focus condition at a wide-angle limit of a zoom lens system according to Embodiment III-4 (Example III-4)
FIG. 39(b) is a lens arrangement diagram showing an infinity in-focus condition at a middle position (an intermediate focal length condition) of a zoom lens system according to Embodiment III-4 (Example III-4)
FIG. 39(c) is a lens arrangement diagram showing an infinity in-focus condition at a telephoto limit of a zoom lens system according to Embodiment III-4 (Example III-4)
Figure 42:
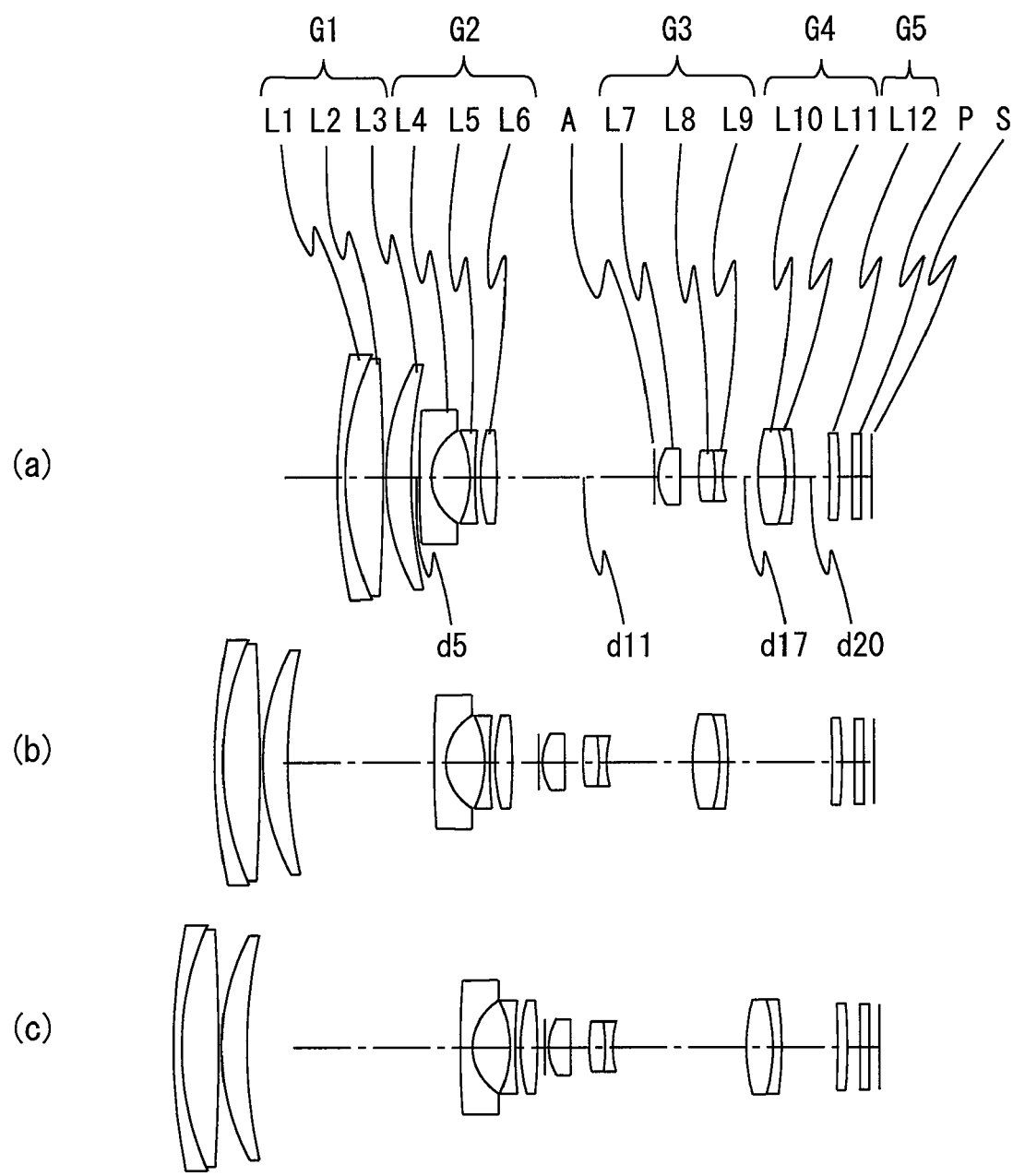
FIG. 42(a) is a lens arrangement diagram showing an infinity in-focus condition at a wide-angle limit of a zoom lens system according to Embodiment III-5 (Example III-5)
FIG. 42(b) is a lens arrangement diagram showing an infinity in-focus condition at a middle position (an intermediate focal length condition) of a zoom lens system according to Embodiment III-5 (Example III-5)
FIG. 42(c) is a lens arrangement diagram showing an infinity in-focus condition at a telephoto limit of a zoom lens system according to Embodiment III-5 (Example III-5)
Figure 45:
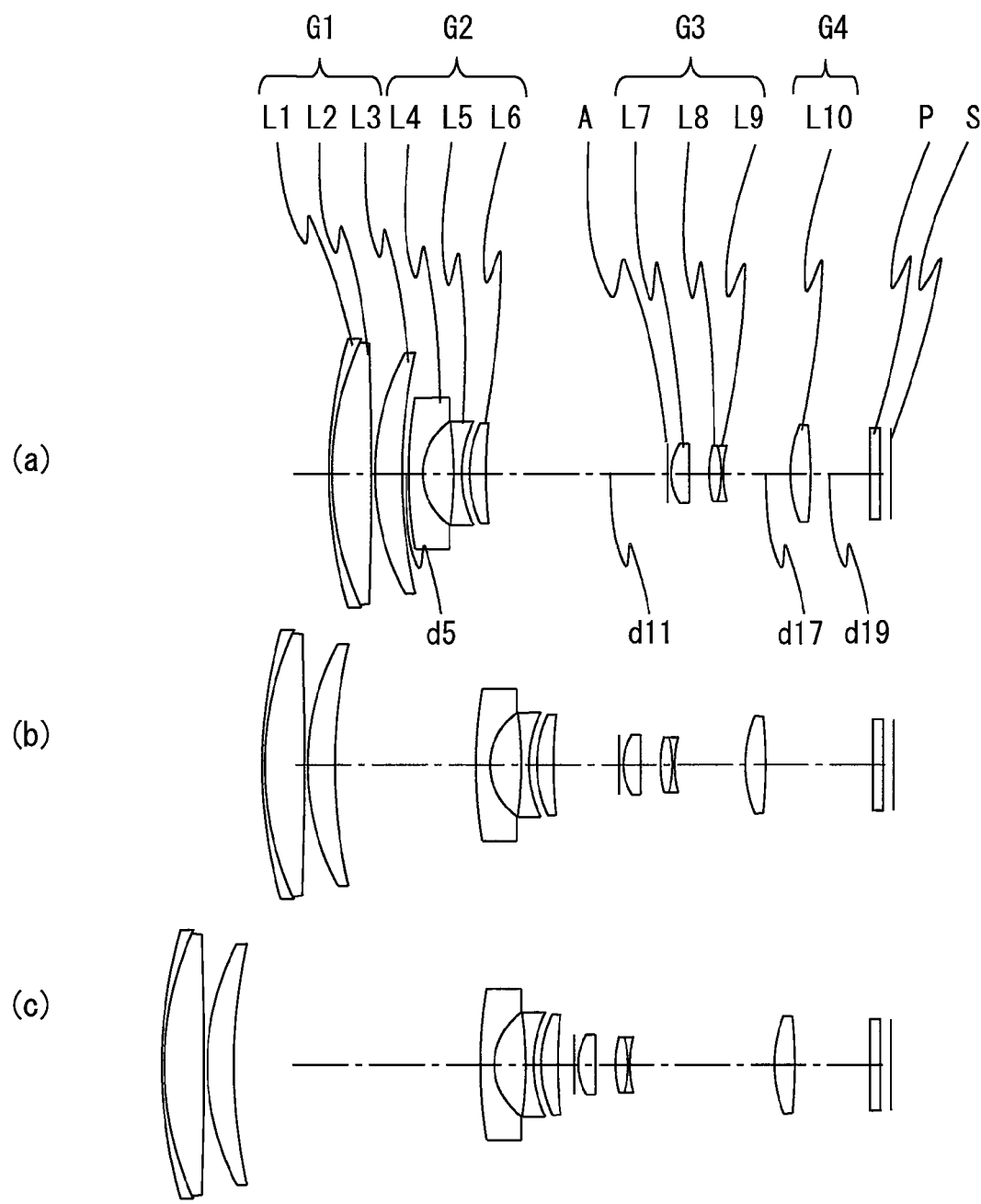
FIG. 45(a) is a lens arrangement diagram showing an infinity in-focus condition at a wide-angle limit of a zoom lens system according to Embodiment III-6 (Example III-6)
FIG. 45(b) is a lens arrangement diagram showing an infinity in-focus condition at a middle position (an intermediate focal length condition) of a zoom lens system according to Embodiment III-6 (Example III-6)
FIG. 45(c) is a lens arrangement diagram showing an infinity in-focus condition at a telephoto limit of a zoom lens system according to Embodiment III-6 (Example III-6)

FIG. 30 is a lens arrangement diagram of a zoom lens system according to Embodiment III-1. FIG. 33 is a lens arrangement diagram of a zoom lens system according to Embodiment III-2. FIG. 36 is a lens arrangement diagram of a zoom lens system according to Embodiment III-3. FIG. 39 is a lens arrangement diagram of a zoom lens system according to Embodiment III-4. FIG. 42 is a lens arrangement diagram of a zoom lens system according to Embodiment III-5. FIG. 45 is a lens arrangement diagram of a zoom lens system according to Embodiment III-6. In FIGS. 30, 33, 36, 39, 42 and 45, part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$).

Each zoom lens system according to Embodiments III-1 to III-5, in order from the object side to the image side, comprises: a first lens unit G1 having positive optical power; a second lens unit G2 having negative optical power; a diaphragm A; a third lens unit G3 having positive optical power; a fourth lens unit G4 having positive optical power; and a fifth lens unit G5 having positive optical power. Further, the zoom lens system according to Embodiment III-6, in order from the object side to the image side, comprises: a first lens unit G1 having positive optical power; a second lens unit G2 having negative optical power; a diaphragm A; a third lens unit G3 having positive optical power; and a fourth lens unit G4 having positive optical power. In FIGS. 30, 33, 36, 39, 42 and 45, the straight line located on the most right-hand side indicates the position of an image surface S. On the object side relative to this, a plane parallel plate P such as an optical low-pass filter, a face plate of an image sensor or the like is provided. In the zoom lens system according to Embodiments III-1 to III-6, these lens units are arranged in a desired optical power construction, so that a high variable magnification ratio of 9 or greater, more specifically, approximately 9 to 13, is achieved. As such, with maintaining high optical performance, size reduction is realized in the entire lens system.

As shown in FIG. 30, in the zoom lens system according to Embodiment III-1, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment III-1, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment III-1, the third lens unit G3, in order from the object side to the image side, comprises: a positive meniscus seventh lens element L7 (most object side lens element 3a) with the convex surface facing the object side; a bi-convex eighth lens element L8; and a bi-concave ninth lens element L9. Among these, the eighth lens element L8 and the ninth lens element L9 are cemented with each other.

Moreover, in the zoom lens system according to Embodiment III-1, the fourth lens unit G4 comprises solely a positive meniscus tenth lens element L10 with the convex surface facing the object side.

Moreover, in the zoom lens system according to Embodiment III-1, the fifth lens unit G5 comprises solely a negative meniscus eleventh lens element L11 with the convex surface facing the object side.

In the zoom lens system according to Embodiment III-1, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit, and while the fourth lens unit G4 moves with locus of a convex to the object side with changing the interval with the third lens unit G3. The fifth lens unit G5 is fixed relative to the image surface.

As shown in FIG. 33, in the zoom lens system according to Embodiment III-2, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment III-2, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment III-2, the third lens unit G3, in order from the object side to the image side, comprises: a positive meniscus seventh lens element L7 (most object side lens element 3a) with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment III-2, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Moreover, in the zoom lens system according to Embodiment III-2, the fifth lens unit G5 comprises solely a positive meniscus twelfth lens element L12 with the convex surface facing the image side.

In the zoom lens system according to Embodiment III-2, in zooming from a wide-angle limit to a telephoto limit, the first lens unit G1 moves to the object side, while the second lens unit G2 moves to the image side, that is, such that the position at a wide-angle limit should be located on the object side relative to the position at a telephoto limit. The third lens unit G3 moves to the object side, and then is approximately fixed relative to the image surface. The fourth lens unit G4 moves with locus of a convex to the object side with changing the interval with the third lens unit G3. The fifth lens unit G5 is fixed relative to the image surface.

As shown in FIG. 36, in the zoom lens system according to Embodiment III-3, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

Further, in the zoom lens system according to Embodiment III-3, the second lens unit G2, in order from the object side to the image side, comprises: a negative meniscus fourth lens element L4 with the convex surface facing the object side; a bi-concave fifth lens element L5; and a bi-convex sixth lens element L6. Among these, the fifth lens element L5 and the sixth lens element L6 are cemented with each other.

Further, in the zoom lens system according to Embodiment III-3, the third lens unit G3, in order from the object side to the image side, comprises: a positive meniscus seventh lens element L7 (most object side lens element 3a) with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment III-3, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Further, in the zoom lens system according to Embodiment III-3, the fifth lens unit G5 comprises solely a bi-convex twelfth lens element L12.

In the zoom lens system according to Embodiment III-3, in zooming from a wide-angle limit to a telephoto limit, the first lens unit G1 moves to the object side, while the second lens unit G2 moves to the image side, that is, such that the position at a wide-angle limit should be located on the object side relative to the position at a telephoto limit. The third lens unit G3 moves to the object side, and then is approximately fixed relative to the image surface. The fourth lens unit G4 moves with locus of a convex to the object side with changing the interval with the third lens unit G3. The fifth lens unit G5 is fixed relative to the image surface.

As shown in FIG. 39, in the zoom lens system according to Embodiment III-4, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

Further, in the zoom lens system according to Embodiment III-4, the second lens unit G2, in order from the object side to the image side, comprises: a negative meniscus fourth lens element L4 with the convex surface facing the object side; a bi-concave fifth lens element L5; and a bi-convex sixth lens element L6. Among these, the fifth lens element L5 and the sixth lens element L6 are cemented with each other.

Further, in the zoom lens system according to Embodiment III-4, the third lens unit G3, in order from the object side to the image side, comprises: a bi-convex seventh lens element L7 (most object side lens element 3a); a positive meniscus eighth lens element L8 with the convex surface facing the object side; and a negative meniscus ninth lens element L9 with the convex surface facing the object side. Among these, the eighth lens element L8 and the ninth lens element L9 are cemented with each other.

Further, in the zoom lens system according to Embodiment III-4, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Further, in the zoom lens system according to Embodiment III-4, the fifth lens unit G5 comprises solely a bi-convex twelfth lens element L12.

In the zoom lens system according to Embodiment III-4, in zooming from a wide-angle limit to a telephoto limit, the first lens unit G1 moves to the object side, while the second lens unit G2 moves to the image side, that is, such that the position at a wide-angle limit should be located on the object side relative to the position at a telephoto limit. The third lens unit G3 moves to the object side, and then is approximately fixed relative to the image surface. The fourth lens unit G4 moves with locus of a convex to the object side with changing the interval with the third lens unit G3. The fifth lens unit G5 is fixed relative to the image surface.

As shown in FIG. 42, in the zoom lens system according to Embodiment III-5, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment III-5, the second lens unit G2, in order from the object side to the image side, comprises: a planer-concave fourth lens element L4 with the concave surface facing the image side; a bi-concave fifth lens element L5; and a bi-convex sixth lens element L6.

Further, in the zoom lens system according to Embodiment III-5, the third lens unit G3, in order from the object side to the image side, comprises: a positive meniscus seventh lens element L7 (most object side lens element 3a) with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment III-5, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Moreover, in the zoom lens system according to Embodiment III-5, the fifth lens unit G5 comprises solely a positive meniscus twelfth lens element L12 with the convex surface facing the image side.

In the zoom lens system according to Embodiment III-5, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit, and while the fourth lens unit G4 moves with locus of a convex to the object side with changing the interval with the third lens unit G3. The fifth lens unit G5 is fixed relative to the image surface.

As shown in FIG. 45, in the zoom lens system according to Embodiment III-6, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiment III-6, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiment III-6, the third lens unit G3, in order from the object side to the image side, comprises: a positive meniscus seventh lens element L7 (most object side lens element 3a) with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment III-6, the fourth lens unit G4 comprises solely a bi-convex tenth lens element L10.

In the zoom lens system according to Embodiment III-6, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As described above, the zoom lens system according to Embodiments III-1 to III-6 has a plurality of lens units each consisting of at least one lens element. However, as long as the zoom lens system, in order from the object side to the image side, comprises a first lens unit having positive optical power, a second lens unit having negative optical power, a third lens unit having positive optical power and a subsequent lens unit that includes at least one lens unit having positive optical power, the number of lens units constituting the zoom lens system is not limited to a specific value. For example, like in Embodiments III-1 to III-5, the subsequent lens unit may comprise a fourth lens unit having positive optical power and a fifth lens unit having positive optical power. Alternatively, like in Embodiment III-6, the subsequent lens unit may solely comprise a fourth lens unit having positive optical power. Yet another configuration may be employed.

In the zoom lens system according to the present invention, the third lens unit consists of a plurality of lens elements. Then, from the perspective that the later-described spherical aberration generated in the most object side lens element 3a having positive optical power can be compensated more satisfactory, it is preferable that at least one of the intervals between these lens elements is an air space. Further, it is more preferable that the third lens unit, in order from the object side to the image side, comprises: a most object side lens element 3a having positive optical power; and at least one subsequent lens element. Further, it is more preferable that two subsequent lens elements are employed. Further, like in the zoom lens system according to Embodiments III-1 to III-6, it is preferable that the subsequent lens elements in the third lens unit are two lens elements consisting of, in order from the object side to the image side, a lens element having positive optical power and a lens element having negative optical power. Further, it is more preferable that the lens element having positive optical power and the lens element having negative optical power are cemented with each other.

Further, in the zoom lens system according to the present invention, from the perspective of more satisfactory aberration compensation, it is preferable that the third lens unit includes at least one lens element having an aspheric surface.

Here, in the zoom lens system according to Embodiments III-1 to III-6, the first lens unit and the second lens unit each consists of three lens elements. However, the number of lens elements constituting the first lens unit and the second lens unit is not limited to three, and may be changed appropriately in accordance with the desired configuration of the entire zoom lens system.

Further, in the zoom lens system according to Embodiments III-1 to III-6, among a plurality of the lens units, the first lens unit, the second lens unit, the third lens unit and the fourth lens unit are moved in an optical axis direction so that zooming is performed from a wide-angle limit to a telephoto limit at the time of image taking. Among these lens units, for example, the third lens unit moves in a direction perpendicular to the optical axis, so that image blur caused by hand blurring, vibration and the like can be compensated optically.

In the present invention, when the image blur is to be compensated optically, the third lens unit moves in a direction perpendicular to the optical axis as described above, so that image blur is compensated in a state that size increase in the entire zoom lens system is suppressed and a compact construction is realized and that excellent imaging characteristics such as small decentering coma aberration and decentering astigmatism are satisfied.

Conditions are described below that are preferable to be satisfied by a zoom lens system like the zoom lens system according to Embodiments III-1 to III-6, in order from the object side to the image side, comprising a first lens unit having positive optical power, a second lens unit having negative optical power, a third lens unit having positive optical power and a subsequent lens unit that includes at least one lens unit having positive optical power, wherein in zooming from a wide-angle limit to a telephoto limit at the time of image taking, at least the first lens unit, the second lens unit and the third lens unit move in an optical axis direction while the second lens unit moves such that the position at a wide-angle limit is located on the object side relative to the position at a telephoto limit. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

For example, in a zoom lens system like the zoom lens system according to Embodiments III-1 to III-6, the following conditions (III-1) and (III-2) are satisfied.

$$1.0 < f_W \cdot f_3/(f_W \times \tan \omega_W)^2 < 5.0 \quad \text{(III-1)}$$

$$0.1 < f_3/f_T < 0.4 \quad \text{(III-2)}$$

(here, $Z = f_T/f_W > 9.0$)
where,
$f_3$ is a composite focal length of the third lens unit,
$f_W$ is a focal length of the entire system at a wide-angle limit,
$f_T$ is a focal length of the entire system at a telephoto limit, and
$\omega_W$ is an incident half view angle at a wide-angle limit.

The conditions (III-1) and (III-2) relate to the focal length of the third lens unit. When the value exceeds the upper limit of any one of the conditions (III-1) and (III-2), the amount of movement of the lens unit during focusing becomes large. In contrast, when the value goes below the lower limit of any one of the conditions (III-1) and (III-2), aberration generated in the third lens unit becomes excessive, and hence spherical aberration generated in the entire zoom lens system cannot be compensated.

As such, in the zoom lens system according to the present invention, the focal length of the third lens unit is set to fall within an appropriate range. Thus, in contrast to the conventional zoom lens system, the zoom lens system according to the present invention has a reduced overall length, a high resolution, and a variable magnification ratio as high as 9 or greater, more specifically, approximately 9 to 13, and is satisfactorily adaptable for wide-angle image taking where the view angle at a wide-angle limit is 70° or greater, more specifically, approximately 76°.

Here, when at least one of the following conditions (III-1)' and (III-1)" is satisfied, the above-mentioned effect is achieved more successfully. Further, when at least one of the following conditions (III-2)' and (III-2)" is satisfied, the above-mentioned effect is achieved more successfully.

$$3.5 < f_W \cdot f_3/(f_W \times \tan \omega_W)^2 \quad \text{(III-1)'}$$

$$f_W \cdot f_3/(f_W \times \tan \omega_W)^2 < 4.5 \quad \text{(III-1)"}$$

$$0.21 < f_3/f_T \quad \text{(III-2)'}$$

$$f_3/f_T < 0.29 \quad \text{(III-2)"}$$

(here, $Z = f_T/f_W > 9.0$)

Further, in a zoom lens system like the zoom lens system according to Embodiments III-1 to III-5 in which the third lens unit, in order from the object side to the image side, comprises: a most object side lens element 3a having positive optical power; and at least one subsequent lens element, it is preferable that the following condition (III-3) is satisfied.

$$0.5 < f_{3a}/f_3 < 1.0 \quad \text{(III-3)}$$

where,
$f_{3a}$ is a focal length of the most object side lens element 3a, and
$f_3$ is a composite focal length of the third lens unit.

The condition (III-3) relates to the focal length of the most object side lens element 3a of the third lens unit. When the value exceeds the upper limit of the condition (III-3), the optical power of the most object side lens element 3a in the third lens unit decreases relatively. Thus, in particular, compensation of coma aberration becomes difficult. In contrast, when the value goes below the lower limit of the condition (III-3), the optical power of the lens element 3a in the third lens unit increases relatively, and hence compensation of coma aberration and magnification chromatic aberration becomes difficult.

Here, when at least one of the following conditions (III-3)' and (III-3)" is satisfied, the above-mentioned effect is achieved more successfully.

$$0.7 < f_{3a}/f_3 \quad \text{(III-3)'}$$

$$f_{3a}/f_3 < 0.9 \quad \text{(III-3)"}$$

Further, in a zoom lens system like the zoom lens system according to Embodiments III-1 to III-5 in which the third lens unit, in order from the object side to the image side, comprises: a most object side lens element 3a having positive optical power; and at least one subsequent lens element, it is preferable that the following condition (III-4) is satisfied.

$$0.3 < R_{3a}/f_3 < 0.5 \quad \text{(III-4)}$$

where,
$R_{3a}$ is a radius of curvature of the object side lens surface of the most object side lens element 3a, and
$f_3$ is a composite focal length of the third lens unit.

The condition (III-4) relates to the radius of curvature of the most object side lens element 3a of the third lens unit. When the value exceeds the upper limit of the condition (III-4), the generated amount of coma aberration increases, and hence its compensation becomes difficult. In contrast, when the value goes below the lower limit of the condition (III-4), the generated amount of magnification chromatic aberration increases, and hence its compensation becomes difficult.

Here, when at least one of the following conditions (III-4)' and (III-4)" is satisfied, the above-mentioned effect is achieved more successfully.

$$0.34 < R_{3a}/f_3 \quad \text{(III-4)'}$$

$$R_{3a}/f_3 < 0.46 \quad \text{(III-4)"}$$

Further, in a zoom lens system like the zoom lens system according to Embodiments III-1 to III-5 in which the third lens unit, in order from the object side to the image side, comprises: a most object side lens element 3a having positive optical power; and at least two subsequent lens elements, it is preferable that the following condition (III-5) is satisfied.

$$-0.6 < f_{3a}/f_{3b} < -0.3 \quad \text{(III-5)}$$

where,
$f_{3a}$ is a focal length of the most object side lens element 3a, and
$f_{3b}$ is a composite focal length of the subsequent lens elements.

The condition (III-5) relates to the ratio between the focal length of the most object side lens element 3a and the composite focal length of the subsequent lens elements in the third lens unit. When the value exceeds the upper limit of the condition (III-5), the generated amount of coma aberration increases, and hence its compensation becomes difficult. In contrast, when the value goes below the lower limit of the condition (III-5), the generated amount of magnification chromatic aberration increases in addition to the generated amount of coma aberration, and hence their compensation becomes difficult.

Here, when at least one of the following conditions (III-5)' and (III-5)" is satisfied, the above-mentioned effect is achieved more successfully.

$$-0.33 < f_{3a}/f_{3b} < -0.3 \quad \text{(III-5)'}$$

$$-0.6 < f_{3a}/f_{3b} < -0.43 \quad \text{(III-5)"}$$

For example, in a zoom lens system like the zoom lens system according to Embodiment III-6 in which the subsequent lens unit comprises solely a fourth lens unit having positive optical power, it is preferable that the following condition (III-6-1) is satisfied.

$$1.0<(D_{3T}/D_{3W})/(D_{4T}/D_{4W})<5.0 \tag{III-6-1}$$

(here, $Z=f_T/f_W>9.0$)

where, $D_{3W}$ is an optical axial distance between the third lens unit and the fourth lens unit at a wide-angle limit, $D_{3T}$ is an optical axial distance between the third lens unit and the fourth lens unit at a telephoto limit, $D_{4W}$ is an optical axial distance between the fourth lens unit and an optical element having no optical power located on the image side of the fourth lens unit at a wide-angle limit, $D_{4T}$ is an optical axial distance between the fourth lens unit and an optical element having no optical power located on the image side of the fourth lens unit at a telephoto limit, $f_W$ is a focal length of the entire system at a wide-angle limit, and $f_T$ is a focal length of the entire system at a telephoto limit.

The condition (III-6-1) relates to the positional relations between the third lens unit and the fourth lens unit and between the fourth lens unit and the optical element having no optical power located on the image side of the fourth lens unit. When the value exceeds the upper limit of the condition (III-6-1), the amount of movement of the third lens unit increases. Thus, in particular, the overall optical length at a telephoto limit increases. This causes difficulty in size reduction. In contrast, when the value goes below the lower limit of the condition (III-6-1), the amount of movement of the fourth lens unit increases, and hence the optical power decreases. This causes a possibility that the amount of movement of the lens unit increases during focusing.

When the following condition (III-6-1)' is satisfied, the above-mentioned effect is achieved more successfully.

$$(D_{3T}/D_{3W})/(D_{4T}/D_{4W})<2.0 \tag{III-6-1}'$$

(here, $Z=f_T/f_W>9.0$)

Further, in a zoom lens system like the zoom lens system according to Embodiments III-1 to III-5 in which the subsequent lens unit comprises a fourth lens unit having positive optical power and a fifth lens unit having positive optical power, it is preferable that the following condition (III-6-2) is satisfied.

$$1.0<(D_{3T}/D_{3W})/(D_{4T}/D_{4W})<5.0 \tag{III-6-2}$$

(here, $Z=f_T/f_W>9.0$)

where, $D_{3W}$ is an optical axial distance between the third lens unit and the fourth lens unit at a wide-angle limit, $D_{3T}$ is an optical axial distance between the third lens unit and the fourth lens unit at a telephoto limit, $D_{4W}$ is an optical axial distance between the fourth lens unit and the fifth lens unit at a wide-angle limit, $D_{4T}$ is an optical axial distance between the fourth lens unit and the fifth lens unit at a telephoto limit, $f_W$ is a focal length of the entire system at a wide-angle limit, and $f_T$ is a focal length of the entire system at a telephoto limit.

The condition (III-6-2) relates to the positional relations between the third lens unit and the fourth lens unit and between the fourth lens unit and the fifth lens unit. When the value exceeds the upper limit of the condition (III-6-2), the amount of movement of the third lens unit increases. Thus, in particular, the overall optical length at a telephoto limit increases. This causes difficulty in size reduction. In contrast, when the value goes below the lower limit of the condition (III-6-2), the amount of movement of the fourth lens unit increases, and hence the optical power decreases. This causes a possibility that the amount of movement of the lens unit increases during focusing.

Here, when at least one of the following conditions (III-6-2)' and (III-6-2)" is satisfied, the above-mentioned effect is achieved more successfully.

$$2.0<(D_{3T}/D_{3W})/(D_{4T}/D_{4W}) \tag{III-6-2}'$$

$$(D_{3T}/D_{3W})/(D_{4T}/D_{4W})<4.0 \tag{III-6-2}''$$

(here, $Z=f_T/f_W>9.0$)

Further, in a zoom lens system like the zoom lens system according to Embodiments III-1 to III-5 in which the first lens unit consists of three lens elements, it is preferable that the following condition (III-7) is satisfied.

$$2.0<(D_{1T}-D_{1W})/D_1<3.5 \tag{III-7}$$

(here, $Z=f_T/f_W>9.0$)

where, $D_{1W}$ is an optical axial distance between the first lens unit and the second lens unit at a wide-angle limit, $D_{1T}$ is an optical axial distance between the first lens unit and the second lens unit at a telephoto limit, $D_1$ is an optical axial distance from the most object side surface to the most image side surface of the first lens unit, $f_W$ is a focal length of the entire system at a wide-angle limit, and $f_T$ is a focal length of the entire system at a telephoto limit.

The condition (III-7) relates to the movement of the first lens unit. When the value exceeds the upper limit of the condition (III-7), the amount of movement of the first lens unit increases. Further, the overall optical length at a telephoto limit increases. These cause difficulty in size reduction. In contrast, when the value goes below the lower limit of the condition (III-7), the optical power of the first lens unit increases. This causes difficulty in compensation of aberrations such as curvature of field.

Here, when at least one of the following conditions (III-7)' and (III-7)" is satisfied, the above-mentioned effect is achieved more successfully.

$$2.6<(D_{1T}-D_{1W})/D_1 \tag{III-7}'$$

$$(D_{1T}-D_{1W})/D_1<3.2 \tag{III-7}''$$

(here, $Z=f_T/f_W>9.0$)

Further, in a zoom lens system like the zoom lens system according to Embodiments III-1 to III-5 in which the third lens unit moves in a direction perpendicular to the optical axis, it is preferable that the entire system satisfies the following conditions (III-8) and (III-9).

$$Y_T>Y \tag{III-8}$$

$$1.0<(Y/Y_T)/(f/f_T)<2.0 \tag{III-9}$$

(here, $Z=f_T/f_W>9.0$)

where, f is a focal length of the entire system, $f_T$ is a focal length of the entire system at a telephoto limit, Y is an amount of movement in a direction perpendicular to the optical axis at the time of maximum blur compensation in the third lens unit with a focal length f of the entire system, $Y_T$ is an amount of movement in a direction perpendicular to the optical axis at the time of maximum blur compensation in the third lens unit with a focal length $f_T$ of the entire system at a telephoto limit, and $f_W$ is a focal length of the entire system at a wide-angle limit.

The conditions (III-8) and (III-9) relate to the amount of movement at the time of maximum blur compensation in the third lens unit that moves in a direction perpendicular to the optical axis. In the case of a zoom lens system, when the compensation angle is constant over the entire zoom range, a larger zoom ratio requires a larger amount of movement of the lens unit or the lens element that moves in a direction perpendicular to the optical axis. On the contrary, a smaller zoom ratio requires merely a smaller amount of movement of the lens unit or the lens element that moves in a direction perpendicular to the optical axis. When the condition (III-8) is not satisfied, alternatively when the value exceeds the upper limit of the condition (III-9), blur compensation becomes excessive. This causes a possibility of enhanced degradation in the optical performance. In contrast, when the value goes below the lower limit of the condition (III-9), a possibility of insufficient blur compensation arises.

Here, when at least one of the following conditions (III-9)' and (III-9)" is satisfied, the above-mentioned effect is achieved more successfully.

$$1.3 < (Y/Y_T)/(f/f_T) \quad \text{(III-9)'}$$

$$(Y/Y_T)/(f/f_T) < 1.7 \quad \text{(III-9)''}$$

(here, $Z = f_T/f_W > 9.0$)

Here, as described above, each zoom lens system according to Embodiments III-1 to III-5 is a zoom lens system that has a five-unit construction of positive, negative, positive, positive and positive, and that, in order from the object side to the image side, comprises: a first lens unit G1 having positive optical power; a second lens unit G2 having negative optical power; a diaphragm A; a third lens unit G3 having positive optical power; a fourth lens unit G4 having positive optical power; and a fifth lens unit G5 having positive optical power. Further, as described above, the zoom lens system according to Embodiment III-6 is a zoom lens system that has a four-unit construction of positive, negative, positive and positive, and that, in order from the object side to the image side, comprises: a first lens unit G1 having positive optical power; a second lens unit G2 having negative optical power; a diaphragm A; a third lens unit G3 having positive optical power; and a fourth lens unit G4 having positive optical power. However, the present invention is not limited to these configurations. For example, various constructions like a five-unit construction of positive, negative, positive, negative and positive may be employed that comprise: a first lens unit having positive optical power; a second lens unit having negative optical power; a third lens unit having positive optical power; and a subsequent lens unit including at least one lens unit having positive optical power. Such a zoom lens system can be used suitably, for example, in a digital still camera according to Embodiment III-7 described later and in an imaging device employed in this.

Here, the lens units constituting the zoom lens system according to Embodiments III-1 to III-6 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Embodiment III-7

Figure 48:
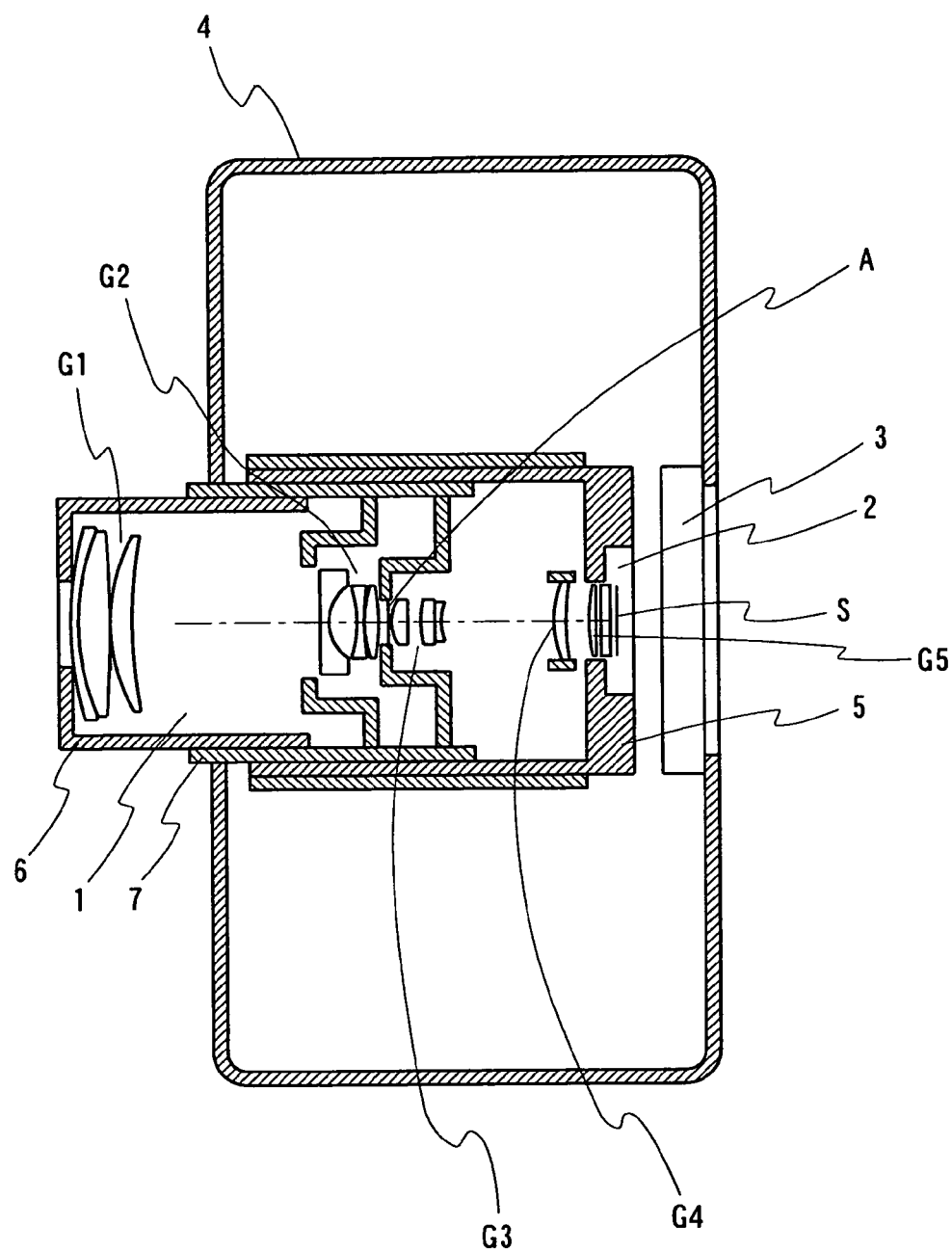
FIG. 48 is a schematic construction diagram of a digital still camera according to Embodiment III-7.

FIG. 48 is a schematic construction diagram of a digital still camera according to Embodiment III-7. In FIG. 48, the digital still camera comprises: an imaging device having a zoom lens system 1 and an image sensor 2 consisting of a CCD; a liquid crystal display monitor 3; and a body 4. The employed zoom lens system 1 is a zoom lens system according to Embodiment III-1. In FIG. 48, the zoom lens system 1 comprises a first lens unit G1, a second lens unit G2, a diaphragm A, a third lens unit G3, a fourth lens unit G4 and a fifth lens unit G5. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the third lens unit G3 and the fourth lens unit G4 move to predetermined positions relative to the image sensor 2, so that magnification change can be achieved ranging from a wide-angle limit to a telephoto limit. The fourth lens unit G4 is movable in an optical axis direction by a motor for focus adjustment.

As such, the zoom lens system according to Embodiment III-1 is employed in a digital still camera, a small digital still camera is obtained that has a high resolution and high capability of correcting the curvature of field and that has a short overall optical length at the time of non-use. Here, in the digital still camera shown in FIG. 48, any one of the zoom lens systems according to Embodiments III-2 to III-6 may be employed in place of the zoom lens system according to Embodiment III-1. Further, the optical system of the digital still camera shown in FIG. 48 is applicable also to a digital video camera for moving images. In this case, moving images with high resolution can be acquired in addition to still images.

Further, an imaging device comprising a zoom lens system according to Embodiments III-1 to III-6 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments I-1 to I-4, II-1 to II-5, and III-1 to III-6 are implemented. In the numerical examples, the units of the length in the tables are all mm. Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression:

$$Z = \frac{h^2/r}{1 + \sqrt{1 - (1+\kappa)(h/r)^2}} + Dh^4 + Eh^6 + Fh^8 + Gh^{10}$$

Here, $\kappa$ is the conic constant, D, E, F and G are fourth-order, sixth-order, eighth-order and tenth-order aspherical coefficients, respectively.

Figure 2:
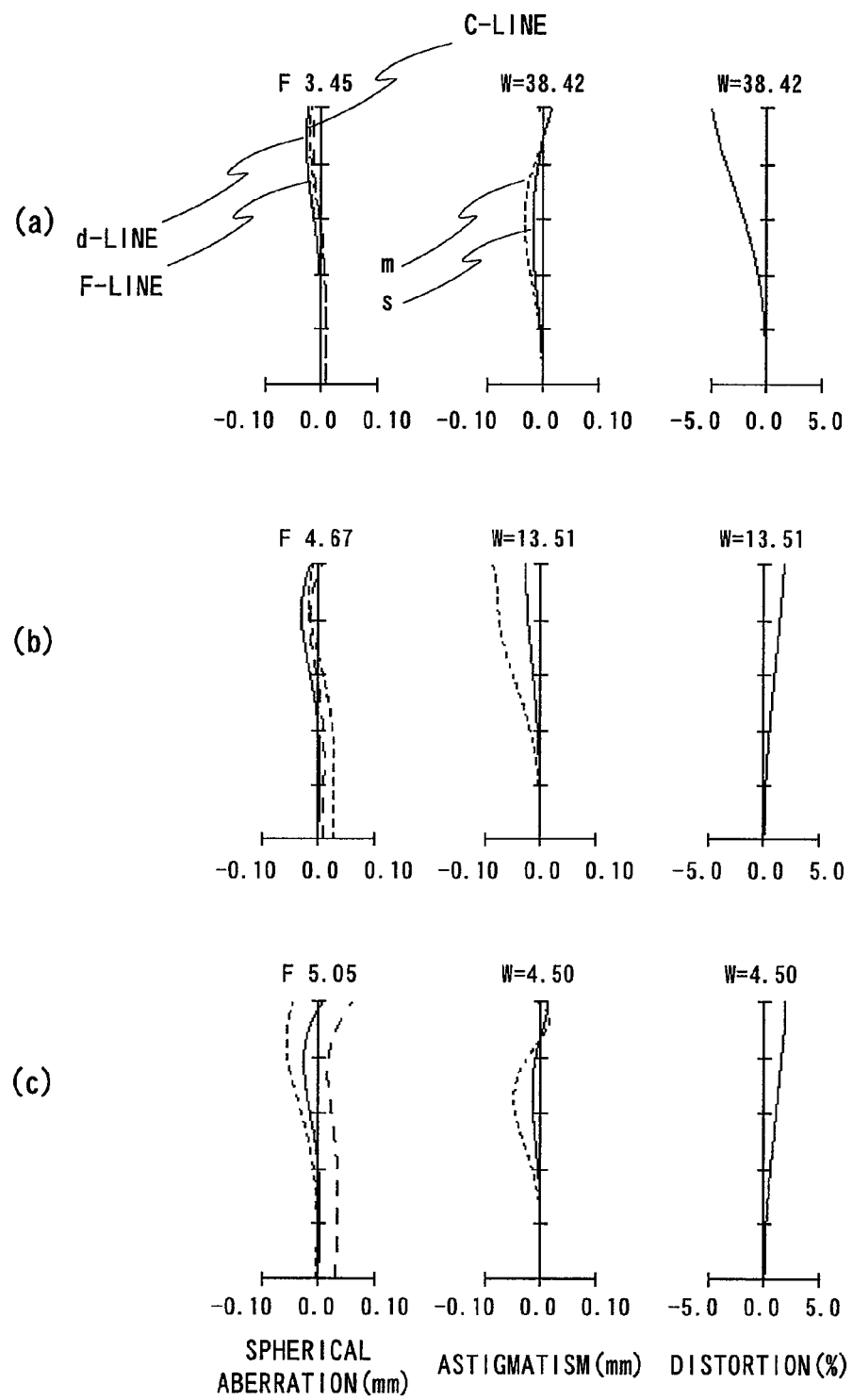
FIG. 2(a) is a longitudinal aberration diagram in an infinity in-focus condition at a wide-angle limit of a zoom lens system according to Example I-1.
FIG. 2(b) is a longitudinal aberration diagram in an infinity in-focus condition at a middle position (an intermediate focal length condition) of a zoom lens system according to Example I-1.
FIG. 2(c) is a longitudinal aberration diagram in an infinity in-focus condition at a telephoto limit of a zoom lens system according to Example I-1.
Figure 5:
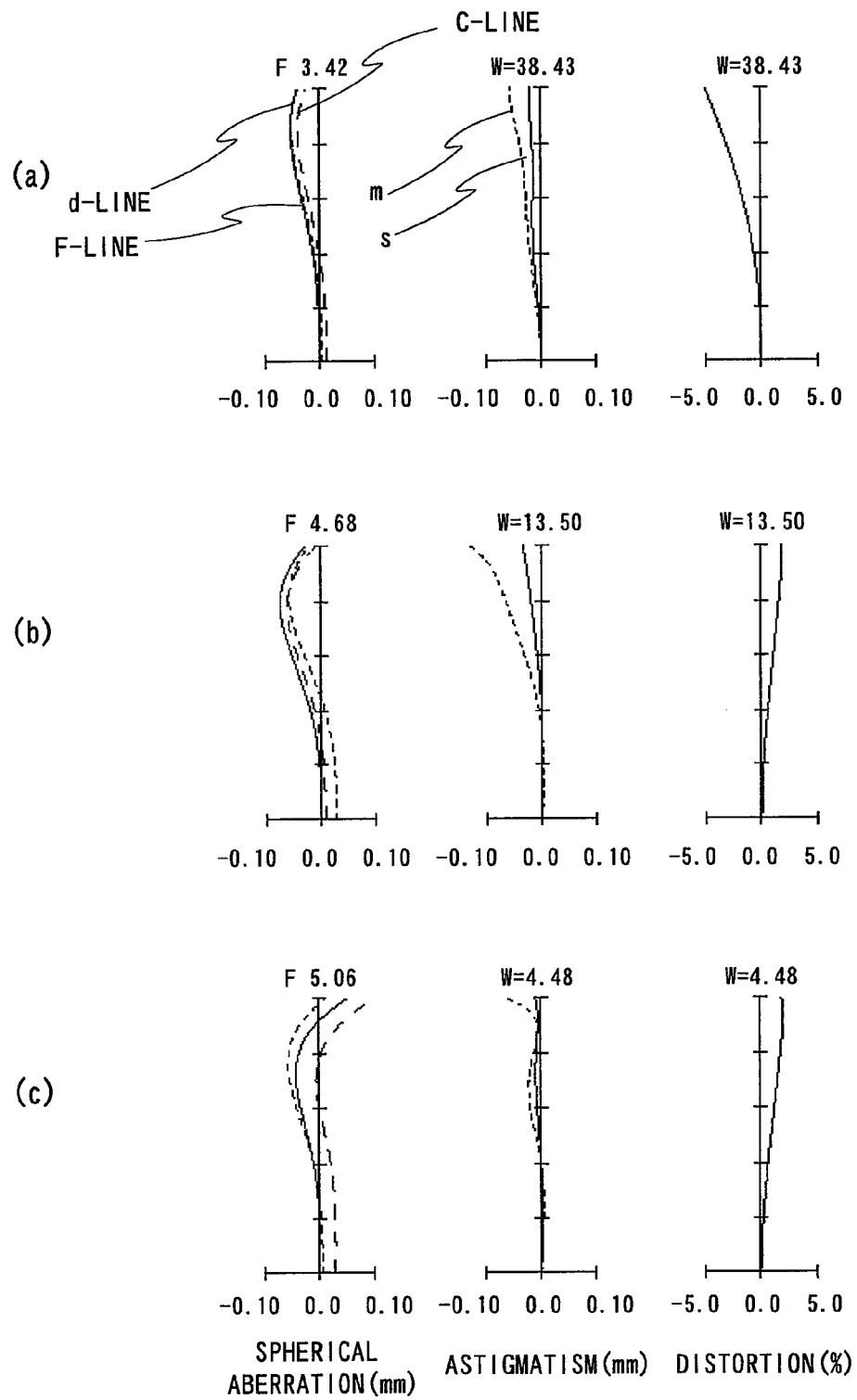
FIG. 5(a) is a longitudinal aberration diagram in an infinity in-focus condition at a wide-angle limit of a zoom lens system according to Example I-2.
FIG. 5(b) is a longitudinal aberration diagram in an infinity in-focus condition at a middle position (an intermediate focal length condition) of a zoom lens system according to Example I-2.
FIG. 5(c) is a longitudinal aberration diagram in an infinity in-focus condition at a telephoto limit of a zoom lens system according to Example I-2.
Figure 8:
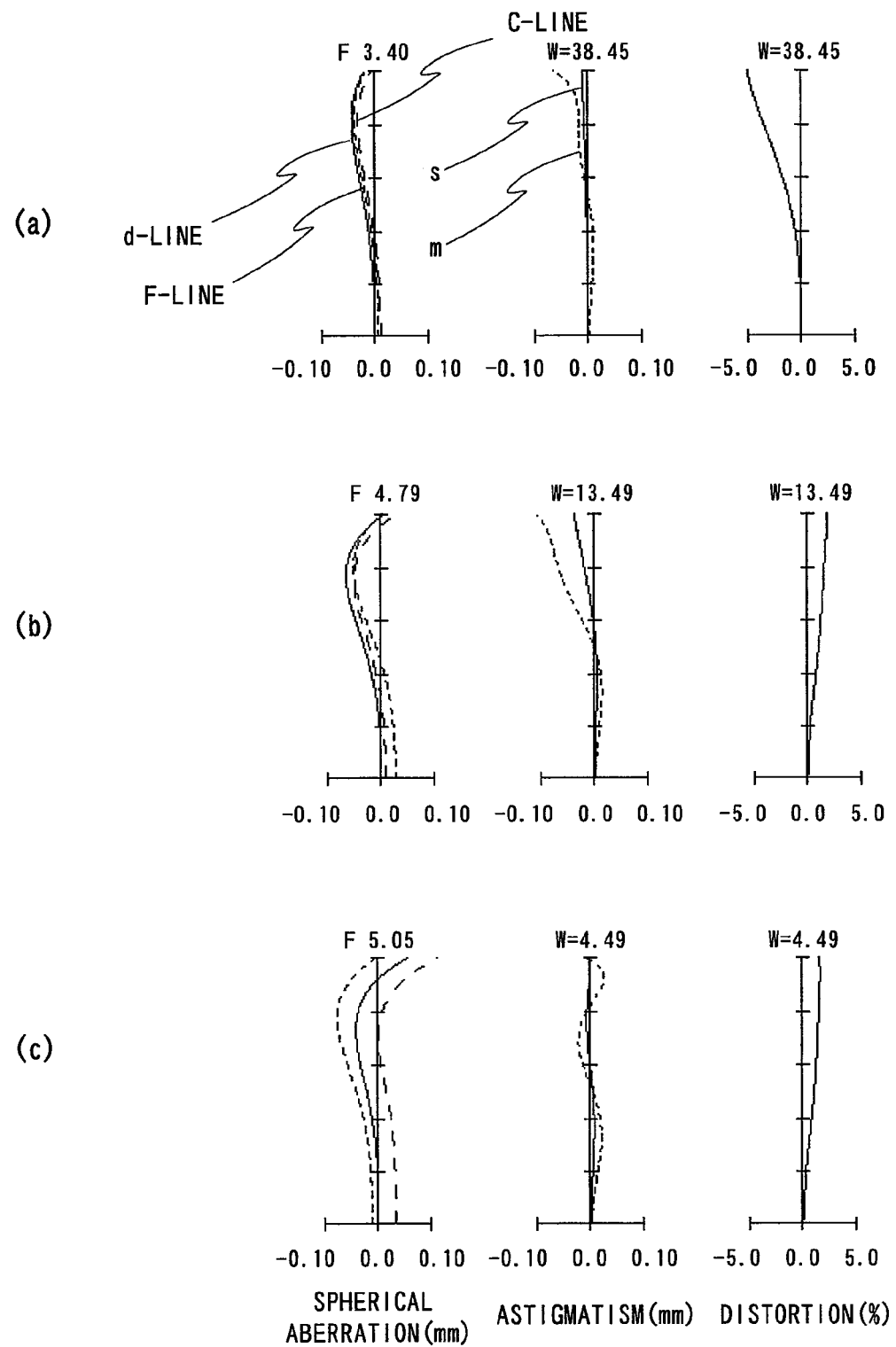
FIG. 8(a) is a longitudinal aberration diagram in an infinity in-focus condition at a wide-angle limit of a zoom lens system according to Example I-3.
FIG. 8(b) is a longitudinal aberration diagram in an infinity in-focus condition at a middle position (an intermediate focal length condition) of a zoom lens system according to Example I-3.
FIG. 8(c) is a longitudinal aberration diagram in an infinity in-focus condition at a telephoto limit of a zoom lens system according to Example I-3.
Figure 11:
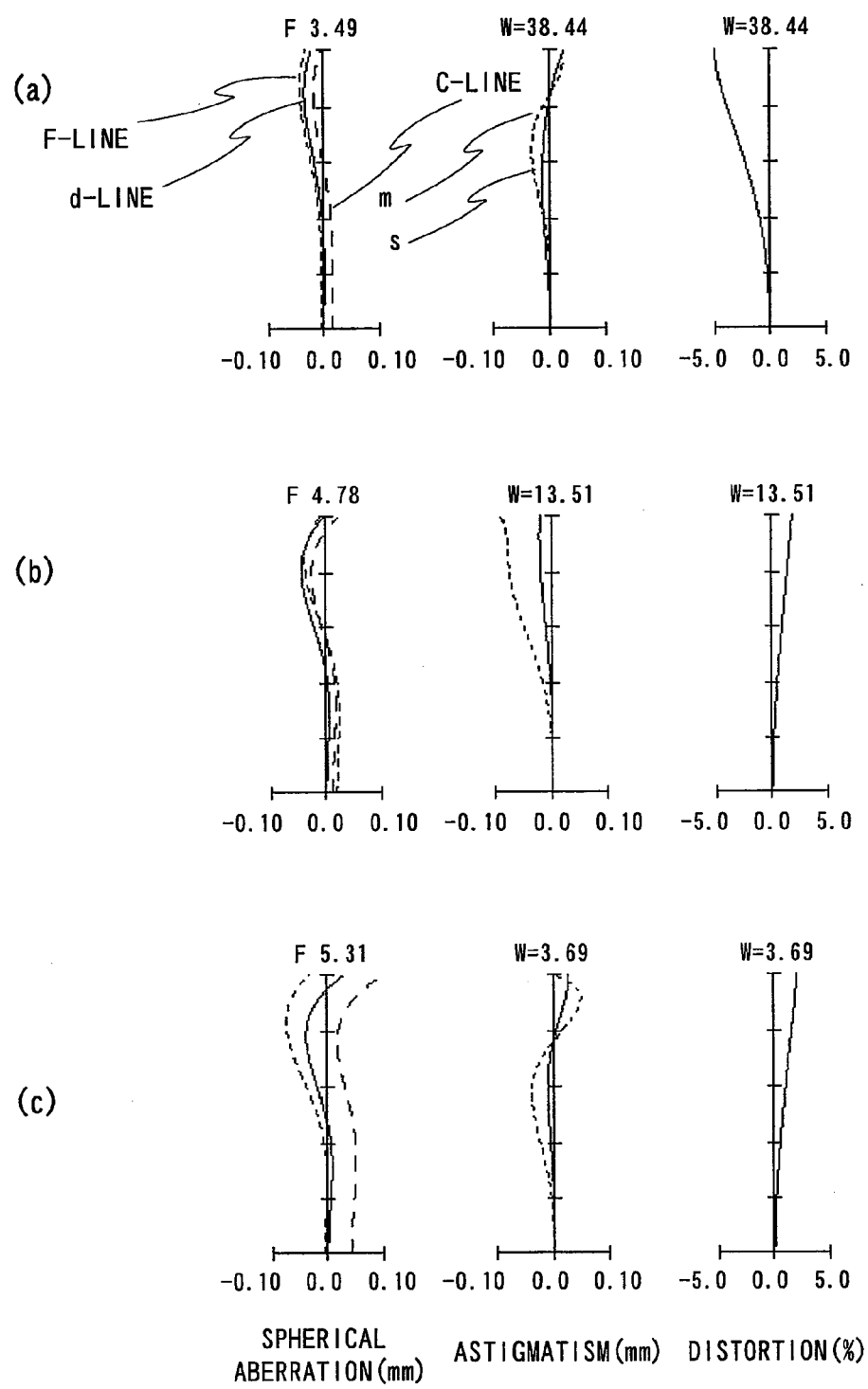
FIG. 11(a) is a longitudinal aberration diagram in an infinity in-focus condition at a wide-angle limit of a zoom lens system according to Example I-4.
FIG. 11(b) is a longitudinal aberration diagram in an infinity in-focus condition at a middle position (an intermediate focal length condition) of a zoom lens system according to Example I-4.
FIG. 11(c) is a longitudinal aberration diagram in an infinity in-focus condition at a telephoto limit of a zoom lens system according to Example I-4.

FIG. 2 is a longitudinal aberration diagram of a zoom lens system according to Example I-1. FIG. 5 is a longitudinal aberration diagram of a zoom lens system according to Example I-2. FIG. 8 is a longitudinal aberration diagram of a zoom lens system according to Example I-3. FIG. 11 is a longitudinal aberration diagram of a zoom lens system according to Example I-4.

Figure 15:
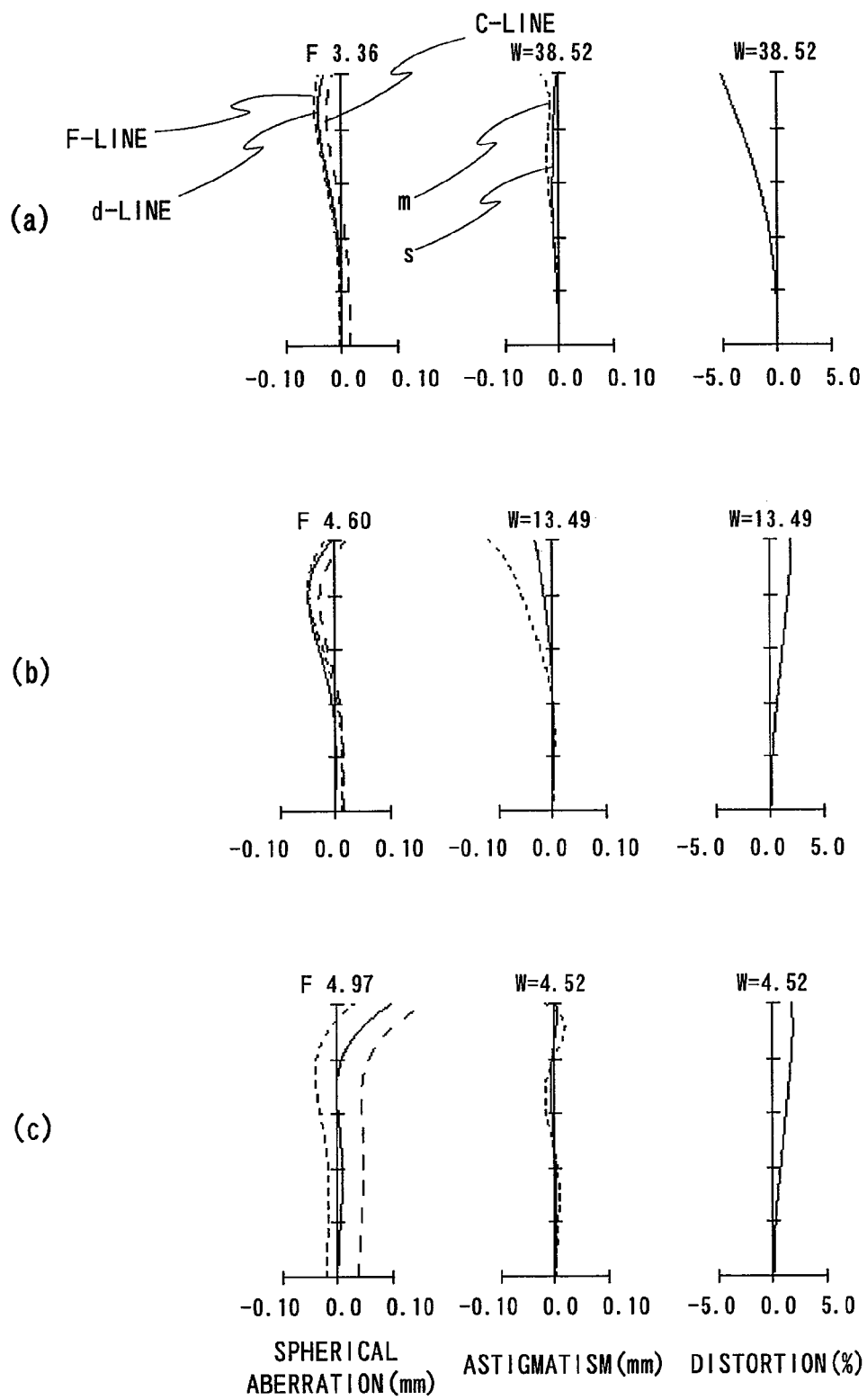
FIG. 15(*a*) is a longitudinal aberration diagram in an infinity in-focus condition at a wide-angle limit of a zoom lens system according to Example II-1.
Figure 18:
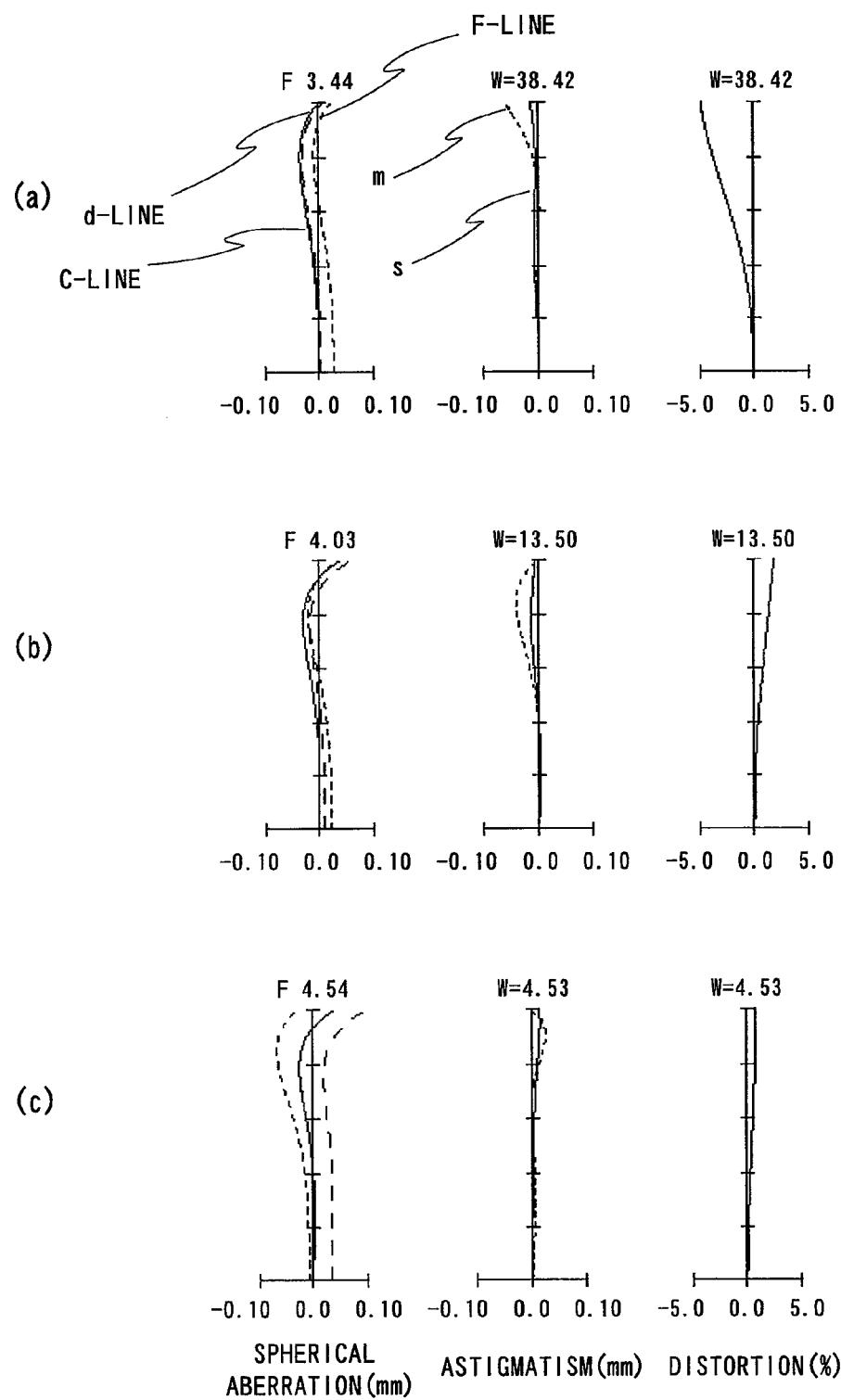
FIG. 18(*a*) is a longitudinal aberration diagram in an infinity in-focus condition at a wide-angle limit of a zoom lens system according to Example II-2.
Figure 21:
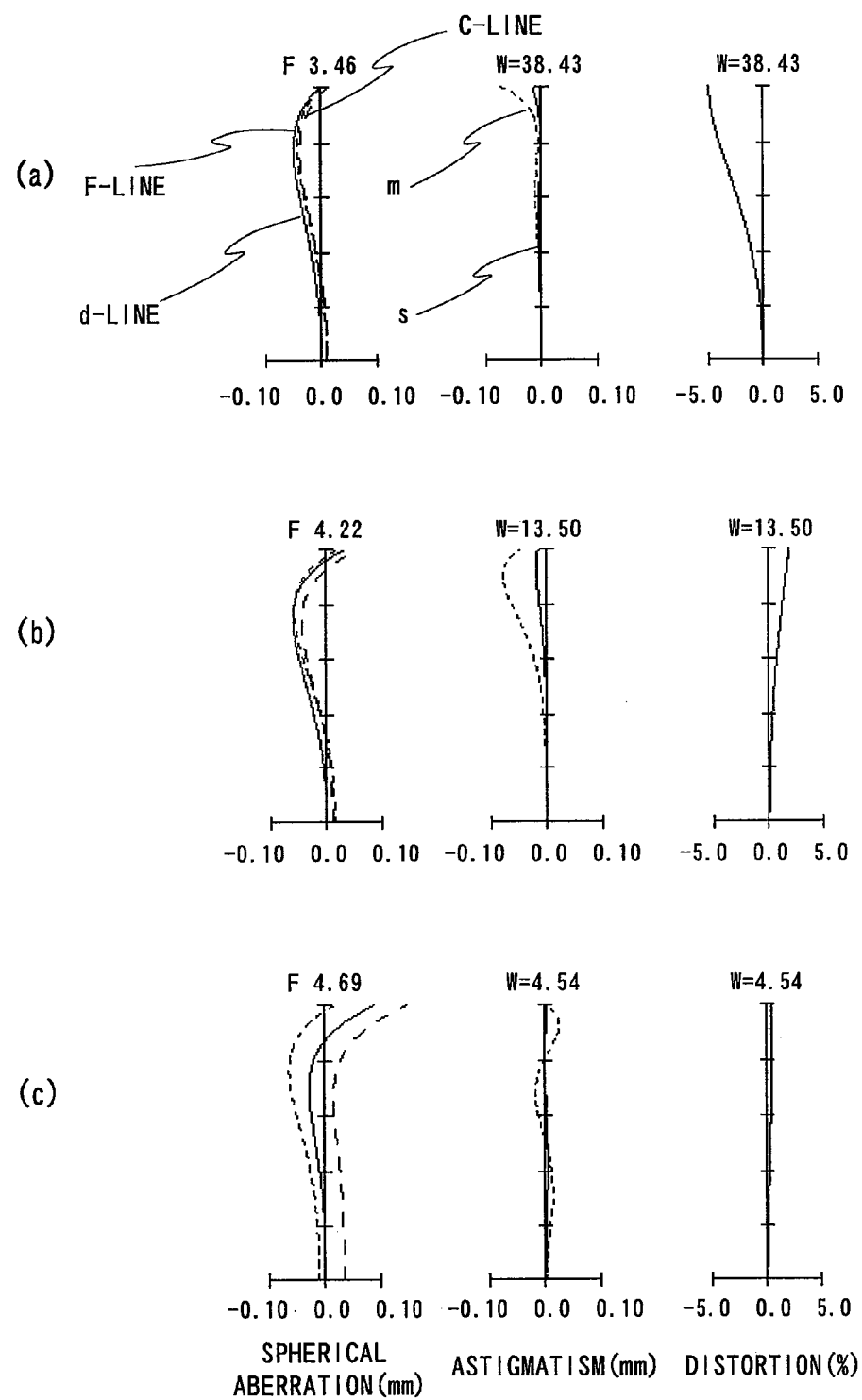
FIG. 21(*a*) is a longitudinal aberration diagram in an infinity in-focus condition at a wide-angle limit of a zoom lens system according to Example II-3.
Figure 24:
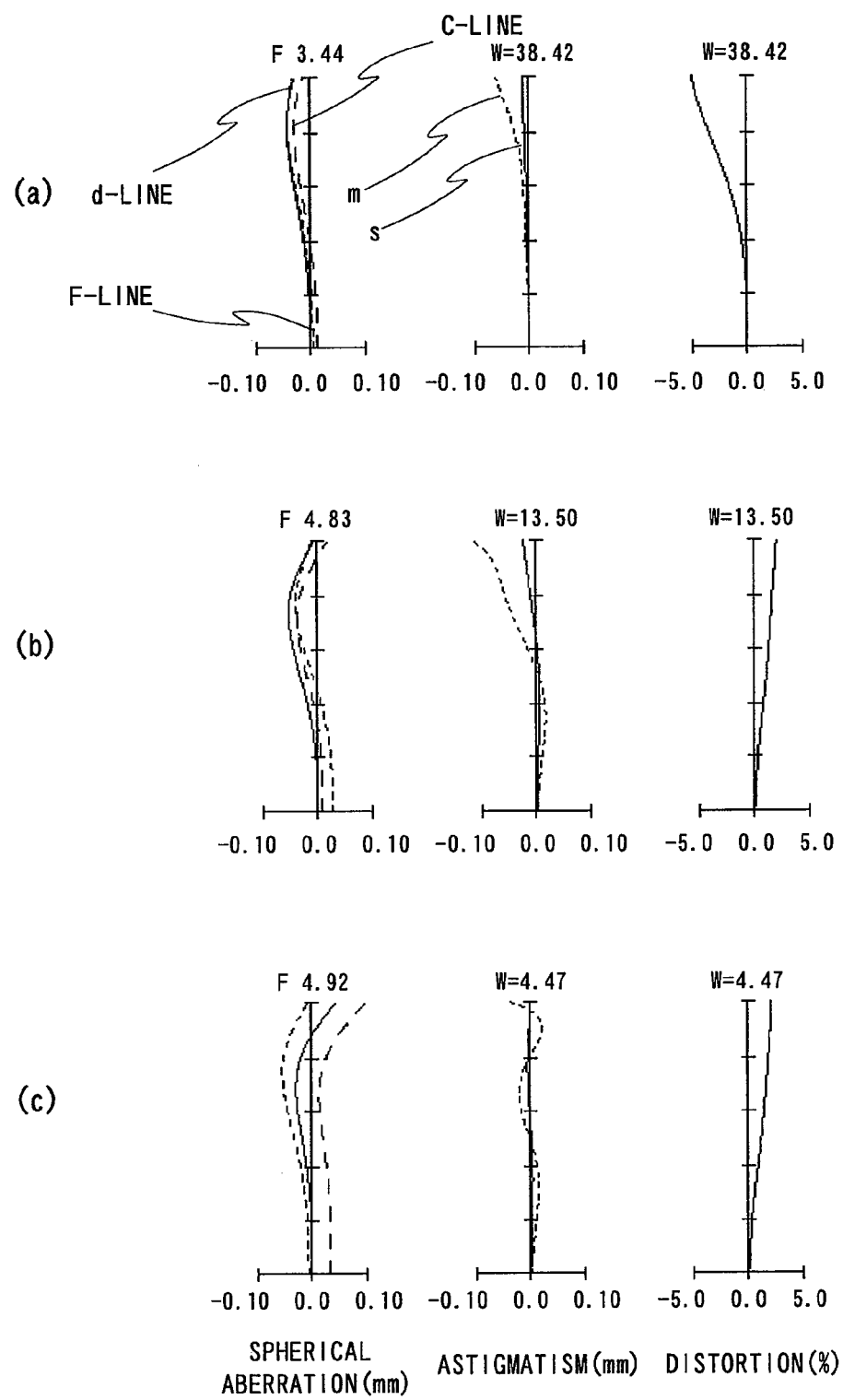
FIG. 24(a) is a longitudinal aberration diagram in an infinity in-focus condition at a wide-angle limit of a zoom lens system according to Example II-4.
FIG. 24(b) is a longitudinal aberration diagram in an infinity in-focus condition at a middle position (an intermediate focal length condition) of a zoom lens system according to Example II-4.
FIG. 24(c) is a longitudinal aberration diagram in an infinity in-focus condition at a telephoto limit of a zoom lens system according to Example II-4.
Figure 27:
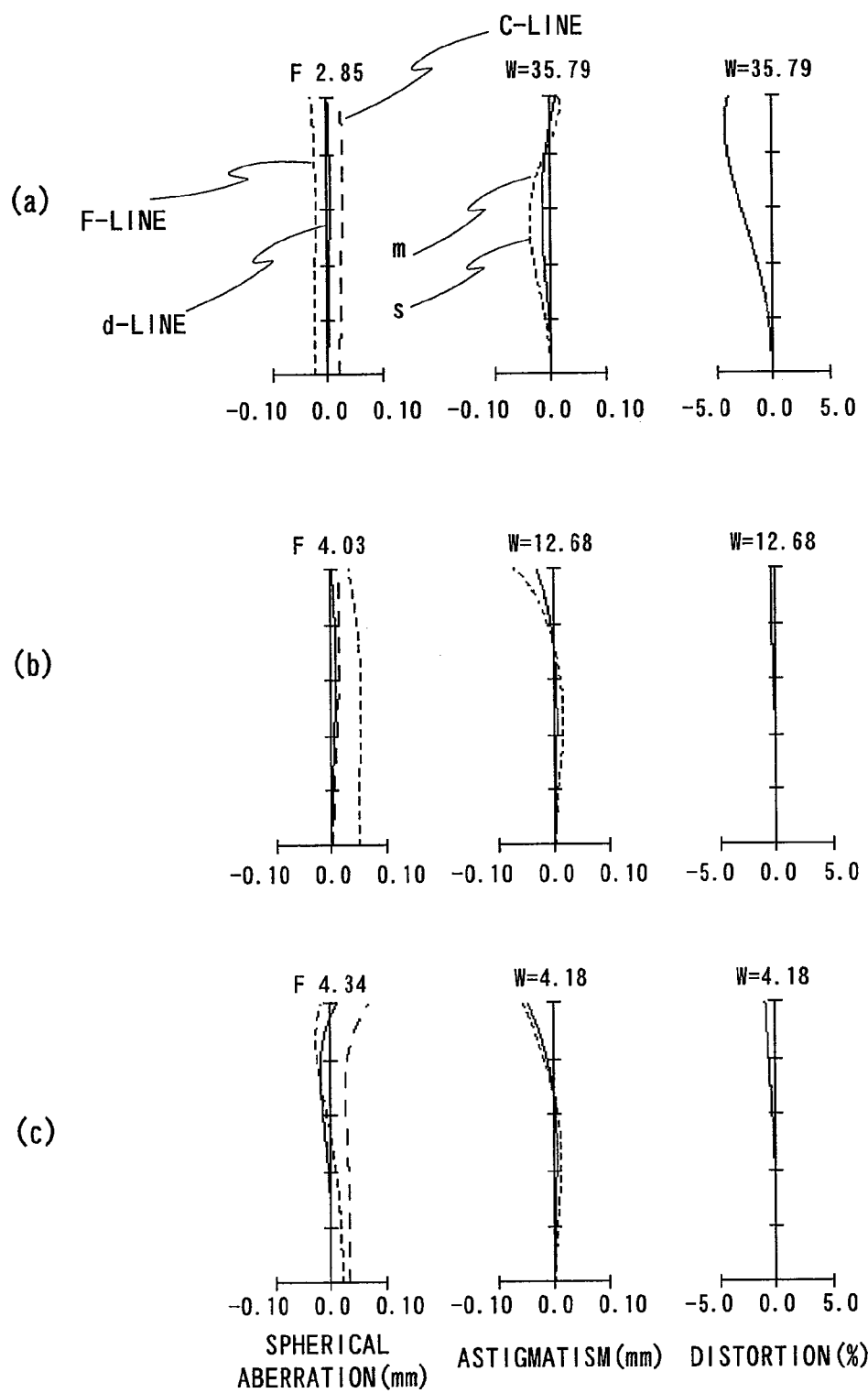
FIG. 27(a) is a longitudinal aberration diagram in an infinity in-focus condition at a wide-angle limit of a zoom lens system according to Example II-5.
FIG. 27(b) is a longitudinal aberration diagram in an infinity in-focus condition at a middle position (an intermediate focal length condition) of a zoom lens system according to Example II-5.
FIG. 27(c) is a longitudinal aberration diagram in an infinity in-focus condition at a telephoto limit of a zoom lens system according to Example II-5.

FIG. 15 is a longitudinal aberration diagram of a zoom lens system according to Example II-1. FIG. 18 is a longitudinal aberration diagram of a zoom lens system according to Example II-2. FIG. 21 is a longitudinal aberration diagram of a zoom lens system according to Example II-3. FIG. 24 is a longitudinal aberration diagram of a zoom lens system according to Example II-4. FIG. 27 is a longitudinal aberration diagram of a zoom lens system according to Example II-5.

Figure 31:
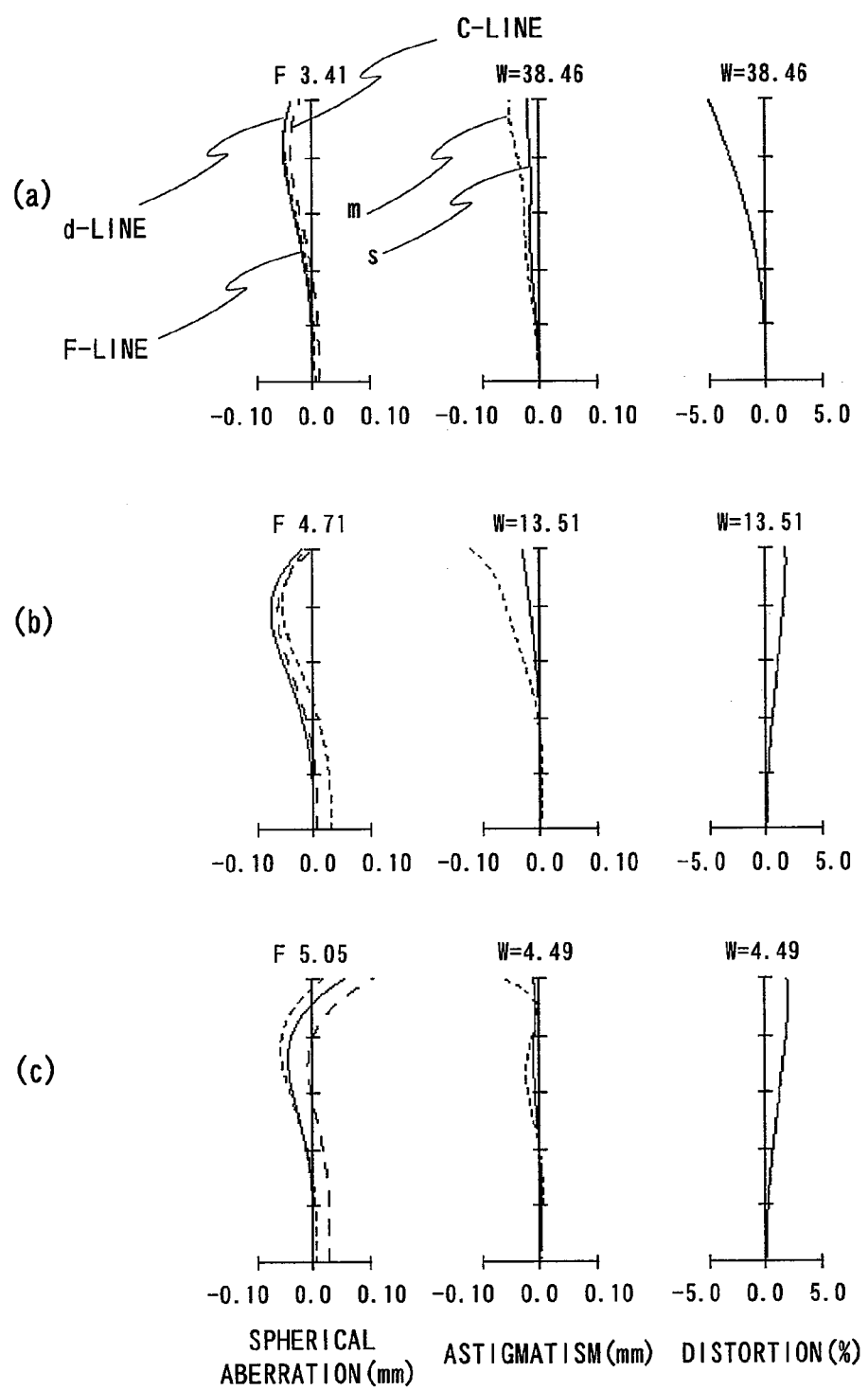
FIG. 31(a) is a longitudinal aberration diagram in an infinity in-focus condition at a wide-angle limit of a zoom lens system according to Example III-1.
FIG. 31(b) is a longitudinal aberration diagram in an infinity in-focus condition at a middle position (an intermediate focal length condition) of a zoom lens system according to Example III-1.
FIG. 31(c) is a longitudinal aberration diagram in an infinity in-focus condition at a telephoto limit of a zoom lens system according to Example III-1.
Figure 34:
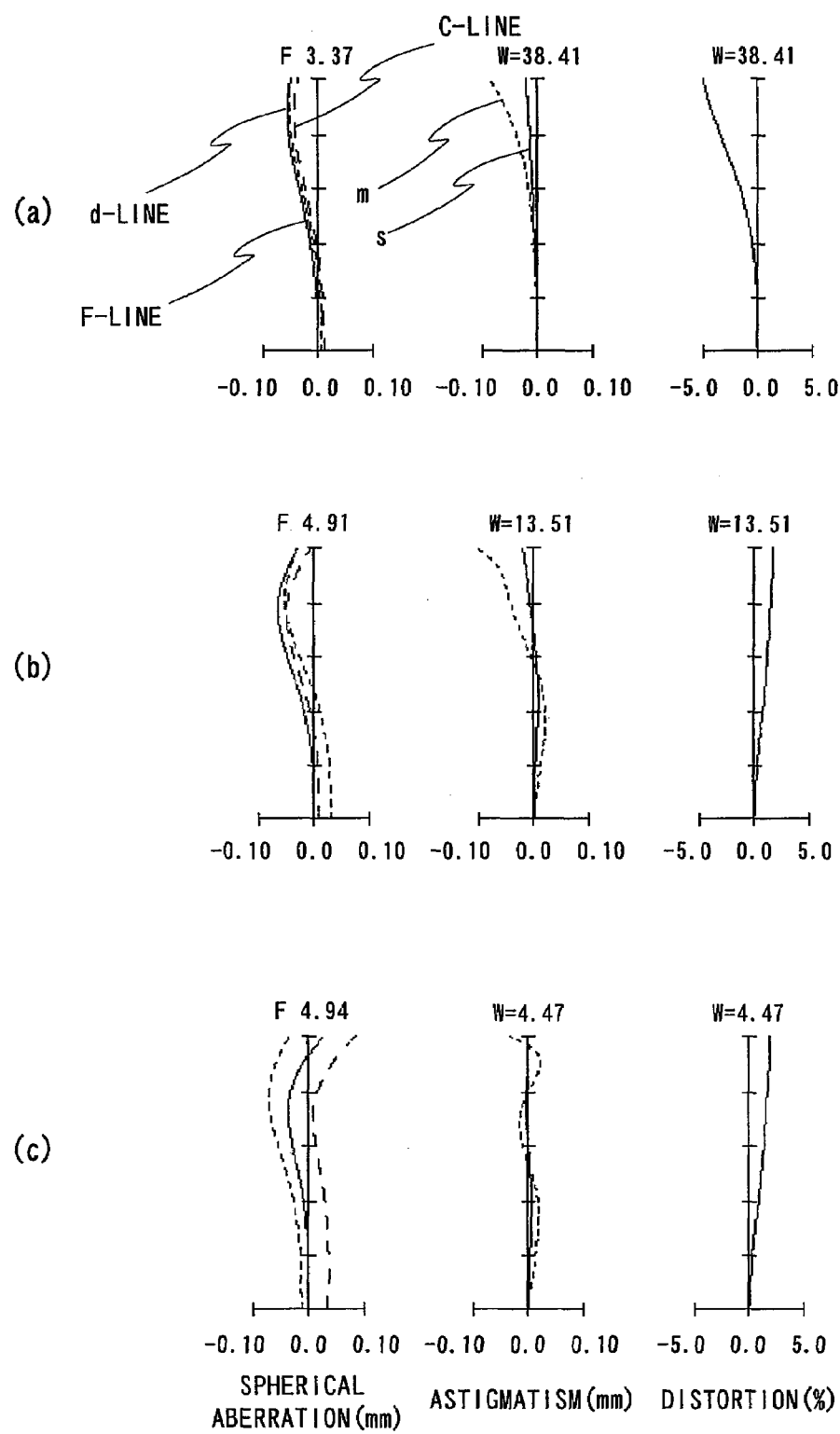
FIG. 34(a) is a longitudinal aberration diagram in an infinity in-focus condition at a wide-angle limit of a zoom lens system according to Example III-2.
FIG. 34(b) is a longitudinal aberration diagram in an infinity in-focus condition at a middle position (an intermediate focal length condition) of a zoom lens system according to Example III-2.
FIG. 34(c) is a longitudinal aberration diagram in an infinity in-focus condition at a telephoto limit of a zoom lens system according to Example III-2.
Figure 37:
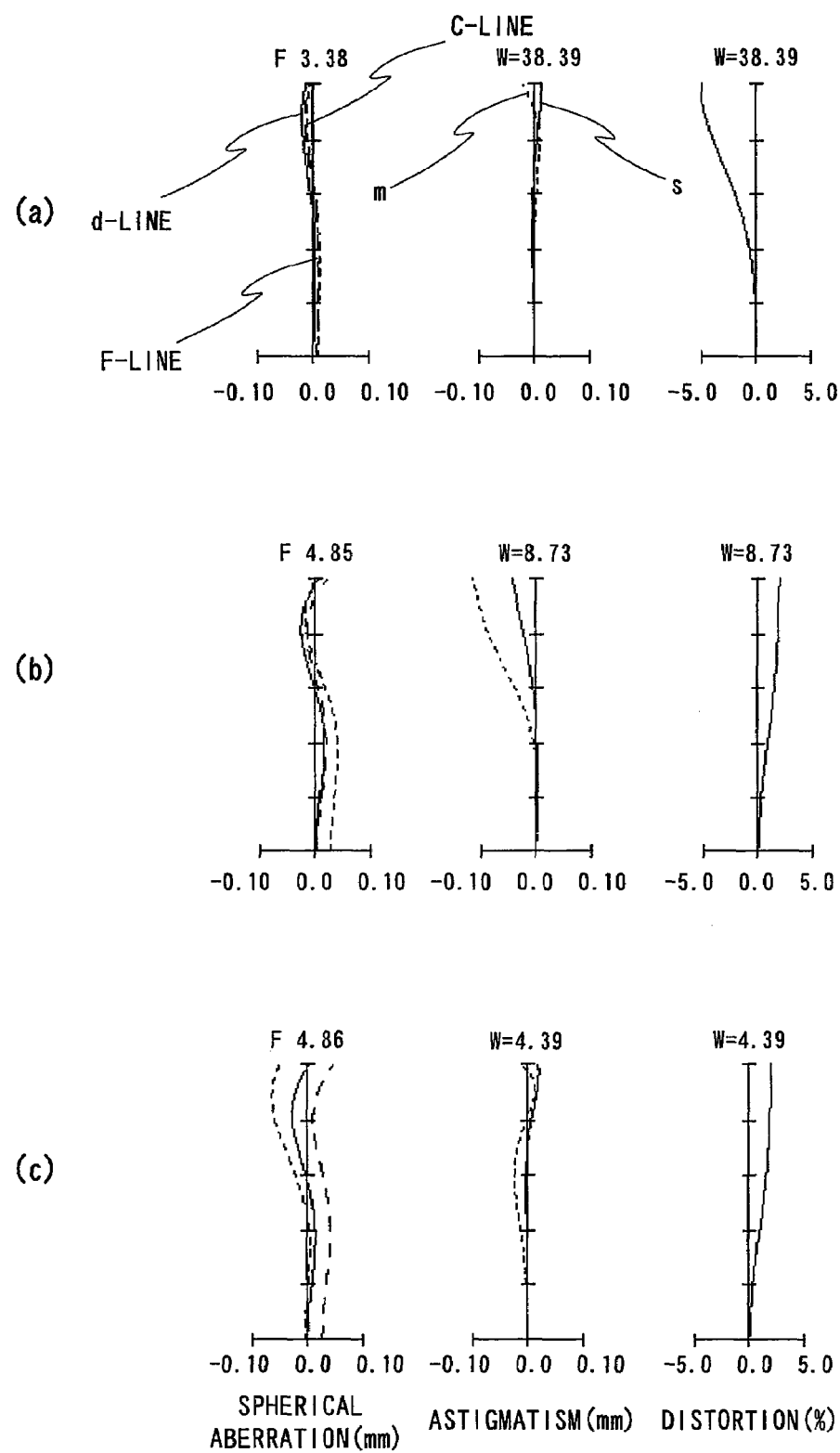
FIG. 37(a) is a longitudinal aberration diagram in an infinity in-focus condition at a wide-angle limit of a zoom lens system according to Example III-3.
FIG. 37(b) is a longitudinal aberration diagram in an infinity in-focus condition at a middle position (an intermediate focal length condition) of a zoom lens system according to Example III-3.
FIG. 37(c) is a longitudinal aberration diagram in an infinity in-focus condition at a telephoto limit of a zoom lens system according to Example III-3.
Figure 40:
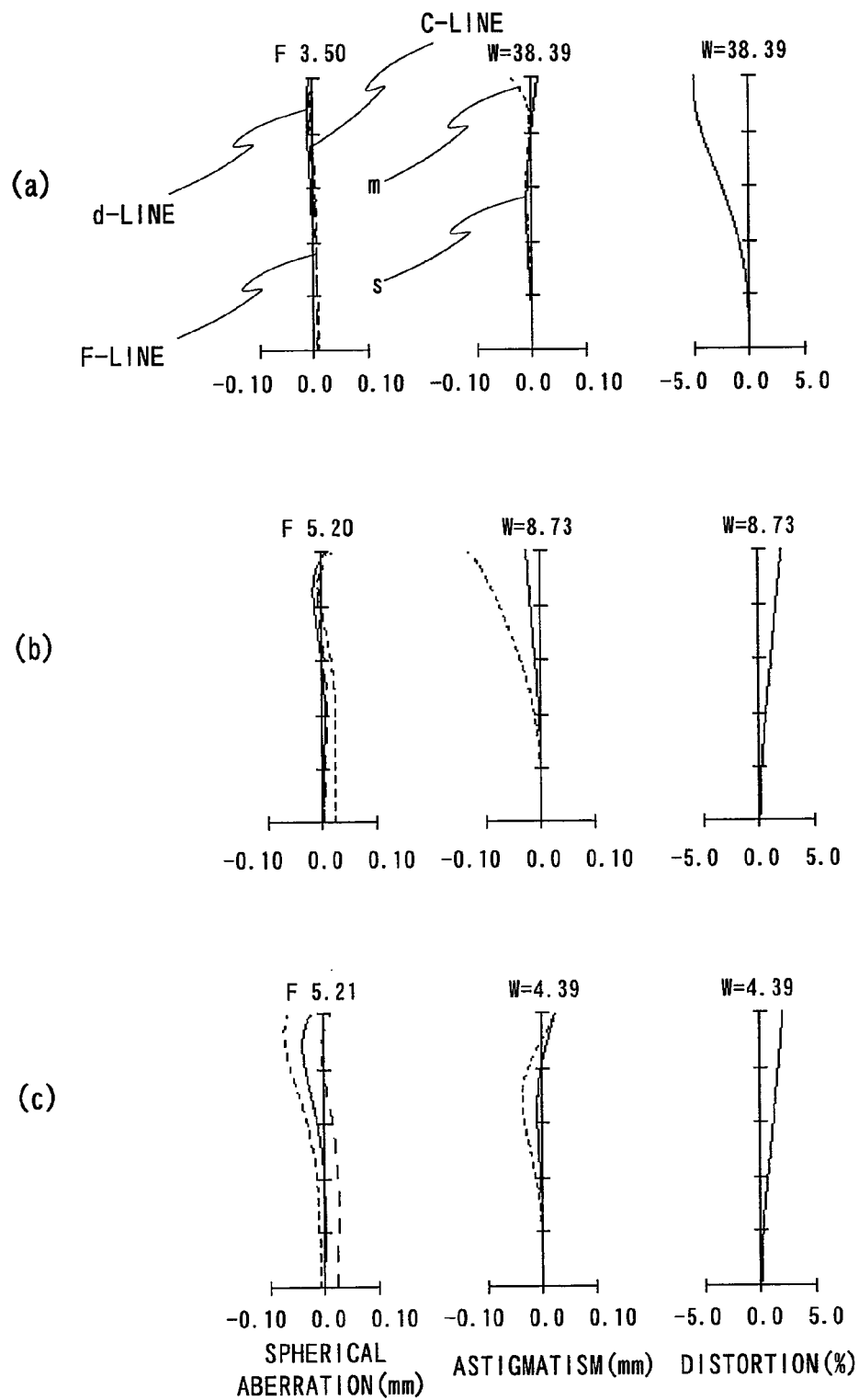
FIG. 40(a) is a longitudinal aberration diagram in an infinity in-focus condition at a wide-angle limit of a zoom lens system according to Example III-4.
FIG. 40(b) is a longitudinal aberration diagram in an infinity in-focus condition at a middle position (an intermediate focal length condition) of a zoom lens system according to Example III-4.
FIG. 40(c) is a longitudinal aberration diagram in an infinity in-focus condition at a telephoto limit of a zoom lens system according to Example III-4.
Figure 43:
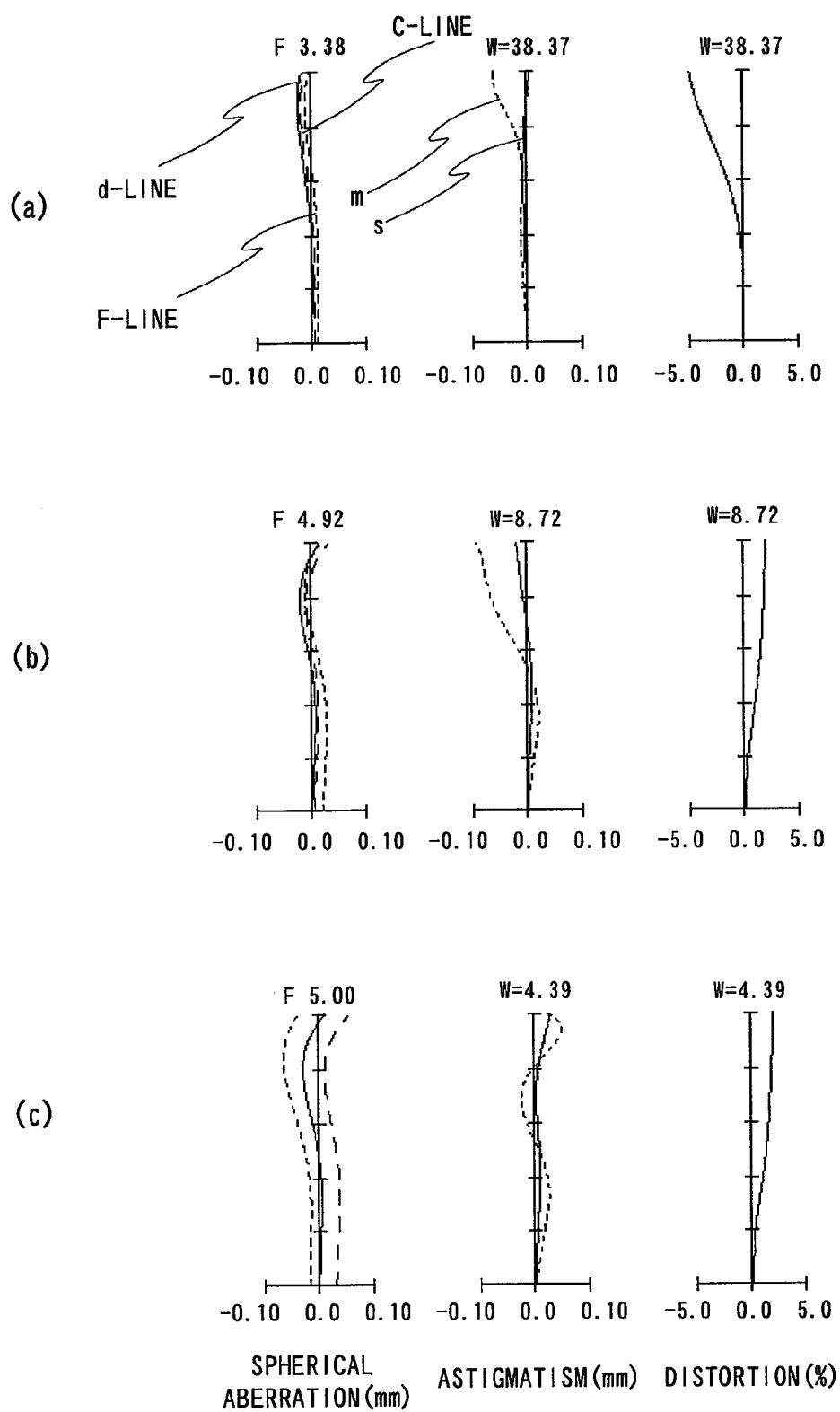
FIG. 43(a) is a longitudinal aberration diagram in an infinity in-focus condition at a wide-angle limit of a zoom lens system according to Example III-5.
FIG. 43(b) is a longitudinal aberration diagram in an infinity in-focus condition at a middle position (an intermediate focal length condition) of a zoom lens system according to Example III-5.
FIG. 43(c) is a longitudinal aberration diagram in an infinity in-focus condition at a telephoto limit of a zoom lens system according to Example III-5.
Figure 46:
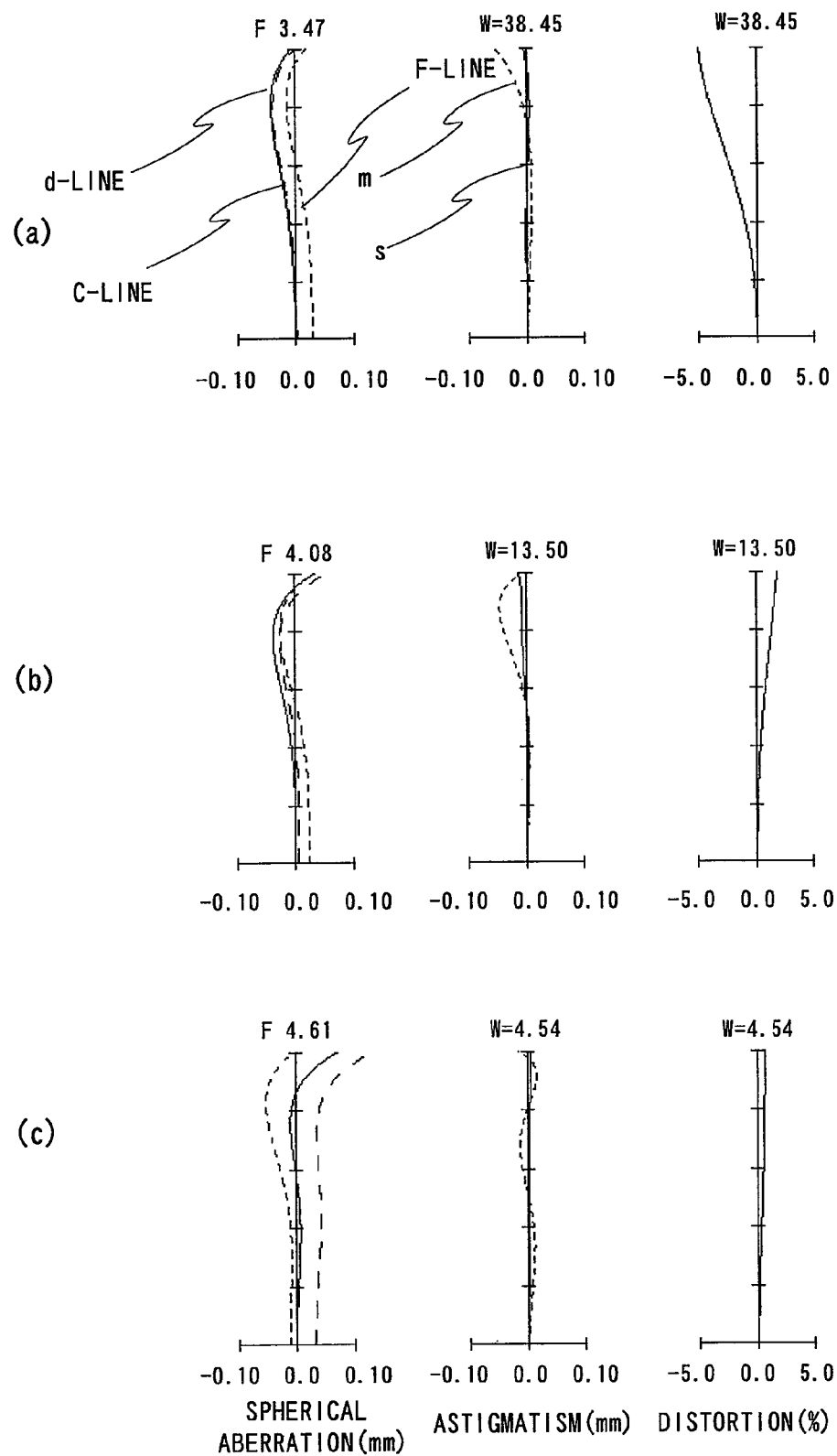
FIG. 46(a) is a longitudinal aberration diagram in an infinity in-focus condition at a wide-angle limit of a zoom lens system according to Example III-6.
FIG. 46(b) is a longitudinal aberration diagram in an infinity in-focus condition at a middle position (an intermediate focal length condition) of a zoom lens system according to Example III-6.
FIG. 46(c) is a longitudinal aberration diagram in an infinity in-focus condition at a telephoto limit of a zoom lens system according to Example III-6.

FIG. 31 is a longitudinal aberration diagram of a zoom lens system according to Example III-1. FIG. 34 is a longitudinal aberration diagram of a zoom lens system according to Example III-2. FIG. 37 is a longitudinal aberration diagram of a zoom lens system according to Example III-3. FIG. 40 is a longitudinal aberration diagram of a zoom lens system according to Example III-4. FIG. 43 is a longitudinal aberration diagram of a zoom lens system according to Example III-5. FIG. 46 is a longitudinal aberration diagram of a zoom lens system according to Example III-6.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration, the astigmatism and the distortion. In each spherical aberration diagram, the vertical axis indicates the F-number, and the solid line, the short dash line and the long dash line indicate the characteristics to the d-line, the F-line and the C-line, respectively. In each astigmatism diagram, the vertical axis indicates the half view angle, and the solid line and the dash line indicate the characteristics to the sagittal image plane (in each Fig., indicated as "s") and the meridional image plane (in each Fig., indicated as "m"), respectively. In each distortion diagram, the vertical axis indicates the half view angle.

Figure 3:
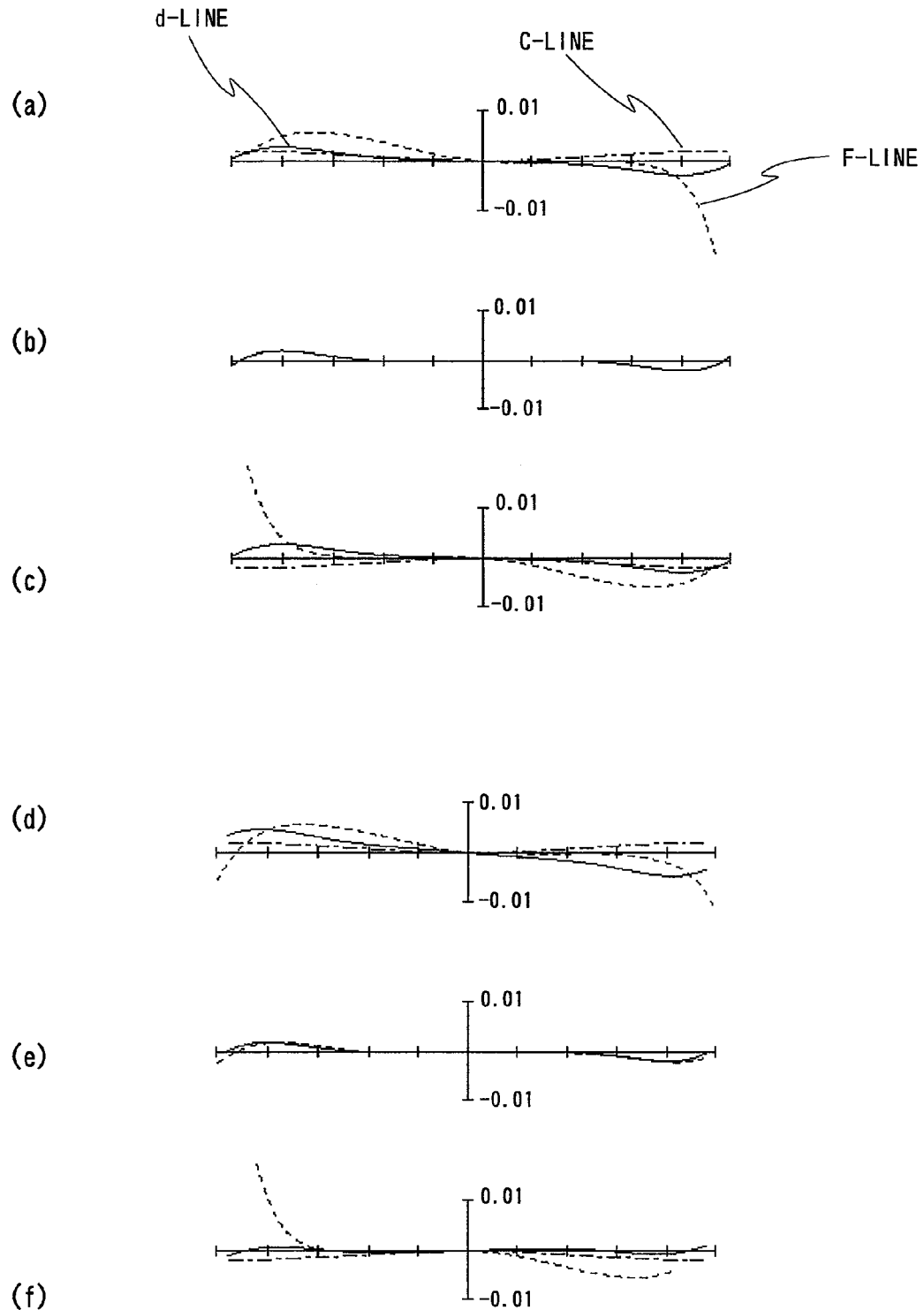
FIG. 3(a) is a lateral aberration diagram at an image point of 75% of the maximum image height in a basic state where image blur compensation is not performed at a telephoto limit of a zoom lens system according to Example I-1.
FIG. 3(b) is a lateral aberration diagram at an axial image point in a basic state where image blur compensation is not performed at a telephoto limit of a zoom lens system according to Example I-1.
FIG. 3(c) is a lateral aberration diagram at an image point of −75% of the maximum image height in a basic state where image blur compensation is not performed at a telephoto limit of a zoom lens system according to Example I-1.
FIG. 3(d) is a lateral aberration diagram at an image point of 75% of the maximum image height in an image blur compensation state at a telephoto limit of a zoom lens system according to Example I-1.
FIG. 3(e) is a lateral aberration diagram at an axial image point in an image blur compensation state at a telephoto limit of a zoom lens system according to Example I-1.
FIG. 3(f) is a lateral aberration diagram at an image point of −75% of the maximum image height in an image blur compensation state at a telephoto limit of a zoom lens system according to Example I-1.
Figure 6:
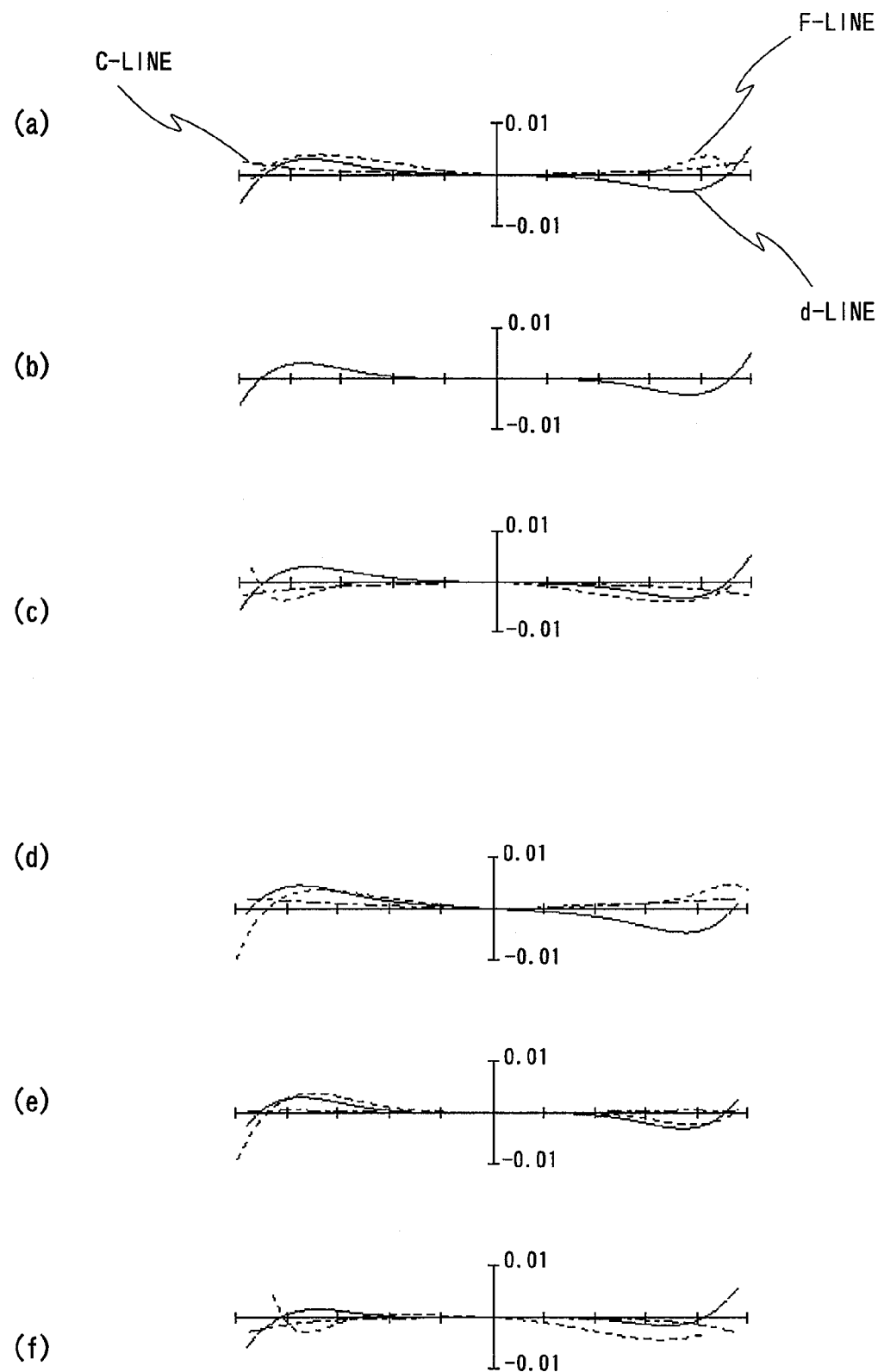
FIG. 6(a) is a lateral aberration diagram at an image point of 75% of the maximum image height in a basic state where image blur compensation is not performed at a telephoto limit of a zoom lens system according to Example I-2.
FIG. 6(b) is a lateral aberration diagram at an axial image point in a basic state where image blur compensation is not performed at a telephoto limit of a zoom lens system according to Example I-2.
FIG. 6(c) is a lateral aberration diagram at an image point of −75% of the maximum image height in a basic state where image blur compensation is not performed at a telephoto limit of a zoom lens system according to Example I-2.
FIG. 6(d) is a lateral aberration diagram at an image point of 75% of the maximum image height in an image blur compensation state at a telephoto limit of a zoom lens system according to Example I-2.
FIG. 6(e) is a lateral aberration diagram at an axial image point in an image blur compensation state at a telephoto limit of a zoom lens system according to Example I-2.
FIG. 6(f) is a lateral aberration diagram at an image point of −75% of the maximum image height in an image blur compensation state at a telephoto limit of a zoom lens system according to Example I-2.
Figure 9:
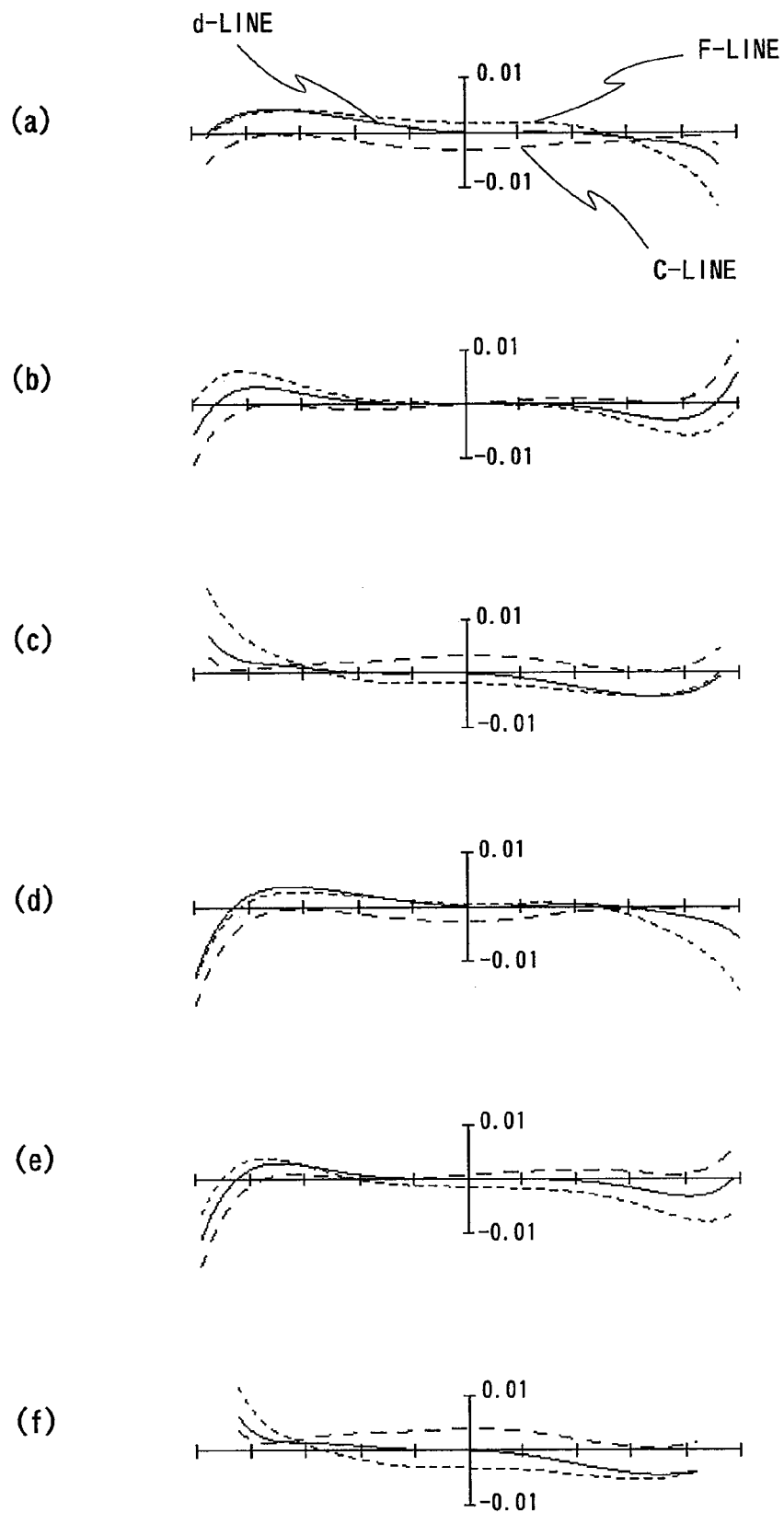
FIG. 9(a) is a lateral aberration diagram at an image point of 75% of the maximum image height in a basic state where image blur compensation is not performed at a telephoto limit of a zoom lens system according to Example I-3.
FIG. 9(b) is a lateral aberration diagram at an axial image point in a basic state where image blur compensation is not performed at a telephoto limit of a zoom lens system according to Example I-3.
FIG. 9(c) is a lateral aberration diagram at an image point of −75% of the maximum image height in a basic state where image blur compensation is not performed at a telephoto limit of a zoom lens system according to Example I-3.
FIG. 9(d) is a lateral aberration diagram at an image point of 75% of the maximum image height in an image blur compensation state at a telephoto limit of a zoom lens system according to Example I-3.
FIG. 9(e) is a lateral aberration diagram at an axial image point in an image blur compensation state at a telephoto limit of a zoom lens system according to Example I-3.
FIG. 9(f) is a lateral aberration diagram at an image point of −75% of the maximum image height in an image blur compensation state at a telephoto limit of a zoom lens system according to Example I-3.
Figure 12:
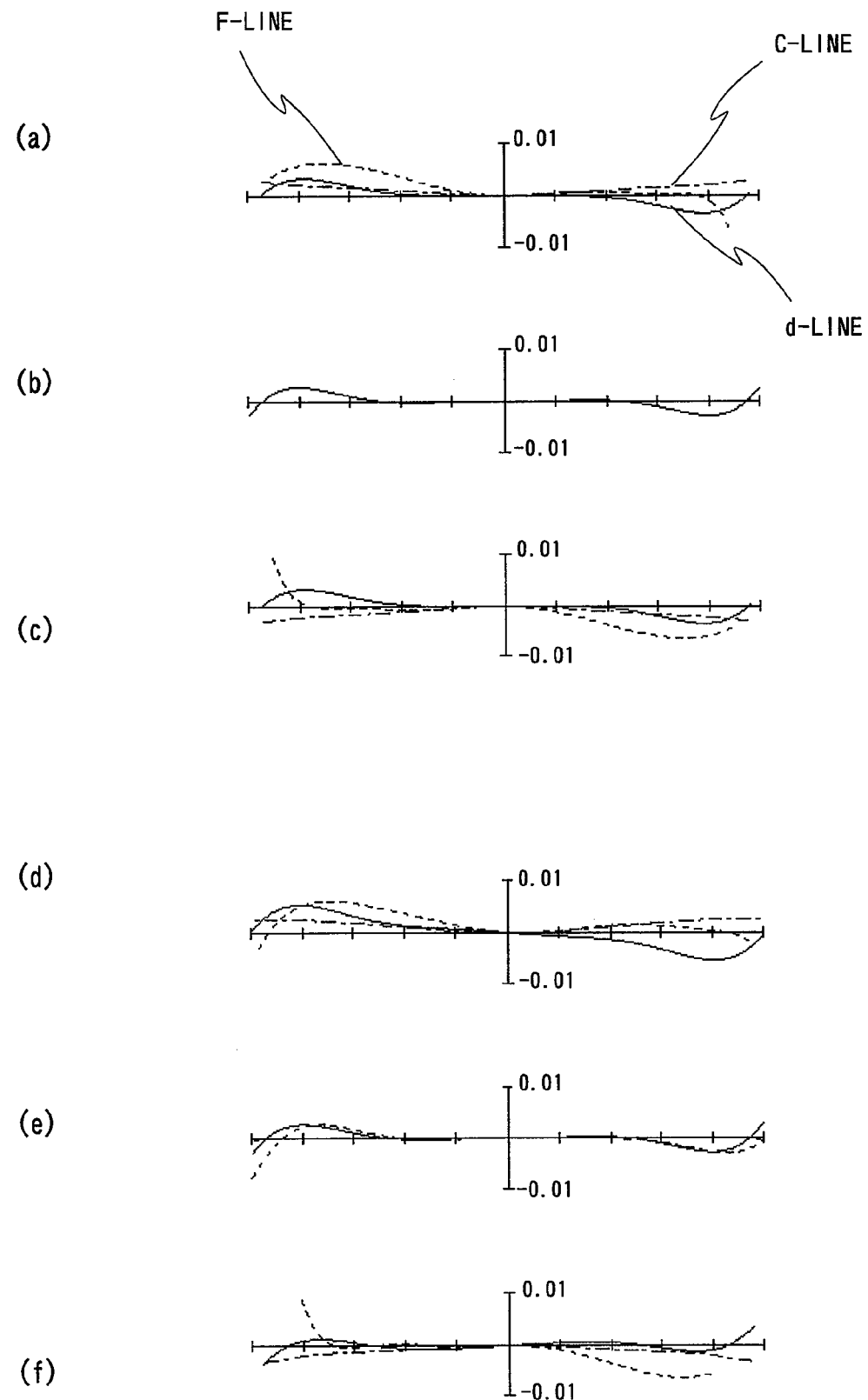
FIG. 12(*f*) is a lateral aberration diagram at an image point of −75% of the maximum image height in an image blur compensation state at a telephoto limit of a zoom lens system according to Example I-4.

FIG. 3 is a lateral aberration diagram at a telephoto limit of a zoom lens system according to Example I-1. FIG. 6 is a lateral aberration diagram at a telephoto limit of a zoom lens system according to Example I-2. FIG. 9 is a lateral aberration diagram at a telephoto limit of a zoom lens system according to Example I-3. FIG. 12 is a lateral aberration diagram at a telephoto limit of a zoom lens system according to Example I-4.

Figure 16:
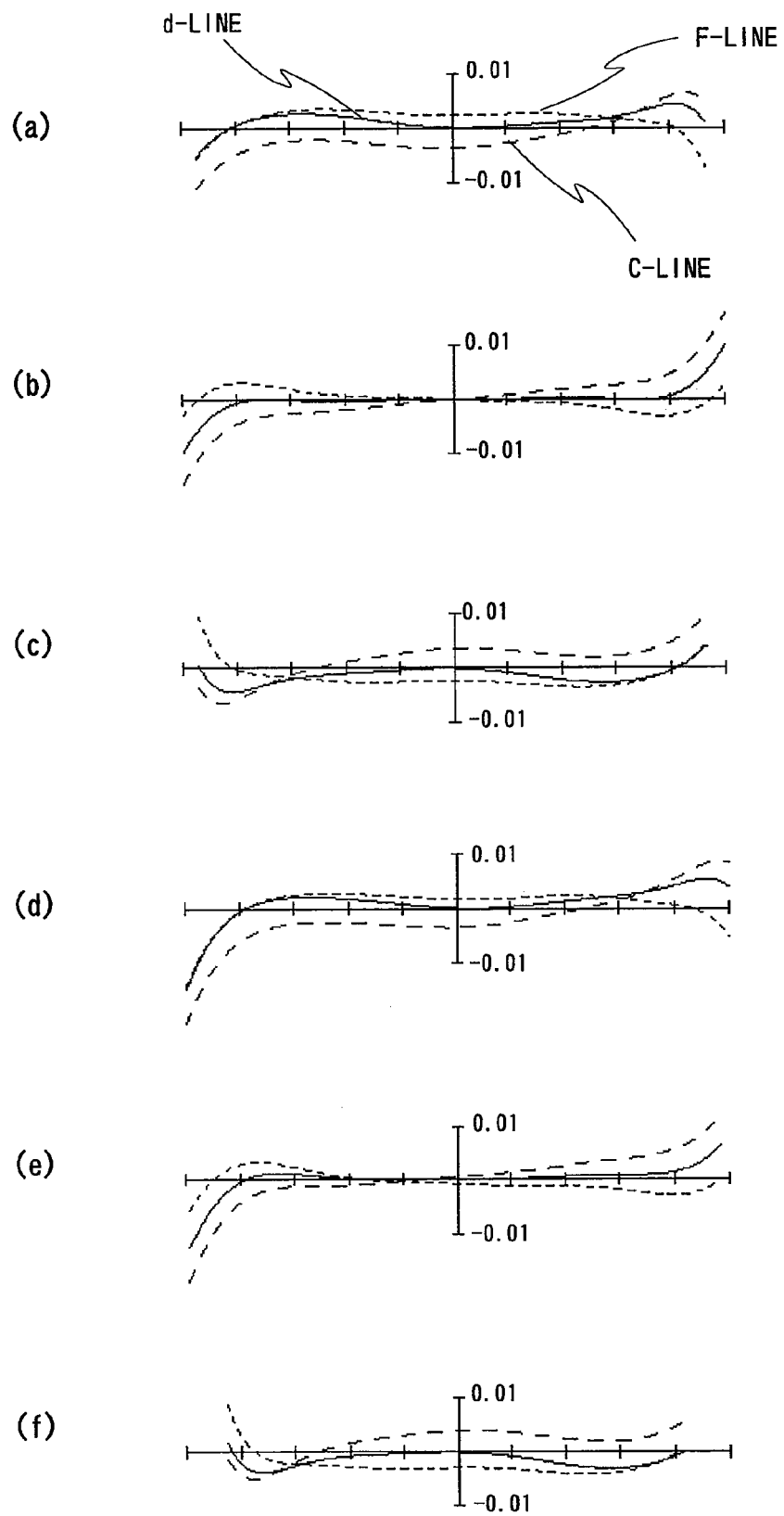
FIG. 16(*a*) is a lateral aberration diagram at an image point of 75% of the maximum image height in a basic state where image blur compensation is not performed at a telephoto limit of a zoom lens system according to Example II-1.
Figure 19:
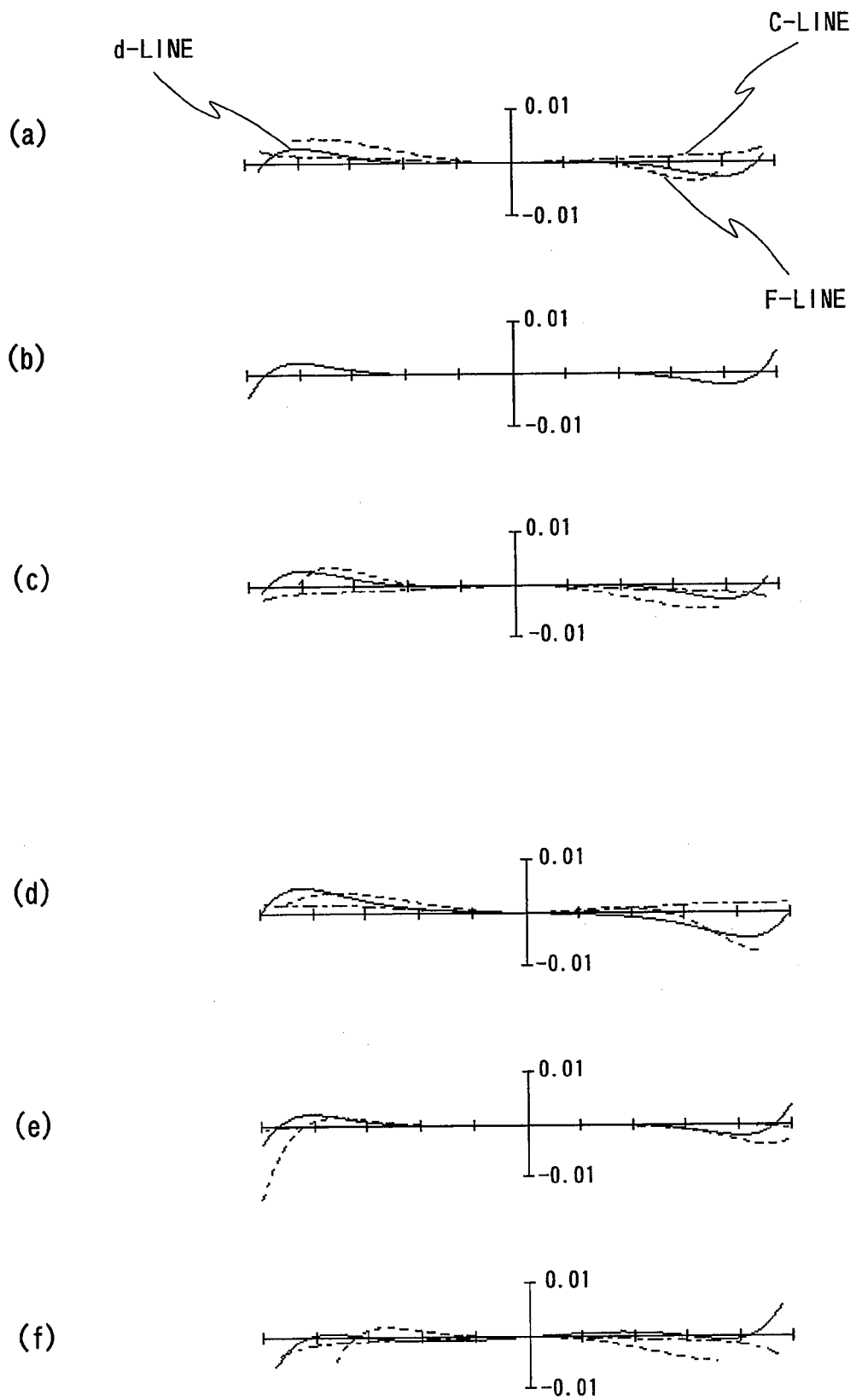
FIG. 19(*a*) is a lateral aberration diagram at an image point of 75% of the maximum image height in a basic state where image blur compensation is not performed at a telephoto limit of a zoom lens system according to Example II-2.
Figure 22:
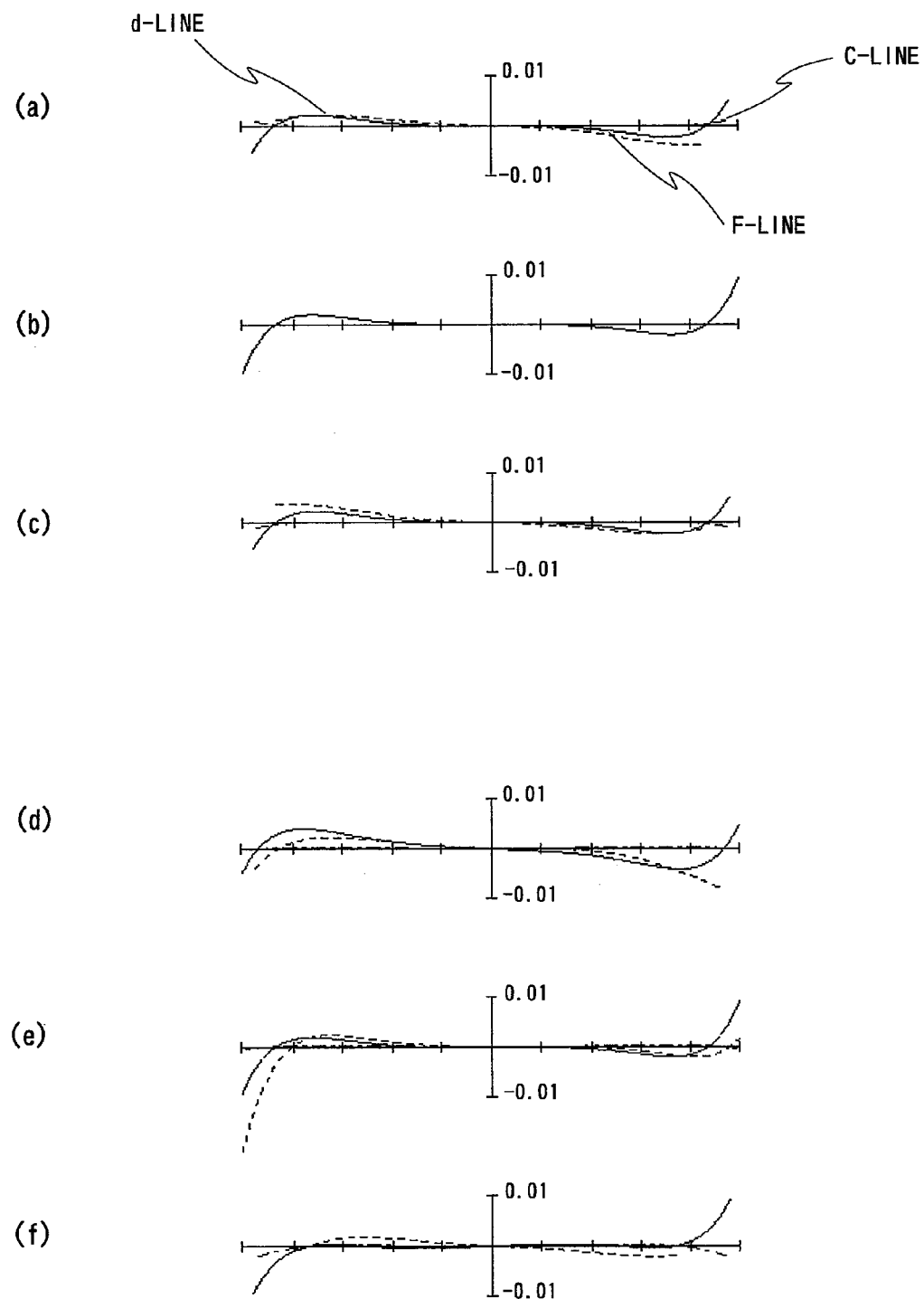
FIG. 22(*a*) is a lateral aberration diagram at an image point of 75% of the maximum image height in a basic state where image blur compensation is not performed at a telephoto limit of a zoom lens system according to Example II-3.
Figure 25:
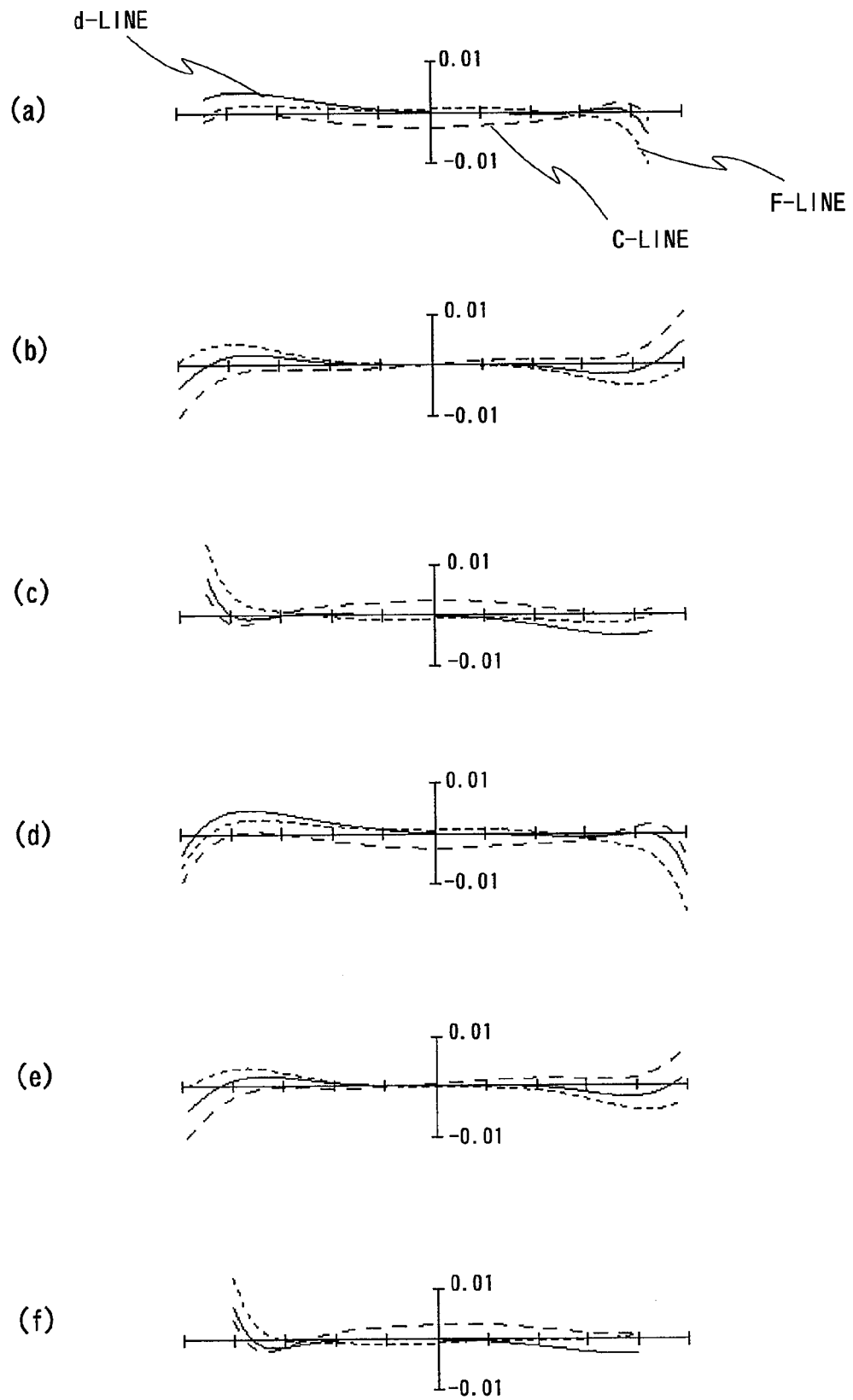
FIG. 25(a) is a lateral aberration diagram at an image point of 75% of the maximum image height in a basic state where image blur compensation is not performed at a telephoto limit of a zoom lens system according to Example II-4.
FIG. 25(b) is a lateral aberration diagram at an axial image point in a basic state where image blur compensation is not performed at a telephoto limit of a zoom lens system according to Example II-4.
FIG. 25(c) is a lateral aberration diagram at an image point of −75% of the maximum image height in a basic state where image blur-compensation is not performed at a telephoto limit of a zoom lens system according to Example II-4.
FIG. 25(d) is a lateral aberration diagram at an image point of 75% of the maximum image height in an image blur compensation state at a telephoto limit of a zoom lens system according to Example II-4.
FIG. 25(e) is a lateral aberration diagram at an axial image point in an image blur compensation state at a telephoto limit of a zoom lens system according to Example II-4.
FIG. 25(f) is a lateral aberration diagram at an image point of −75% of the maximum image height in an image blur compensation state at a telephoto limit of a zoom lens system according to Example II-4.
Figure 28:
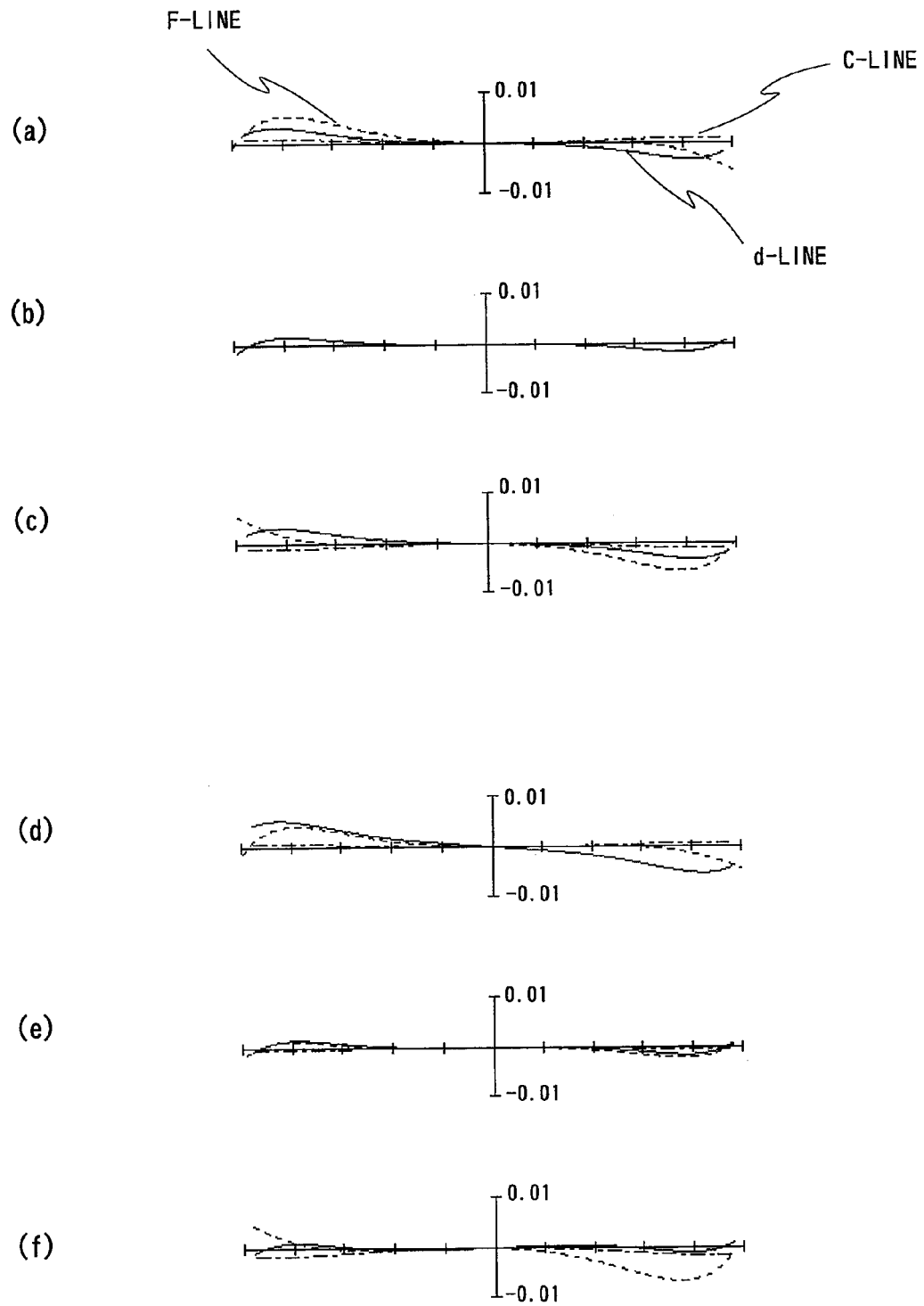
FIG. 28(a) is a lateral aberration diagram at an image point of 75% of the maximum image height in a basic state where image blur compensation is not performed at a telephoto limit of a zoom lens system according to Example II-5.
FIG. 28(b) is a lateral aberration diagram at an axial image point in a basic state where image blur compensation is not performed at a telephoto limit of a zoom lens system according to Example II-5.
FIG. 28(c) is a lateral aberration diagram at an image point of −75% of the maximum image height in a basic state where image blur compensation is not performed at a telephoto limit of a zoom lens system according to Example II-5.
FIG. 28(d) is a lateral aberration diagram at an image point of 75% of the maximum image height in an image blur compensation state at a telephoto limit of a zoom lens system according to Example II-5.
FIG. 28(e) is a lateral aberration diagram at an axial image point in an image blur compensation state at a telephoto limit of a zoom lens system according to Example II-5.
FIG. 28(f) is a lateral aberration diagram at an image point of −75% of the maximum image height in an image blur compensation state at a telephoto limit of a zoom lens system according to Example II-5.

FIG. 16 is a lateral aberration diagram at a telephoto limit of a zoom lens system according to Example II-1. FIG. 19 is a lateral aberration diagram at a telephoto limit of a zoom lens system according to Example II-2. FIG. 22 is a lateral aberration diagram at a telephoto limit of a zoom lens system according to Example II-3. FIG. 25 is a lateral aberration diagram at a telephoto limit of a zoom lens system according to Example II-4. FIG. 28 is a lateral aberration diagram at a telephoto limit of a zoom lens system according to Example II-5.

Figure 32:
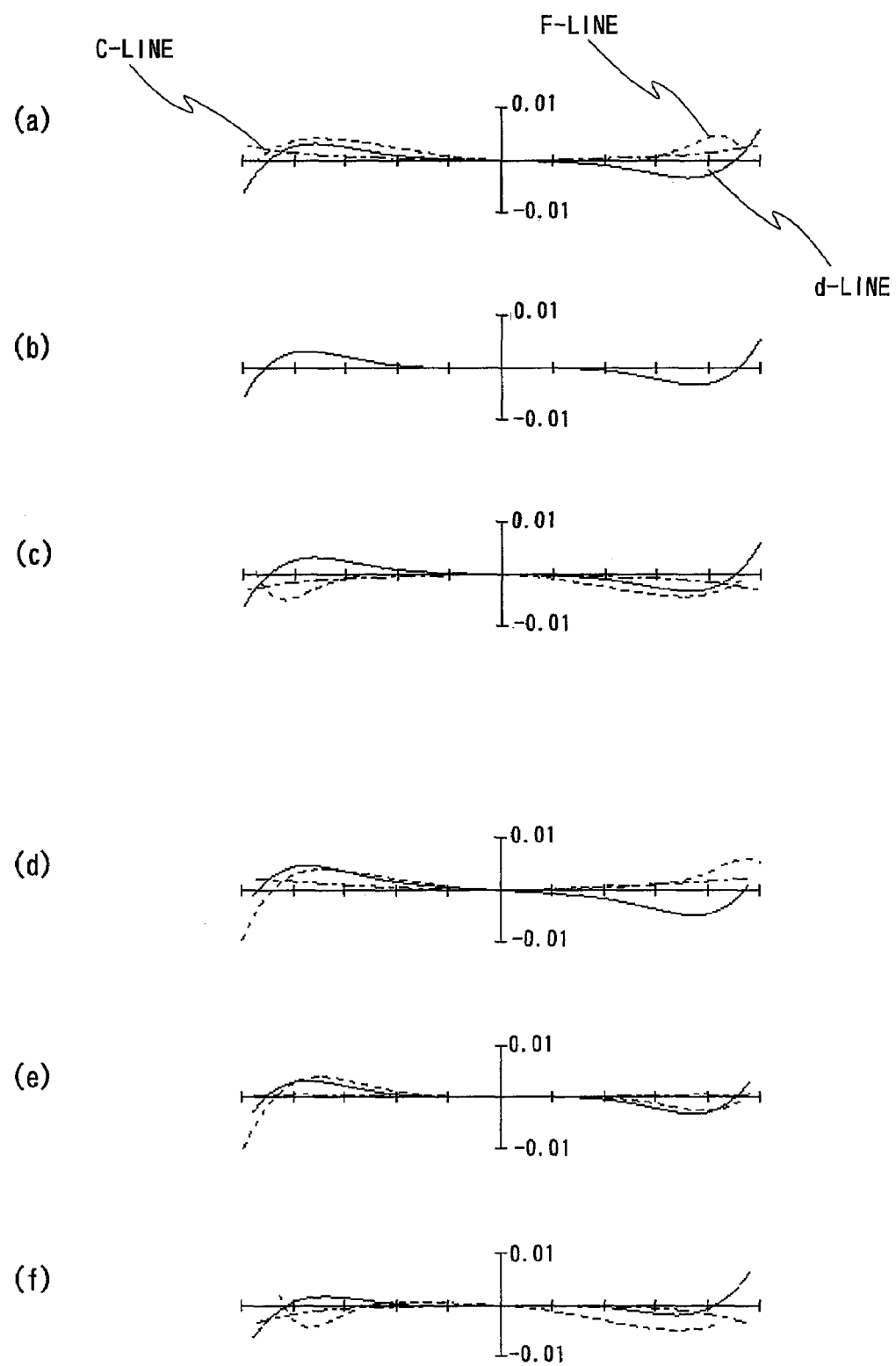
FIG. 32(a) is a lateral aberration diagram at an image point of 75% of the maximum image height in a basic state where image blur compensation is not performed at a telephoto limit of a zoom lens system according to Example III-1.
FIG. 32(b) is a lateral aberration diagram at an axial image point in a basic state where image blur compensation is not performed at a telephoto limit of a zoom lens system according to Example III-1.
FIG. 32(c) is a lateral aberration diagram at an image point of −75% of the maximum image height in a basic state where image blur compensation is not performed at a telephoto limit of a zoom lens system according to Example III-1.
FIG. 32(d) is a lateral aberration diagram at an image point of 75% of the maximum image height in an image blur compensation state at a telephoto limit of a zoom lens system according to Example III-1.
FIG. 32(e) is a lateral aberration diagram at an axial image point in an image blur compensation state at a telephoto limit of a zoom lens system according to Example III-1.
FIG. 32(f) is a lateral aberration diagram at an image point of −75% of the maximum image height in an image blur compensation state at a telephoto limit of a zoom lens system according to Example III-1.
Figure 35:
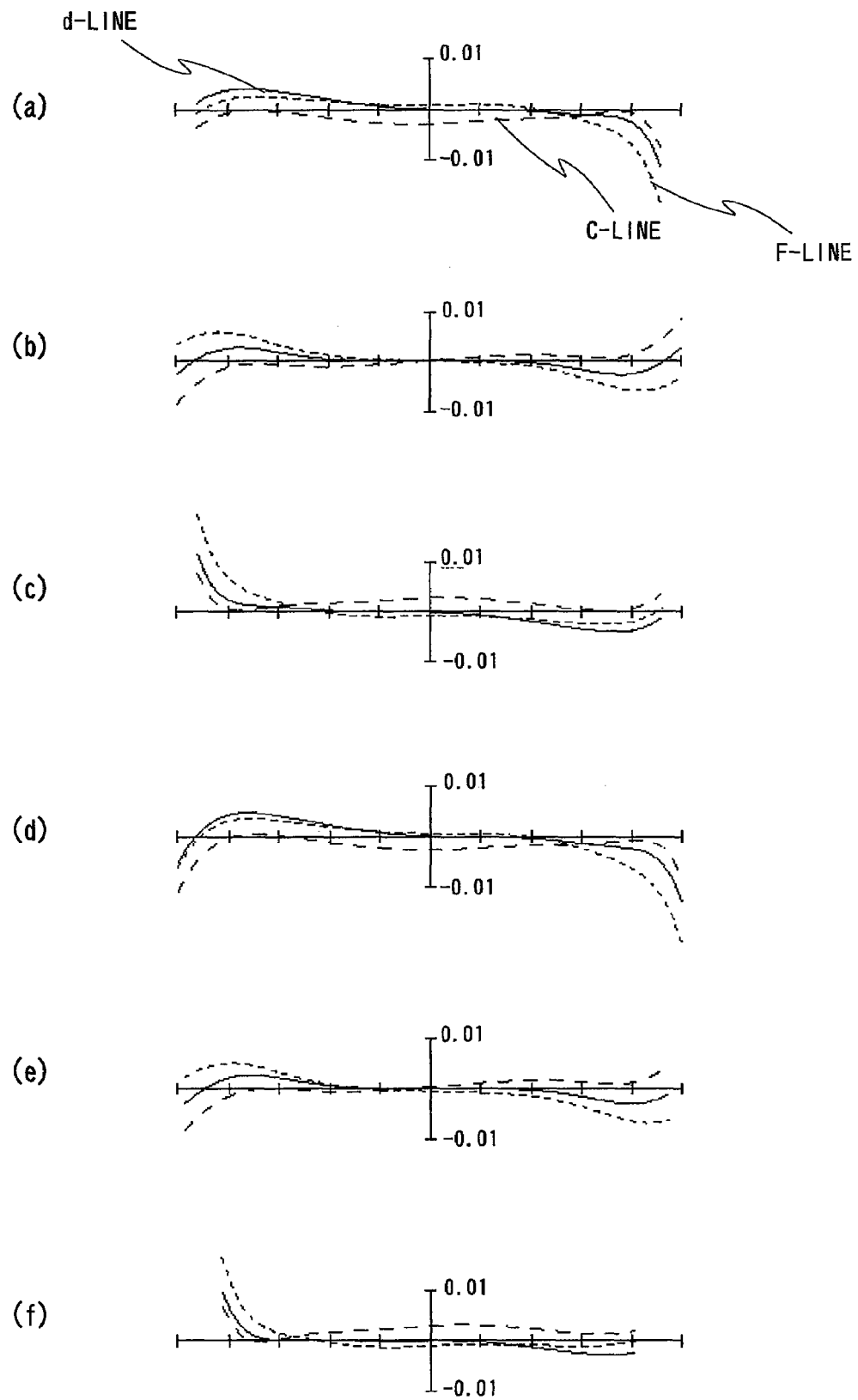
FIG. 35(a) is a lateral aberration diagram at an image point of 75% of the maximum image height in a basic state where image blur compensation is not performed at a telephoto limit of a zoom lens system according to Example III-2.
FIG. 35(b) is a lateral aberration diagram at an axial image point in a basic state where image blur compensation is not performed at a telephoto limit of a zoom lens system according to Example III-2.
FIG. 35(c) is a lateral aberration diagram at an image point of −75% of the maximum image height in a basic state where image blur compensation is not performed at a telephoto limit of a zoom lens system according to Example III-2.
FIG. 35(d) is a lateral aberration diagram at an image point of 75% of the maximum image height in an image blur compensation state at a telephoto limit of a zoom lens system according to Example III-2.
FIG. 35(e) is a lateral aberration diagram at an axial image point in an image blur compensation state at a telephoto limit of a zoom lens system according to Example III-2.
FIG. 35(f) is a lateral aberration diagram at an image point of −75% of the maximum image height in an image blur compensation state at a telephoto limit of a zoom lens system according to Example III-2.
Figure 38:
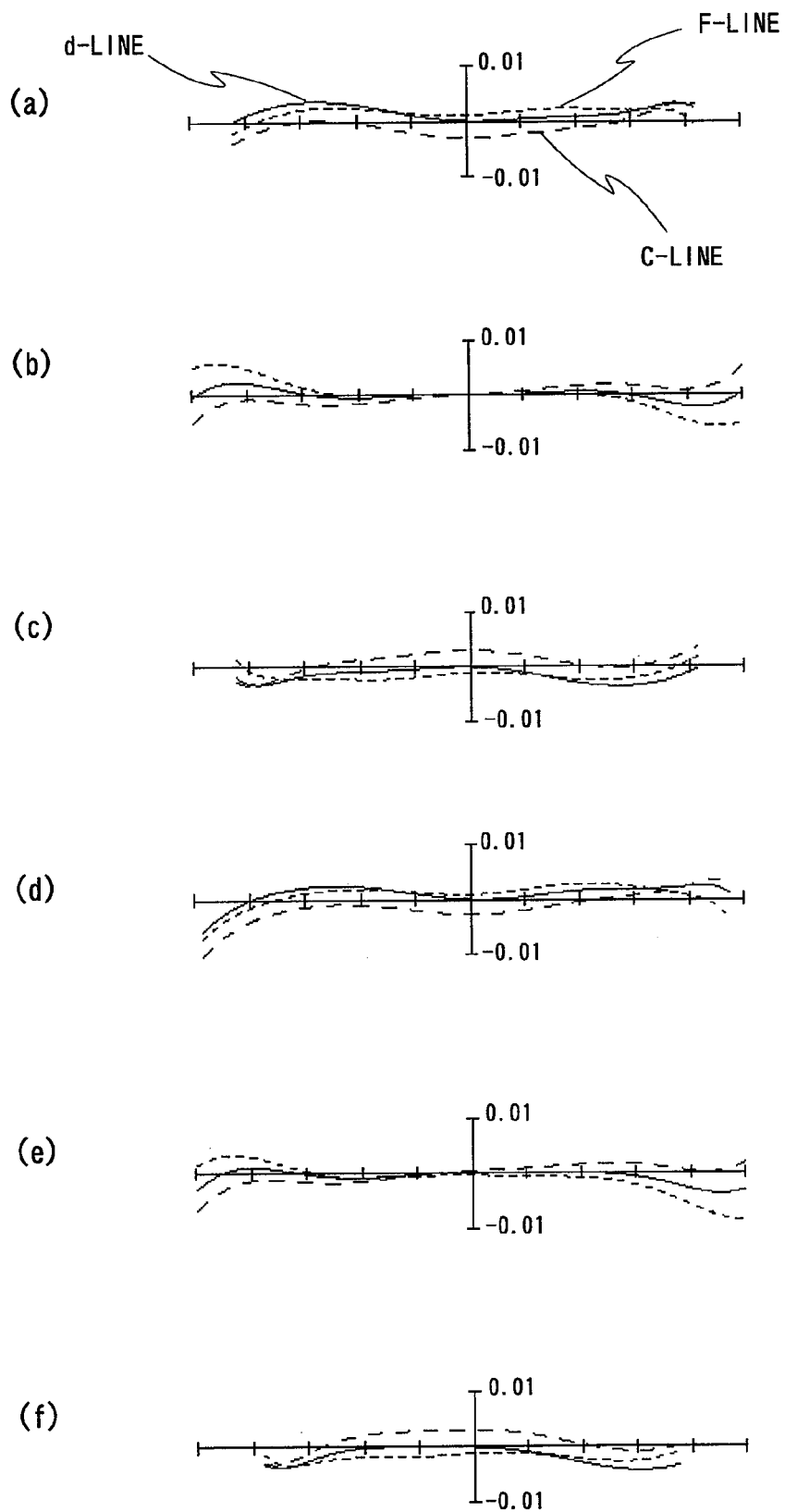
FIG. 38(a) is a lateral aberration diagram at an image point of 75% of the maximum image height in a basic state where image blur compensation is not performed at a telephoto limit of a zoom lens system according to Example III-3.
FIG. 38(b) is a lateral aberration diagram at an axial image point in a basic state where image blur compensation is not performed at a telephoto limit of a zoom lens system according to Example III-3.
FIG. 38(c) is a lateral aberration diagram at an image point of −75% of the maximum image height in a basic state where image blur compensation is not performed at a telephoto limit of a zoom lens system according to Example III-3.
FIG. 38(d) is a lateral aberration diagram at an image point of 75% of the maximum image height in an image blur compensation state at a telephoto limit of a zoom lens system according to Example III-3.
FIG. 38(e) is a lateral aberration diagram at an axial image point in an image blur compensation state at a telephoto limit of a zoom lens system according to Example III-3.
FIG. 38(f) is a lateral aberration diagram at an image point of −75% of the maximum image height in an image blur compensation state at a telephoto limit of a zoom lens system according to Example III-3.
Figure 41:
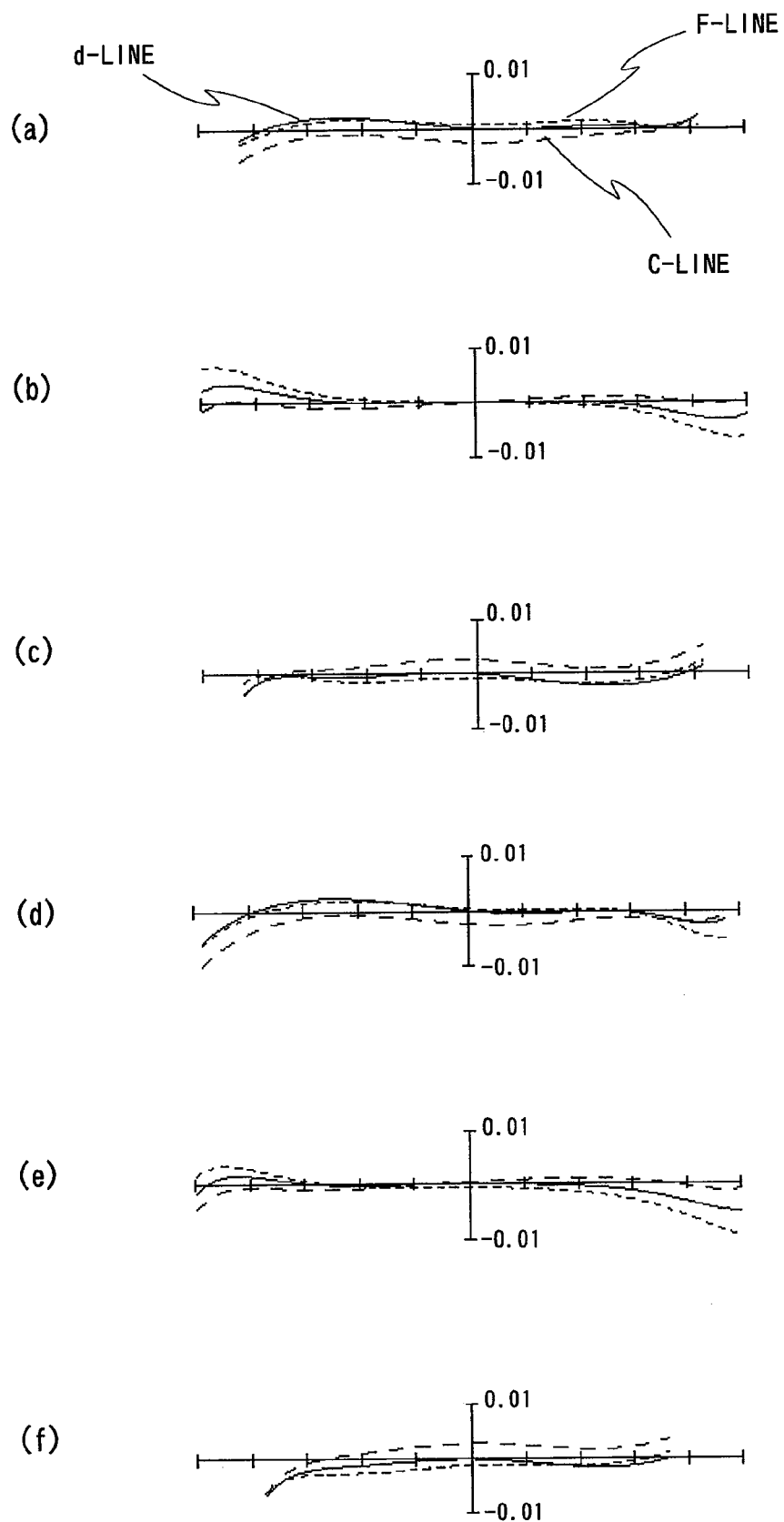
FIG. 41(a) is a lateral aberration diagram at an image point of 75% of the maximum image height in a basic state where image blur compensation is not performed at a telephoto limit of a zoom lens system according to Example III-4.
FIG. 41(b) is a lateral aberration diagram at an axial image point in a basic state where image blur compensation is not performed at a telephoto limit of a zoom lens system according to Example III-4.
FIG. 41(c) is a lateral aberration diagram at an image point of −75% of the maximum image height in a basic state where image blur compensation is not performed at a telephoto limit of a zoom lens system according to Example III-4.
FIG. 41(d) is a lateral aberration diagram at an image point of 75% of the maximum image height in an image blur compensation state at a telephoto limit of a zoom lens system according to Example III-4.
FIG. 41(e) is a lateral aberration diagram at an axial image point in an image blur compensation state at a telephoto limit of a zoom lens system according to Example III-4.
FIG. 41(f) is a lateral aberration diagram at an image point of −75% of the maximum image height in an image blur compensation state at a telephoto limit of a zoom lens system according to Example III-4.
Figure 44:
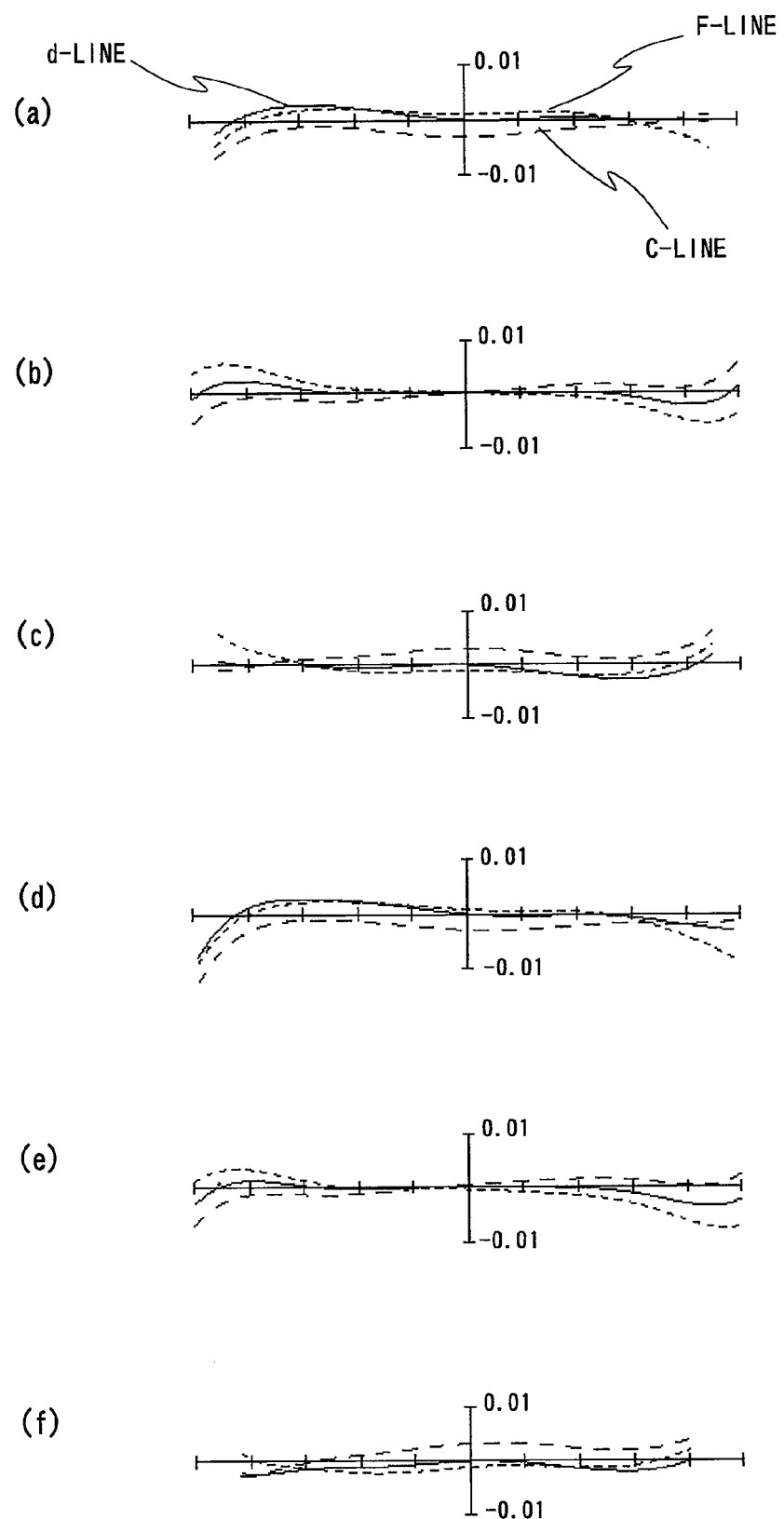
FIG. 44(a) is a lateral aberration diagram at an image point of 75% of the maximum image height in a basic state where image blur compensation is not performed at a telephoto limit of a zoom lens system according to Example III-5.
FIG. 44(b) is a lateral aberration diagram at an axial image point in a basic state where image blur compensation is not performed at a telephoto limit of a zoom lens system according to Example III-5.
FIG. 44(c) is a lateral aberration diagram at an image point of −75% of the maximum image height in a basic state where image blur compensation is not performed at a telephoto limit of a zoom lens system according to Example III-5.
FIG. 44(d) is a lateral aberration diagram at an image point of 75% of the maximum image height in an image blur compensation state at a telephoto limit of a zoom lens system according to Example III-5.
FIG. 44(e) is a lateral aberration diagram at an axial image point in an image blur compensation state at a telephoto limit of a zoom lens system according to Example III-5.
FIG. 44(f) is a lateral aberration diagram at an image point of −75% of the maximum image height in an image blur compensation state at a telephoto limit of a zoom lens system according to Example III-5.
Figure 47:
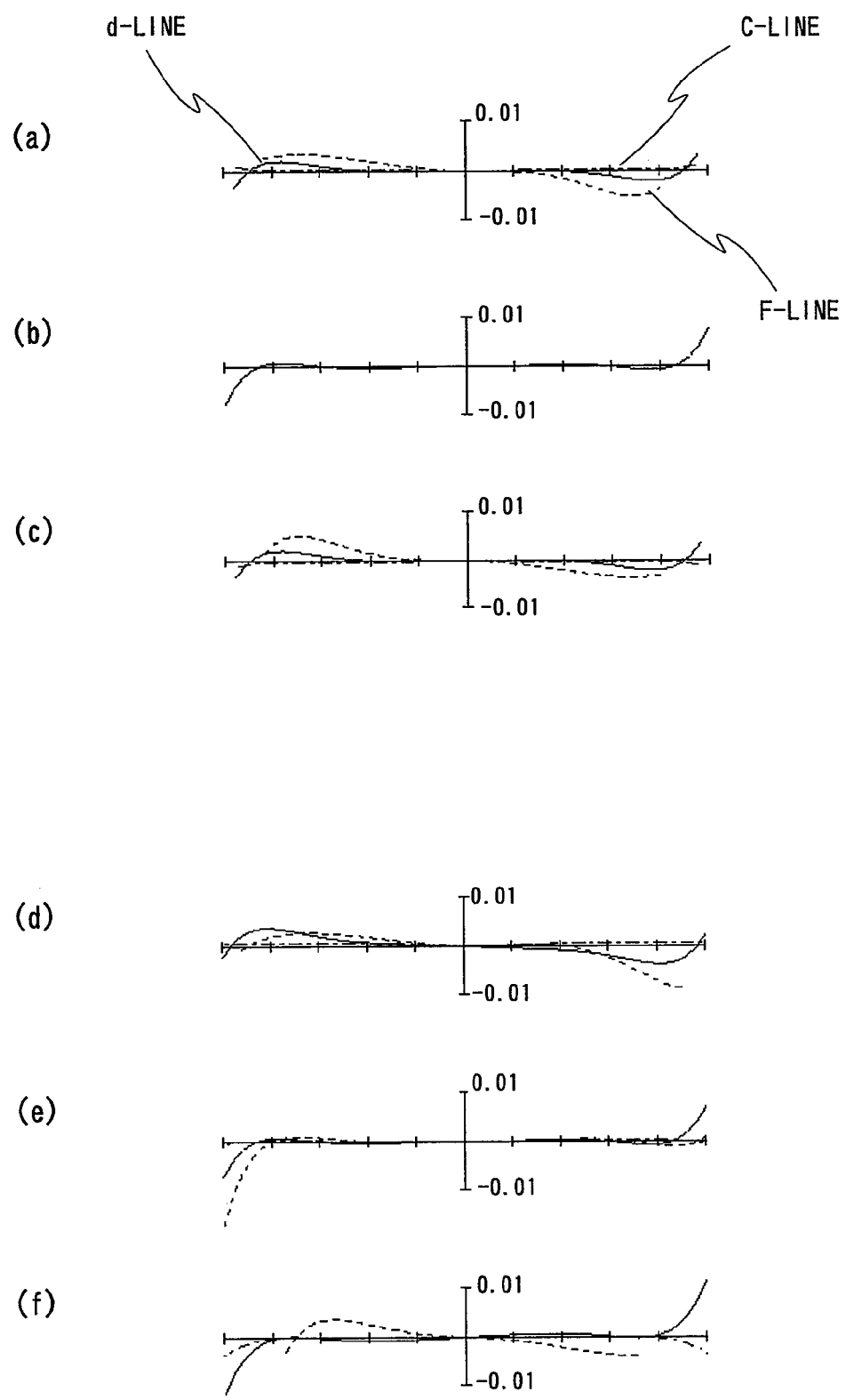
FIG. 47(a) is a lateral aberration diagram at an image point of 75% of the maximum image height in a basic state where image blur compensation is not performed at a telephoto limit of a zoom lens system according to Example III-6.
FIG. 47(b) is a lateral aberration diagram at an axial image point in a basic state where image blur compensation is not performed at a telephoto limit of a zoom lens system according to Example III-6.
FIG. 47(c) is a lateral aberration diagram at an image point of −75% of the maximum image height in a basic state where image blur compensation is not performed at a telephoto limit of a zoom lens system according to Example III-6.
FIG. 47(d) is a lateral aberration diagram at an image point of 75% of the maximum image height in an image blur compensation state at a telephoto limit of a zoom lens system according to Example III-6.
FIG. 47(e) is a lateral aberration diagram at an axial image point in an image blur compensation state at a telephoto limit of a zoom lens system according to Example III-6.
FIG. 47(f) is a lateral aberration diagram at an image point of −75% of the maximum image height in an image blur compensation state at a telephoto limit of a zoom lens system according to Example III-6.

FIG. 32 is a lateral aberration diagram at a telephoto limit of a zoom lens system according to Example III-1. FIG. 35 is a lateral aberration diagram at a telephoto limit of a zoom lens system according to Example III-2. FIG. 38 is a lateral aberration diagram at a telephoto limit of a zoom lens system according to Example III-3. FIG. 41 is a lateral aberration diagram at a telephoto limit of a zoom lens system according to Example III-4. FIG. 44 is a lateral aberration diagram at a telephoto limit of a zoom lens system according to Example III-5. FIG. 47 is a lateral aberration diagram at a telephoto limit of a zoom lens system according to Example III-6.

In each lateral aberration diagram, parts (a) to (c) correspond to the basic state where image blur compensation is not performed at a telephoto limit, while parts (d) to (f) correspond to the image blur compensation state where the entire third lens unit G3 is moved by a predetermined amount in a direction perpendicular to the optical axis at a telephoto limit. Among the lateral aberration diagrams of the basic state, part (a) shows lateral aberration at an image point of 75% of the maximum image height, part (b) shows lateral aberration at the axial image point, and part (c) shows lateral aberration at an image point of −75% of the maximum image height. Among the lateral aberration diagrams of the image blur compensation state, part (d) shows lateral aberration at an image point of 75% of the maximum image height, part (e) shows lateral aberration at the axial image point, and part (f) shows lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional image plane is adopted as the plane containing the optical axis of the first lens unit G1 and the optical axis of the third lens unit G3.

Here, the amount of movement of the third lens unit G3 in a direction perpendicular to the optical axis in the image blur compensation state is as follows.

|  | (Wide-angle limit) | (Telephoto limit) |
| --- | --- | --- |
| Example I-1 | 0.021 mm | 0.137 mm |
| Example I-2 | 0.021 mm | 0.137 mm |
| Example I-3 | 0.023 mm | 0.154 mm |
| Example I-4 | 0.021 mm | 0.163 mm |
| Example II-1 | 0.021 mm | 0.137 mm |
| Example II-2 | 0.021 mm | 0.156 mm |
| Example II-3 | 0.022 mm | 0.156 mm |
| Example II-4 | 0.022 mm | 0.151 mm |
| Example II-5 | 0.027 mm | 0.185 mm |
| Example III-1 | 0.021 mm | 0.137 mm |
| Example III-2 | 0.023 mm | 0.154 mm |
| Example III-3 | 0.022 mm | 0.152 mm |
| Example III-4 | 0.021 mm | 0.137 mm |
| Example III-5 | 0.023 mm | 0.150 mm |
| Example III-6 | 0.022 mm | 0.158 mm |

Here, when the shooting distance is infinity, at a telephoto limit, the amount of image decentering in a case that the zoom lens system inclines by 0.3° is equal to the amount of image decentering in a case that the entire third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +75% image point and the lateral aberration at the −75% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of displacement in parallel required for image blur compensation decreases with decreasing focal length of the entire zoom lens system. Thus, at arbitrary zoom positions, sufficient image blur compensation can be performed for image blur compensation angles up to 0.3° without lowering the imaging characteristics.

Example I-1

The zoom lens system of Example I-1 corresponds to Embodiment I-1 shown in FIG. 1. Table I-1 shows the lens data of the zoom lens system of Example I-1. Table I-2 shows the focal length, the F-number, the half view angle and the variable axial distance data, in the case that the shooting distance is infinity. Table I-3 shows the aspherical data.

TABLE I-1

| Lens unit | Lens element | Surface | r | d | nd | vd |
|---|---|---|---|---|---|---|
| G1 | L1 | 1 | 44.582 | 0.800 | 1.84666 | 23.8 |
|  | L2 | 2 | 26.691 | 3.300 | 1.49700 | 81.6 |
|  |  | 3 | −177.214 | 0.150 |  |  |
|  | L3 | 4 | 21.361 | 2.300 | 1.72916 | 54.7 |
|  |  | 5 | 48.646 | Variable |  |  |
| G2 | L4 | 6 | 119.993* | 1.000 | 1.80470 | 41.0 |
|  |  | 7 | 4.711* | 3.120 |  |  |
|  | L5 | 8 | −11.479 | 0.600 | 1.69680 | 55.5 |
|  |  | 9 | 49.045 | 0.200 |  |  |
|  | L6 | 10 | 16.407 | 1.430 | 1.92286 | 20.9 |
|  |  | 11 | −47.289 | Variable |  |  |
| Diaphragm |  | 12 | ∞ | 0.300 |  |  |
| G3 | L7 | 13 | 4.589 | 1.889 | 1.48749 | 70.4 |
|  |  | 14 | −114.811 | 1.375 |  |  |
|  | L8 | 15 | 10.540* | 1.535 | 1.80359 | 40.8 |
|  | L9 | 16 | −26.909 | 0.600 | 1.84666 | 23.8 |
|  |  | 17 | 6.154 | Variable |  |  |
| G4 | L10 | 18 | 11.669 | 1.250 | 1.65160 | 58.4 |
|  |  | 19 | 34.478 | Variable |  |  |
| G5 | L11 | 20 | 133.010* | 0.950 | 1.51443 | 63.3 |
|  |  | 21 | −28.868 | 0.600 |  |  |
| P |  | 22 | ∞ | 0.780 | 1.51680 | 64.2 |
|  |  | 23 | ∞ |  |  |  |

TABLE I-2

| Axial distance | Wide-angle limit | Middle position | Telephoto limit |
|---|---|---|---|
| d5 | 0.600 | 10.170 | 20.532 |
| d11 | 15.243 | 5.670 | 1.270 |
| d17 | 4.753 | 7.992 | 12.659 |
| d19 | 2.900 | 5.976 | 2.315 |
| f | 4.78 | 14.72 | 44.91 |
| F | 3.45 | 4.67 | 5.05 |
| ω | 38.42 | 13.51 | 4.50 |

TABLE I-3

| Surface | κ | D | E | F | G |
|---|---|---|---|---|---|
| 6 | 0.00E+00 | 1.28E−04 | −2.22E−06 | −4.62E−08 | 1.16E−09 |
| 7 | 0.00E+00 | −2.44E−04 | −1.16E−05 | 1.43E−06 | −1.42E−07 |
| 15 | 0.00E+00 | −1.69E−03 | −4.94E−05 | −1.27E−05 | 7.18E−07 |
| 20 | 0.00E+00 | −3.63E−04 | 3.94E−05 | −2.40E−06 | 6.86E−08 |

Example I-2

The zoom lens system of Example I-2 corresponds to Embodiment I-2 shown in FIG. 4. Table I-4 shows the lens data of the zoom lens system of Example I-2. Table I-5 shows the focal length, the F-number, the half view angle and the variable axial distance data, in the case that the shooting distance is infinity. Table I-6 shows the aspherical data.

TABLE I-4

| Lens unit | Lens element | Surface | r | d | nd | vd |
|---|---|---|---|---|---|---|
| G1 | L1 | 1 | 45.485 | 0.800 | 1.84666 | 23.8 |
|  | L2 | 2 | 27.054 | 3.300 | 1.49700 | 81.6 |
|  |  | 3 | −154.962 | 0.150 |  |  |
|  | L3 | 4 | 21.339 | 2.300 | 1.72916 | 54.7 |
|  |  | 5 | 48.072 | Variable |  |  |
| G2 | L4 | 6 | 123.201* | 1.000 | 1.80470 | 41.0 |
|  |  | 7 | 4.796* | 3.120 |  |  |
|  | L5 | 8 | −12.820 | 0.600 | 1.69680 | 55.5 |
|  |  | 9 | 37.938 | 0.200 |  |  |
|  | L6 | 10 | 16.039 | 1.430 | 1.92286 | 20.9 |
|  |  | 11 | −59.796 | Variable |  |  |
| Diaphragm |  | 12 | ∞ | 0.300 |  |  |
| G3 | L7 | 13 | 4.472 | 1.891 | 1.48749 | 70.4 |
|  |  | 14 | 580.442 | 1.376 |  |  |
|  | L8 | 15 | 9.932* | 1.535 | 1.80359 | 40.8 |
|  | L9 | 16 | −35.991 | 0.600 | 1.84666 | 23.8 |
|  |  | 17 | 5.997 | Variable |  |  |
| G4 | L10 | 18 | 10.643 | 1.400 | 1.48749 | 70.4 |
|  |  | 19 | 49.419 | Variable |  |  |
| G5 | L11 | 20 | 19.327* | 0.900 | 1.51443 | 63.3 |
|  |  | 21 | 97.200 | 0.600 |  |  |
| P |  | 22 | ∞ | 0.780 | 1.51680 | 64.2 |
|  |  | 23 | ∞ |  |  |  |

TABLE I-5

| Axial distance | Wide-angle limit | Middle position | Telephoto limit |
|---|---|---|---|
| d5 | 0.600 | 9.961 | 20.373 |
| d11 | 15.152 | 5.698 | 1.270 |
| d17 | 4.348 | 7.804 | 12.670 |
| d19 | 2.969 | 5.996 | 2.186 |
| f | 4.78 | 14.73 | 45.08 |
| F | 3.42 | 4.68 | 5.06 |
| ω | 38.43 | 13.50 | 4.48 |

TABLE I-6

| Surface | κ | D | E | F | G |
|---|---|---|---|---|---|
| 6 | 0.00E+00 | 1.35E−04 | −3.04E−06 | −5.65E−08 | 1.43E−09 |
| 7 | 0.00E+00 | −1.99E−04 | −1.57E−05 | 1.49E−06 | −1.52E−07 |
| 15 | 0.00E+00 | −1.72E−03 | −5.50E−05 | −1.67E−05 | 1.01E−06 |
| 20 | 0.00E+00 | −3.54E−04 | 4.64E−05 | −2.80E−06 | 9.02E−08 |

Example I-3

The zoom lens system of Example I-3 corresponds to Embodiment I-3 shown in FIG. 7. Table I-7 shows the lens data of the zoom lens system of Example I-3. Table I-8 shows the focal length, the F-number, the half view angle and the variable axial distance data, in the case that the shooting distance is infinity. Table I-9 shows the aspherical data.

TABLE I-7

| Lens unit | Lens element | Surface | r | d | nd | νd |
|---|---|---|---|---|---|---|
| G1 | L1 | 1 | 46.080 | 0.800 | 1.84666 | 23.8 |
|  | L2 | 2 | 27.817 | 3.300 | 1.49700 | 81.6 |
|  |  | 3 | −169.179 | 0.150 |  |  |
|  | L3 | 4 | 21.775 | 2.300 | 1.72916 | 54.7 |
|  |  | 5 | 50.927 | Variable |  |  |
| G2 | L4 | 6 | 110.873* | 1.000 | 1.80470 | 41.0 |
|  |  | 7 | 4.809* | 3.130 |  |  |
|  | L5 | 8 | −13.542 | 0.600 | 1.69680 | 55.5 |
|  |  | 9 | 30.310 | 0.282 |  |  |
|  | L6 | 10 | 15.194 | 1.430 | 1.92286 | 20.9 |
|  |  | 11 | −76.264 | Variable |  |  |
| Diaphragm |  | 12 | ∞ | 0.300 |  |  |
| G3 | L7 | 13 | 4.535 | 1.630 | 1.48749 | 70.4 |
|  |  | 14 | 90.653 | 1.693 |  |  |
|  | L8 | 15 | 12.214* | 1.500 | 1.80359 | 40.8 |
|  | L9 | 16 | −30.559 | 0.600 | 1.84666 | 23.8 |
|  |  | 17 | 6.998 | Variable |  |  |
| G4 | L10 | 18 | 13.311 | 1.500 | 1.48749 | 70.4 |
|  |  | 19 | −68.265 | Variable |  |  |
| G5 | L11 | 20 | 19.300* | 1.000 | 1.51443 | 63.3 |
|  |  | 21 | 97.200 | 0.688 |  |  |
|  | P | 22 | ∞ | 0.780 | 1.51680 | 64.2 |
|  |  | 23 | ∞ |  |  |  |

TABLE I-8

| Axial distance | Wide-angle limit | Middle position | Telephoto limit |
|---|---|---|---|
| d5 | 0.600 | 8.439 | 20.353 |
| d11 | 15.236 | 4.659 | 1.150 |
| d17 | 3.111 | 5.844 | 11.997 |
| d19 | 4.669 | 10.132 | 5.951 |
| f | 4.77 | 14.72 | 45.12 |
| F | 3.40 | 4.79 | 5.05 |
| ω | 38.45 | 13.50 | 4.49 |

TABLE I-9

| Surface | κ | D | E | F | G |
|---|---|---|---|---|---|
| 6 | 0.00E+00 | 1.90E−05 | −1.03E−06 | −1.96E−08 | 7.01E−10 |
| 7 | 0.00E+00 | −3.34E−04 | −1.61E−05 | 6.73E−07 | −9.15E−08 |
| 15 | 0.00E+00 | −1.64E−03 | −5.24E−05 | −1.12E−05 | 4.90E−07 |
| 20 | 0.00E+00 | −7.50E−04 | 1.00E−04 | −6.00E−06 | 1.45E−07 |

Example I-4

The zoom lens system of Example I-4 corresponds to Embodiment I-4 shown in FIG. 10. Table I-10 shows the lens data of the zoom lens system of Example I-4. Table I-11 shows the focal length, the F-number, the half view angle and the variable axial distance data, in the case that the shooting distance is infinity. Table I-12 shows the aspherical data.

TABLE I-10

| Lens unit | Lens element | Surface | r | d | nd | νd |
|---|---|---|---|---|---|---|
| G1 | L1 | 1 | 44.736 | 0.800 | 1.84666 | 23.8 |
|  | L2 | 2 | 26.591 | 3.300 | 1.49700 | 81.6 |
|  |  | 3 | −139.347 | 0.150 |  |  |
|  | L3 | 4 | 20.863 | 2.300 | 1.72916 | 54.7 |
|  |  | 5 | 45.667 | Variable |  |  |
| G2 | L4 | 6 | 85.750* | 1.000 | 1.80470 | 41.0 |
|  |  | 7 | 4.701* | 3.120 |  |  |
|  | L5 | 8 | −14.219 | 0.600 | 1.69680 | 55.5 |
|  |  | 9 | 23.908 | 0.200 |  |  |
|  | L6 | 10 | 13.083 | 1.430 | 1.92286 | 20.9 |
|  |  | 11 | −202.218 | Variable |  |  |
| Diaphragm |  | 12 | ∞ | 0.300 |  |  |
| G3 | L7 | 13 | 4.539 | 1.889 | 1.48749 | 70.4 |
|  |  | 14 | −1153.707 | 1.375 |  |  |
|  | L8 | 15 | 10.332* | 1.535 | 1.80359 | 40.8 |
|  | L9 | 16 | −82.116 | 0.600 | 1.84666 | 23.8 |
|  |  | 17 | 6.009 | Variable |  |  |
| G4 | L10 | 18 | 10.059 | 1.400 | 1.48749 | 70.4 |
|  |  | 19 | 43.371 | Variable |  |  |
| G5 | L11 | 20 | −109.273* | 0.950 | 1.51443 | 63.3 |
|  |  | 21 | −19.574 |  |  |  |
|  | P | 22 | ∞ | 0.780 | 1.51680 | 64.2 |
|  |  | 23 | ∞ |  |  |  |

TABLE I-11

| Axial distance | Wide-angle limit | Middle position | Telephoto limit |
|---|---|---|---|
| d5 | 0.600 | 10.170 | 21.028 |
| d11 | 15.239 | 6.498 | 1.270 |
| d17 | 3.224 | 6.756 | 13.563 |
| d19 | 3.952 | 7.254 | 2.071 |
| d21 | 0.897 | 0.651 | 0.591 |
| f | 4.77 | 14.72 | 54.72 |
| F | 3.49 | 4.78 | 5.31 |
| ω | 38.44 | 13.51 | 3.69 |

TABLE I-12

| Surface | κ | D | E | F | G |
|---|---|---|---|---|---|
| 6 | 0.00E+00 | 1.38E−04 | −2.91E−06 | −5.46E−08 | 1.39E−09 |
| 7 | 0.00E+00 | −1.27E−04 | −1.02E−05 | 1.55E−06 | −1.55E−07 |
| 15 | 0.00E+00 | −1.71E−03 | −2.73E−05 | −1.92E−05 | 1.22E−06 |
| 20 | 0.00E+00 | −4.09E−04 | 4.44E−05 | −3.09E−06 | 8.96E−08 |

The following Table I-13 shows values corresponding to the above-mentioned conditions (I-1) to (I-3) and (I-5). Here, in Table I-13, $Y_W$ is an amount of movement in a direction perpendicular to the optical axis at the time of maximum blur compensation in the third lens unit with a focal length $f_W$ of the entire system at a wide-angle limit, and in a state that the zoom lens system is at a wide-angle limit, a corresponding value $(Y_W/Y_T)/(f_W/f_T)$ at the time of $Y=Y_W$ ($f=f_W$) in the condition formula (I-5) is obtained.

TABLE I-13

|  |  | Example | | | |
|---|---|---|---|---|---|
| Condition | | I-1 | I-2 | I-3 | I-4 |
| (I-1) | $(R_{4R} + R_{4F})/(R_{4R} − R_{4F})$ | 2.023 | 1.549 | 0.674 | 1.604 |
| (I-2) | $(D_{3T}/D_{3W})/(D_{4T}/D_{4W})$ | 3.336 | 3.958 | 3.021 | 8.028 |
| (I-3) | $f_4/f_W$ | 5.547 | 5.754 | 4.815 | 5.551 |
| (I-5) | $(Y_W/Y_T)/(f_W/f_T)$ | 1.441 | 1.446 | 1.412 | 1.477 |
|  | $Y_W$ | 0.021 | 0.021 | 0.023 | 0.021 |
|  | $Y_T$ | 0.137 | 0.137 | 0.154 | 0.163 |

Example II-1

The zoom lens system of Example II-1 corresponds to Embodiment II-1 shown in FIG. 14. Table II-1 shows the lens data of the zoom lens system of Example II-1. Table II-2 shows the focal length, the F-number, the half view angle and the variable axial distance data, in the case that the shooting distance is infinity. Table II-3 shows the aspherical data.

TABLE II-1

| Lens unit | Lens element | Surface | r | d | nd | vd |
|---|---|---|---|---|---|---|
| G1 | L1 | 1 | 45.468 | 0.800 | 1.84666 | 23.8 |
|  | L2 | 2 | 27.248 | 3.300 | 1.49700 | 81.6 |
|  |  | 3 | −149.983 | 0.150 | | |
|  | L3 | 4 | 21.640 | 2.300 | 1.72916 | 54.7 |
|  |  | 5 | 48.750 | Variable | | |
| G2 | L4 | 6 | 121.766* | 1.000 | 1.80470 | 41.0 |
|  |  | 7 | 4.804* | 3.120 | | |
|  | L5 | 8 | −12.801 | 0.600 | 1.69680 | 55.5 |
|  |  | 9 | 38.803 | 0.200 | | |

TABLE II-1-continued

| Lens unit | Lens element | Surface | r | d | nd | vd |
|---|---|---|---|---|---|---|
|  | L6 | 10 | 16.009 | 1.430 | 1.92286 | 20.9 |
|  |  | 11 | −59.796 | Variable | | |
| Diaphragm |  | 12 | ∞ | 0.300 | | |
| G3 | L7 | 13 | 4.493 | 1.893 | 1.48749 | 70.4 |
|  |  | 14 | 1005.496 | 1.387 | | |
|  | L8 | 15 | 9.936* | 1.519 | 1.80359 | 40.8 |
|  | L9 | 16 | −45.288 | 0.600 | 1.84666 | 23.8 |
|  |  | 17 | 6.000 | Variable | | |
| G4 | L10 | 18 | 11.023 | 1.400 | 1.48749 | 70.4 |
|  |  | 19 | 59.501 | Variable | | |
| G5 | L11 | 20 | 19.386* | 0.900 | 1.51443 | 63.3 |
|  |  | 21 | 97.200 | 0.600 | | |
| P |  | 22 | ∞ | 0.780 | 1.51680 | 64.2 |
|  |  | 23 | ∞ | | | |

TABLE II-2

| Axial distance | Wide-angle limit | Middle position | Telephoto limit |
|---|---|---|---|
| d5 | 0.600 | 9.958 | 20.359 |
| d11 | 15.217 | 5.633 | 1.150 |
| d17 | 4.173 | 7.540 | 12.342 |
| d19 | 3.099 | 6.196 | 2.592 |
| f | 4.77 | 14.73 | 44.80 |
| F | 3.36 | 4.60 | 4.97 |
| ω | 38.52 | 13.50 | 4.52 |

TABLE II-3

| Surface | κ | D | E | F | G |
|---|---|---|---|---|---|
| 6 | 0.00E+00 | 1.33E−04 | −3.05E−06 | −5.64E−08 | 1.44E−09 |
| 7 | 0.00E+00 | −1.80E−04 | −1.65E−05 | 1.51E−06 | −1.49E−07 |
| 15 | 0.00E+00 | −1.74E−03 | −4.93E−05 | −1.55E−05 | 8.07E−07 |
| 20 | 0.00E+00 | −3.41E−04 | 4.90E−05 | −2.78E−06 | 8.57E−08 |

Example II-2

The zoom lens system of Example II-2 corresponds to Embodiment II-2 shown in FIG. 17. Table II-4 shows the lens data of the zoom lens system of Example II-2. Table II-5 shows the focal length, the F-number, the half view angle and the variable axial distance data, in the case that the shooting distance is infinity. Table II-6 shows the aspherical data.

TABLE II-4

| Lens unit | Lens element | Surface | r | d | nd | vd |
|---|---|---|---|---|---|---|
| G1 | L1 | 1 | 41.995 | 0.100 | 1.84666 | 23.8 |
|  | L2 | 2 | 26.169 | 3.300 | 1.49700 | 81.6 |
|  |  | 3 | −206.133 | 0.150 | | |
|  | L3 | 4 | 21.174 | 2.300 | 1.72916 | 54.7 |
|  |  | 5 | 47.332 | Variable | | |

TABLE II-4-continued

| Lens unit | Lens element | Surface | r | d | nd | vd |
|---|---|---|---|---|---|---|
| G2 | L4 | 6 | 45.068* | 1.000 | 1.80470 | 41.0 |
|  |  | 7 | 4.932* | 2.638 |  |  |
|  | L5 | 8 | −23.682 | 0.600 | 1.69680 | 55.5 |
|  |  | 9 | 9.810 | 0.573 |  |  |
|  | L6 | 10 | 9.810 | 1.430 | 1.92286 | 20.9 |
|  |  | 11 | 68.183 | Variable |  |  |
| Diaphragm |  | 12 | ∞ | 0.300 |  |  |
| G3 | L7 | 13 | 4.396 | 1.400 | 1.48749 | 70.4 |
|  |  | 14 | 136.949 | 1.707 |  |  |
|  | L8 | 15 | 11.576* | 0.900 | 1.80359 | 40.8 |
|  | L9 | 16 | −31.113 | 0.100 | 1.84666 | 23.8 |
|  |  | 17 | 7.439 | Variable |  |  |
| G4 | L10 | 18 | 12.354* | 1.500 | 1.51443 | 63.3 |
|  |  | 19 | −47.628 | Variable |  |  |
| P |  | 20 | ∞ | 0.780 | 1.51680 | 64.2 |
|  |  | 21 | ∞ |  |  |  |

TABLE II-5

| Axial distance | Wide-angle limit | Middle position | Telephoto limit |
|---|---|---|---|
| d5 | 0.600 | 11.861 | 20.721 |
| d11 | 14.998 | 5.389 | 1.300 |
| d17 | 5.919 | 6.106 | 12.080 |
| d19 | 4.870 | 8.794 | 5.862 |
| f | 4.77 | 14.72 | 45.10 |
| F | 3.44 | 4.03 | 4.54 |
| ω | 38.42 | 13.50 | 4.53 |

TABLE II-6

| Surface | κ | D | E | F | G |
|---|---|---|---|---|---|
| 6 | 0.00E+00 | −1.43E−05 | −9.08E−07 | −1.42E−08 | 4.61E−10 |
| 7 | 0.00E+00 | −2.33E−04 | −1.44E−05 | 9.21E−07 | −8.42E−08 |
| 15 | 0.00E+00 | −1.80E−03 | −7.05E−05 | −8.22E−06 | −2.64E−07 |
| 18 | 0.00E+00 | −1.18E−04 | 1.18E−05 | −6.12E−07 | 1.36E−08 |

Example II-3

The zoom lens system of Example II-3 corresponds to Embodiment II-3 shown in FIG. 20. Table II-7 shows the lens data of the zoom lens system of Example II-3. Table II-8 shows the focal length, the F-number, the half view angle and the variable axial distance data, in the case that the shooting distance is infinity. Table II-9 shows the aspherical data.

TABLE II-7

| Lens unit | Lens element | Surface | r | d | nd | vd |
|---|---|---|---|---|---|---|
| G1 | L1 | 1 | 43.262 | 0.800 | 1.84666 | 23.8 |
|  | L2 | 2 | 26.651 | 3.300 | 1.49700 | 81.6 |
|  |  | 3 | −190.947 | 0.150 |  |  |
|  | L3 | 4 | 21.688 | 2.300 | 1.72916 | 54.7 |
|  |  | 5 | 50.711 | Variable |  |  |
| G2 | L4 | 6 | 48.518* | 1.000 | 1.80470 | 41.0 |
|  |  | 7 | 4.915* | 2.663 |  |  |
|  | L5 | 8 | −23.897 | 0.600 | 1.69680 | 55.5 |
|  |  | 9 | 11.362 | 0.573 |  |  |
|  | L6 | 10 | 10.288 | 1.430 | 1.92286 | 20.9 |
|  |  | 11 | 57.444 | Variable |  |  |
| Diaphragm |  | 12 | ∞ | 0.300 |  |  |
| G3 | L7 | 13 | 4.381 | 1.618 | 1.48749 | 70.4 |
|  |  | 14 | 113.596 | 1.595 |  |  |
|  | L8 | 15 | 12.587* | 1.200 | 1.80359 | 40.8 |
|  | L9 | 16 | −36.185 | 0.600 | 1.84666 | 23.8 |
|  |  | 17 | 7.210 | Variable |  |  |
| G4 | L10 | 18 | 11.977* | 1.500 | 1.51443 | 63.3 |
|  |  | 19 | −46.074 | Variable |  |  |
| P |  | 20 | ∞ | 0.780 | 1.51680 | 64.2 |
|  |  | 21 | ∞ |  |  |  |

TABLE II-8

| Axial distance | Wide-angle limit | Middle position | Telephoto limit |
|---|---|---|---|
| d5 | 0.600 | 10.952 | 20.353 |
| d11 | 15.436 | 5.338 | 1.300 |
| d17 | 5.067 | 5.406 | 11.221 |
| d19 | 4.652 | 9.037 | 6.454 |
| f | 4.77 | 14.72 | 45.12 |
| F | 3.46 | 4.22 | 4.69 |
| ω | 38.43 | 13.50 | 4.54 |

TABLE II-9

| Surface | κ | D | E | F | G |
|---|---|---|---|---|---|
| 6 | 0.00E+00 | −1.78E−05 | −9.93E−07 | −1.52E−08 | 5.28E−10 |
| 7 | 0.00E+00 | −1.88E−04 | −1.71E−05 | 9.69E−07 | −8.47E−08 |
| 15 | 0.00E+00 | −1.80E−03 | −7.89E−05 | −9.68E−06 | 8.30E−08 |
| 18 | 0.00E+00 | −6.83E−05 | 9.71E−06 | −6.32E−07 | 1.62E−08 |

Example II-4

The zoom lens system of Example II-4 corresponds to Embodiment II-4 shown in FIG. 23. Table II-10 shows the lens data of the zoom lens system of Example II-4. Table II-11 shows the focal length, the F-number, the half view angle and the variable axial distance data, in the case that the shooting distance is infinity. Table II-12 shows the aspherical data.

TABLE II-10

| Lens unit | Lens element | Surface | r | d | nd | vd |
|---|---|---|---|---|---|---|
| G1 | L1 | 1 | 45.739 | 0.900 | 1.84666 | 23.8 |
|  | L2 | 2 | 26.938 | 3.300 | 1.49700 | 81.6 |
|  |  | 3 | −162.750 | 0.150 |  |  |
|  | L3 | 4 | 21.217 | 2.487 | 1.72916 | 54.7 |
|  |  | 5 | 48.287 | Variable |  |  |
| G2 | L4 | 6 | 169.698* | 1.000 | 1.80470 | 41.0 |
|  |  | 7 | 4.837* | 3.400 |  |  |
|  | L5 | 8 | −9.955 | 0.700 | 1.69680 | 55.5 |
|  |  | 9 | 159.199 | 0.282 |  |  |
|  | L6 | 10 | 22.962 | 1.500 | 1.92286 | 20.9 |
|  |  | 11 | −33.053 | Variable |  |  |
| Diaphragm |  | 12 | ∞ | 0.300 |  |  |
| G3 | L7 | 13 | 4.960 | 1.963 | 1.48749 | 70.4 |
|  |  | 14 | 628.529 | 1.684 |  |  |
|  | L8 | 15 | 13.124* | 1.325 | 1.80359 | 40.8 |
|  | L9 | 16 | −104.389 | 0.600 | 1.84666 | 23.8 |
|  |  | 17 | 7.829 | Variable |  |  |
| G4 | L10 | 18 | 14.496 | 2.400 | 1.48749 | 70.4 |
|  | L11 | 19 | −15.887 | 0.670 | 1.84666 | 23.8 |
|  |  | 20 | −25.725 | Variable |  |  |
| G5 | L12 | 21 | −60.551 | 0.924 | 1.51443 | 63.3 |
|  |  | 22 | −18.498* | 1.188 |  |  |
|  | P | 23 | ∞ | 0.900 | 1.51680 | 64.2 |
|  |  | 24 | ∞ |  |  |  |

TABLE II-11

| Axial distance | Wide-angle limit | Middle position | Telephoto limit |
|---|---|---|---|
| d5 | 0.650 | 8.144 | 20.363 |
| d11 | 15.893 | 4.673 | 1.150 |
| d17 | 4.335 | 8.685 | 12.257 |
| d20 | 3.289 | 8.897 | 5.385 |
| f | 4.78 | 14.72 | 45.18 |
| F | 3.44 | 4.83 | 4.92 |
| ω | 38.42 | 13.50 | 4.47 |

TABLE II-12

| Surface | κ | D | E | F | G |
|---|---|---|---|---|---|
| 6 | 0.00E+00 | 2.90E−05 | −5.46E−07 | −6.32E−09 | 2.94E−10 |
| 7 | 0.00E+00 | −3.63E−04 | −2.27E−05 | 1.26E−06 | −9.26E−08 |
| 15 | 0.00E+00 | −1.30E−03 | −3.51E−05 | −8.43E−06 | 5.96E−07 |
| 22 | 0.00E+00 | 9.93E−04 | −1.04E−04 | 6.47E−06 | −1.61E−07 |

Example II-5

The zoom lens system of Example II-5 corresponds to Embodiment II-5 shown in FIG. 26. Table II-13 shows the lens data of the zoom lens system of Example II-5. Table II-14 shows the focal length, the F-number, the half view angle and the variable axial distance data, in the case that the shooting distance is infinity. Table II-15 shows the aspherical data.

TABLE II-13

| Lens unit | Lens element | Surface | r | d | nd | vd |
|---|---|---|---|---|---|---|
| G1 | L1 | 1 | 36.564 | 0.900 | 1.84666 | 23.8 |
|  | L2 | 2 | 21.940 | 3.700 | 1.48749 | 70.4 |
|  |  | 3 | 2505.637 | 0.150 |  |  |
|  | L3 | 4 | 24.279 | 2.700 | 1.77250 | 49.6 |
|  |  | 5 | 103.342 | Variable |  |  |
| G2 | L4 | 6 | 165.901 | 0.630 | 1.83481 | 42.7 |
|  |  | 7 | 5.757 | 3.131 |  |  |
|  | L5 | 8 | −11.201* | 0.720 | 1.60602 | 57.5 |
|  |  | 9 | 23.015 | 0.308 |  |  |
|  | L6 | 10 | 19.370 | 1.500 | 1.84666 | 23.8 |
|  |  | 11 | −33.544 | Variable |  |  |
| Diaphragm |  | 12 | ∞ | 0.900 |  |  |
| G3 | L7 | 13 | 8.412 | 1.940 | 1.80610 | 40.7 |
|  |  | 14 | 563.015 | 1.884 |  |  |
|  | L8 | 15 | 10.255* | 2.000 | 1.66547 | 55.2 |
|  | L9 | 16 | −9.712 | 0.580 | 1.80518 | 25.5 |
|  |  | 17 | 6.318 | Variable |  |  |
| G4 | L10 | 18 | 10.579* | 1.600 | 1.51835 | 70.4 |
|  |  | 19 | 42.609 | Variable |  |  |
| G5 | L11 | 20 | 7.558 | 2.000 | 1.48749 | 70.4 |
|  |  | 21 | 33.375 | 2.229 |  |  |
|  | P | 22 | ∞ | 0.900 | 1.51680 | 64.2 |
|  |  | 23 | ∞ |  |  |  |

TABLE II-14

| Axial distance | Wide-angle limit | Middle position | Telephoto limit |
|---|---|---|---|
| d5 | 0.700 | 7.776 | 17.183 |
| d11 | 20.000 | 7.722 | 0.914 |
| d17 | 7.151 | 11.985 | 16.021 |
| d19 | 0.980 | 8.995 | 10.240 |
| f | 4.70 | 14.53 | 45.02 |
| F | 2.85 | 4.03 | 4.34 |
| ω | 35.79 | 12.68 | 4.18 |

TABLE II-15

| Surface | κ | D | E | F | G |
|---|---|---|---|---|---|
| 8 | 0.00E+00 | 2.71E−04 | 7.89E−06 | −2.84E−07 | 4.82E−09 |
| 15 | 0.00E+00 | −4.24E−04 | −7.49E−06 | −2.33E−07 | −1.23E−09 |
| 18 | 0.00E+00 | −3.96E−05 | 1.92E−06 | −9.87E−08 | 1.68E−09 |

The following Table II-16 shows values corresponding to the above-mentioned conditions (II-1) to (II-3) and (II-5). Here, in Table II-16, $Y_W$ is an amount of movement in a direction perpendicular to the optical axis at the time of maximum blur compensation in the third lens unit with a focal length $f_W$ of the entire system at a wide-angle limit, and in a state that the zoom lens system is at a wide-angle limit, a corresponding value $(Y_W/Y_T)/(f_W/f_T)$ at the time of $Y=Y_W$ ($f=f_W$) in the condition formula (II-5) is obtained.

TABLE II-16

| | Example | | | | |
|---|---|---|---|---|---|
| Condition | II-1 | II-2 | II-3 | II-4 | II-5 |
| (II-1) $D_{aII}/(f_W \times \tan\omega_W)$ | 5.189 | 4.675 | 5.104 | 5.898 | 6.416 |
| (II-2) $(D_{1T} - D_{1W})/D_1$ | 3.017 | 3.439 | 3.016 | 2.883 | 2.212 |
| (II-3) $D_{3W}/D_{3T}$ | 0.338 | 0.490 | 0.452 | 0.354 | 0.446 |
| (II-5) $(Y_W/Y_T)/(f_W/f_T)$ | 1.440 | 1.273 | 1.333 | 1.377 | 1.398 |
| $f_T/f_W$ | 9.392 | 9.453 | 9.452 | 9.453 | 9.577 |
| $\omega_W$ | 38.517 | 38.420 | 38.429 | 38.419 | 35.786 |
| $Y_W$ | 0.021 | 0.021 | 0.022 | 0.022 | 0.027 |
| $Y_T$ | 0.137 | 0.156 | 0.156 | 0.151 | 0.185 |

Example III-1

The zoom lens system of Example III-1 corresponds to Embodiment III-1 shown in FIG. 30. Table III-1 shows the lens data of the zoom lens system of Example III-1. Table III-2 shows the focal length, the F-number, the half view angle and the variable axial distance data, in the case that the shooting distance is infinity. Table III-3 shows the aspherical data.

TABLE III-1

| Lens unit | Lens element | Surface | r | d | nd | νd |
|---|---|---|---|---|---|---|
| G1 | L1 | 1 | 45.491 | 0.800 | 1.84666 | 23.8 |
| | L2 | 2 | 27.059 | 3.300 | 1.49700 | 81.6 |
| | | 3 | −155.201 | 0.150 | | |
| | L3 | 4 | 21.333 | 2.300 | 1.72916 | 54.7 |
| | | 5 | 48.081 | Variable | | |

TABLE III-1-continued

| Lens unit | Lens element | Surface | r | d | nd | νd |
|---|---|---|---|---|---|---|
| G2 | L4 | 6 | 123.112* | 1.000 | 1.80470 | 41.0 |
| | | 7 | 4.796* | 3.120 | | |
| | L5 | 8 | −12.815 | 0.600 | 1.69680 | 55.5 |
| | | 9 | 37.957 | 0.200 | | |
| | L6 | 10 | 16.049 | 1.430 | 1.92286 | 20.9 |
| | | 11 | −59.796 | Variable | | |
| Diaphragm | | 12 | ∞ | 0.300 | | |
| G3 | L7 | 13 | 4.472 | 1.889 | 1.48749 | 70.4 |
| | | 14 | 573.182 | 1.375 | | |
| | L8 | 15 | 9.937* | 1.535 | 1.80359 | 40.8 |
| | L9 | 16 | −35.719 | 0.600 | 1.84666 | 23.8 |
| | | 17 | 5.995 | Variable | | |
| G4 | L10 | 18 | 10.604 | 1.400 | 1.48749 | 70.4 |
| | | 19 | 52.097 | Variable | | |
| G5 | L11 | 20 | 19.586* | 0.900 | 1.51443 | 63.3 |
| | | 21 | 97.200 | 0.600 | | |
| P | | 22 | ∞ | 0.780 | 1.51680 | 64.2 |
| | | 23 | ∞ | | | |

TABLE III-2

| Axial distance | Wide-angle limit | Middle position | Telephoto limit |
|---|---|---|---|
| d5 | 0.600 | 9.823 | 20.367 |
| d11 | 15.149 | 5.664 | 1.270 |
| d17 | 4.378 | 8.086 | 12.653 |
| d19 | 2.958 | 5.950 | 2.249 |
| f | 4.77 | 14.72 | 45.02 |
| F | 3.41 | 4.71 | 5.05 |
| ω | 38.46 | 13.51 | 4.49 |

TABLE III-3

| Surface | κ | D | E | F | G |
|---|---|---|---|---|---|
| 6 | 0.00E+00 | 1.35E−04 | −3.04E−06 | −5.65E−08 | 1.43E−09 |
| 7 | 0.00E+00 | −2.01E−04 | −1.56E−05 | 1.48E−06 | −1.52E−07 |
| 15 | 0.00E+00 | −1.72E−03 | −5.53E−05 | −1.68E−05 | 1.03E−06 |
| 20 | 0.00E+00 | −3.57E−04 | 4.63E−05 | −2.81E−06 | 9.04E−08 |

Example III-2

The zoom lens system of Example III-2 corresponds to Embodiment III-2 shown in FIG. 33. Table III-4 shows the lens data of the zoom lens system of Example III-2. Table III-5 shows the focal length, the F-number, the half view angle and the variable axial distance data, in the case that the shooting distance is infinity. Table III-6 shows the aspherical data.

TABLE III-4

| Lens unit | Lens element | Surface | r | d | nd | vd |
|---|---|---|---|---|---|---|
| G1 | L1 | 1 | 45.924 | 0.900 | 1.84666 | 23.8 |
|  | L2 | 2 | 27.049 | 3.300 | 1.49700 | 81.6 |
|  |  | 3 | −164.464 | 0.150 |  |  |
|  | L3 | 4 | 21.389 | 2.341 | 1.72916 | 54.7 |
|  |  | 5 | 49.394 | Variable |  |  |
| G2 | L4 | 6 | 163.907* | 1.000 | 1.80470 | 41.0 |
|  |  | 7 | 4.838* | 3.230 |  |  |
|  | L5 | 8 | −10.207 | 0.600 | 1.69680 | 55.5 |
|  |  | 9 | 138.636 | 0.282 |  |  |
|  | L6 | 10 | 21.331 | 1.430 | 1.92286 | 20.9 |
|  |  | 11 | −34.110 | Variable |  |  |
| Diaphragm |  | 12 | ∞ | 0.300 |  |  |
| G3 | L7 | 13 | 4.948 | 2.027 | 1.48749 | 70.4 |
|  |  | 14 | 324.565 | 1.638 |  |  |
|  | L8 | 15 | 13.243* | 1.343 | 1.80359 | 40.8 |
|  | L9 | 16 | −97.629 | 0.600 | 1.84666 | 23.8 |
|  |  | 17 | 7.718 | Variable |  |  |
| G4 | L10 | 18 | 15.068 | 1.900 | 1.48749 | 70.4 |
|  | L11 | 19 | −16.695 | 0.670 | 1.84666 | 23.8 |
|  |  | 20 | −25.409 | Variable |  |  |
| G5 | L12 | 21 | −532.456 | 0.940 | 1.51443 | 63.3 |
|  |  | 22 | −24.259* | 1.188 |  |  |
| P |  | 23 | ∞ | 0.900 | 1.51680 | 64.2 |
|  |  | 24 | ∞ |  |  |  |

TABLE III-5

| Axial distance | Wide-angle limit | Middle position | Telephoto limit |
|---|---|---|---|
| d5 | 0.600 | 7.693 | 20.326 |
| d11 | 16.003 | 4.983 | 1.150 |
| d17 | 3.177 | 9.271 | 12.094 |
| d20 | 4.313 | 9.471 | 6.349 |
| f | 4.78 | 14.73 | 45.22 |
| F | 3.37 | 4.92 | 4.94 |
| ω | 38.41 | 13.51 | 4.47 |

TABLE III-6

| Surface | κ | D | E | F | G |
|---|---|---|---|---|---|
| 6 | 0.00E+00 | 2.94E−05 | −5.88E−07 | −7.06E−09 | 3.19E−10 |
| 7 | 0.00E+00 | −3.61E−04 | −2.16E−05 | 1.21E−06 | −9.26E−08 |
| 15 | 0.00E+00 | −1.31E−03 | −3.00E−05 | −9.17E−06 | 6.26E−07 |
| 22 | 0.00E+00 | 9.57E−04 | −1.04E−04 | 6.34E−06 | −1.55E−07 |

TABLE III-7

| Lens unit | Lens element | Surface | r | d | nd | vd |
|---|---|---|---|---|---|---|
| G1 | L1 | 1 | 49.112 | 0.900 | 1.84666 | 23.8 |
|  | L2 | 2 | 29.475 | 3.614 | 1.49700 | 81.6 |
|  |  | 3 | −133.344 | 0.150 |  |  |
|  | L3 | 4 | 23.102 | 2.430 | 1.72916 | 54.7 |
|  |  | 5 | 47.607 | Variable |  |  |
| G2 | L4 | 6 | 87.187 | 1.000 | 1.80470 | 41.0 |
|  |  | 7 | 4.589* | 3.274 |  |  |
|  | L5 | 8 | −12.275 | 0.700 | 1.48749 | 70.4 |
|  |  | 9 | 24.918 | 1.676 |  |  |
|  | L6 | 10 | −43.867* | Variable | 1.99820 | 20.6 |
| Diaphragm |  | 11 | ∞ | 0.700 |  |  |
| G3 | L7 | 12 | 5.348 | 2.132 | 1.49700 | 81.6 |
|  |  | 13 | 2000.000 | 1.717 |  |  |
|  | L8 | 14 | 13.426* | 1.200 | 1.80359 | 40.8 |
|  | L9 | 15 | −2000.000 | 0.600 | 1.84666 | 23.8 |
|  |  | 16 | 8.914 | Variable |  |  |
| G4 | L10 | 17 | 15.170 | 2.400 | 1.48749 | 70.4 |
|  | L11 | 18 | −17.216 | 0.670 | 1.84666 | 23.8 |
|  |  | 19 | −28.127 | Variable |  |  |
| G5 | L12 | 20 | 50.051 * | 1.500 | 1.51680 | 64.2 |
|  |  | 21 | −56.014* | 1.324 |  |  |
| P |  | 22 | ∞ | 0.900 | 1.51680 | 64.2 |
|  |  | 23 | ∞ |  |  |  |

TABLE III-8

| Axial distance | Wide-angle limit | Middle position | Telephoto limit |
|---|---|---|---|
| d5 | 0.700 | 15.584 | 22.899 |
| d10 | 14.748 | 2.626 | 0.800 |
| d16 | 3.709 | 8.516 | 12.142 |
| d19 | 3.375 | 9.593 | 5.520 |
| f | 4.78 | 22.99 | 45.95 |
| F | 3.38 | 4.85 | 4.86 |
| ω | 38.39 | 8.73 | 4.39 |

Example III-3

The zoom lens system of Example III-3 corresponds to Embodiment III-3 shown in FIG. 36. Table III-7 shows the lens data of the zoom lens system of Example III-3. Table III-8 shows the focal length, the F-number, the half view angle and the variable axial distance data, in the case that the shooting distance is infinity. Table III-9 shows the aspherical data.

TABLE III-9

| Surface | κ | D | E | F | G |
|---|---|---|---|---|---|
| 7 | 0.00E+00 | −3.17E−04 | 4.29E−07 | −7.98E−09 | −3.44E−08 |
| 10 | 0.00E+00 | −1.83E−04 | −4.49E−06 | 1.14E−07 | −1.15E−08 |
| 14 | 0.00E+00 | −1.13E−03 | 1.66E−06 | −1.00E−05 | 6.05E−07 |

TABLE III-9-continued

| Surface | κ | D | E | F | G |
|---|---|---|---|---|---|
| 20 | 0.00E+00 | −1.01E−04 | −2.97E−05 | −1.49E−06 | 7.65E−08 |
| 21 | 0.00E+00 | 7.77E−04 | −1.31E−04 | 3.06E−06 | 0.00E+00 |

Example III-4

The zoom lens system of Example III-4 corresponds to Embodiment III-4 shown in FIG. 39. Table III-10 shows the lens data of the zoom lens system of Example III-4. Table III-11 shows the focal length, the F-number, the half view angle and the variable axial distance data, in the case that the shooting distance is infinity. Table III-12 shows the aspherical data.

TABLE III-10

| Lens unit | Lens element | Surface | r | d | nd | vd |
|---|---|---|---|---|---|---|
| G1 | L1 | 1 | 44.413 | 0.850 | 1.84666 | 23.8 |
|  | L2 | 2 | 26.433 | 3.141 | 1.49700 | 81.6 |
|  |  | 3 | −128.561 | 0.150 |  |  |
|  | L3 | 4 | 20.186 | 2.170 | 1.72916 | 54.7 |
|  |  | 5 | 42.317 | Variable |  |  |
| G2 | L4 | 6 | 114.594 | 1.000 | 1.80470 | 41.0 |
|  |  | 7 | 4.187* | 2.971 |  |  |
|  | L5 | 8 | −11.251 | 0.720 | 1.48749 | 70.4 |
|  | L6 | 9 | 20.348 | 1.587 | 1.99820 | 20.6 |
|  |  | 10 | −45.169* | Variable |  |  |
| Diaphragm |  | 11 | ∞ | 0.900 |  |  |
| G3 | L7 | 12 | 4.607 | 2.012 | 1.49700 | 81.6 |
|  |  | 13 | −80.000 | 0.999 |  |  |
|  | L8 | 14 | 9.540* | 1.387 | 1.80359 | 40.8 |
|  | L9 | 15 | 24.907 | 0.580 | 1.84666 | 23.8 |
|  |  | 16 | 5.477 | Variable |  |  |
| G4 | L10 | 17 | 11.648 | 2.200 | 1.48749 | 70.4 |
|  | L11 | 18 | −21.540 | 0.600 | 1.84666 | 23.8 |
|  |  | 19 | −40.812 | Variable |  |  |
| G5 | L12 | 20 | 18.749* | 1.196 | 1.51680 | 64.2 |
|  |  | 21 | −67.041* | 0.661 |  |  |
|  | P | 22 | ∞ | 0.900 | 1.51680 | 64.2 |
|  |  | 23 | ∞ |  |  |  |

TABLE III-11

| Axial distance | Wide-angle limit | Middle position | Telephoto limit |
|---|---|---|---|
| d5 | 0.700 | 13.781 | 20.206 |
| d10 | 12.820 | 2.577 | 0.900 |
| d16 | 2.666 | 7.789 | 11.297 |
| d19 | 3.420 | 8.581 | 4.703 |
| f | 4.25 | 20.44 | 40.84 |
| F | 3.50 | 5.20 | 5.21 |
| ω | 38.39 | 8.73 | 4.39 |

TABLE III-12

| Surface | κ | D | E | F | G |
|---|---|---|---|---|---|
| 7 | 0.00E+00 | −4.52E−04 | 1.47E−05 | −1.05E−06 | −8.69E−08 |
| 10 | 0.00E+00 | −2.24E−04 | −1.12E−05 | 8.16E−07 | −4.57E−08 |
| 14 | 0.00E+00 | −1.59E−03 | −6.27E−05 | −3.92E−06 | −5.29E−07 |
| 20 | 0.00E+00 | 4.11E−04 | 1.52E−05 | 3.87E−06 | 0.00E+00 |
| 21 | 0.00E+00 | 1.30E−03 | −5.15E−05 | 8.53E−06 | 0.00E+00 |

Example III-5

The zoom lens system of Example III-5 corresponds to Embodiment III-5 shown in FIG. 42. Table III-13 shows the lens data of the zoom lens system of Example III-5. Table III-14 shows the focal length, the F-number, the half view angle and the variable axial distance data, in the case that the shooting distance is infinity. Table III-15 shows the aspherical data.

TABLE III-13

| Lens unit | Lens element | Surface | r | d | nd | vd |
|---|---|---|---|---|---|---|
| G1 | L1 | 1 | 44.247 | 0.900 | 1.84666 | 23.8 |
|  | L2 | 2 | 26.516 | 3.570 | 1.49700 | 81.6 |
|  |  | 3 | −190.502 | 0.150 |  |  |
|  | L3 | 4 | 21.013 | 2.620 | 1.72916 | 54.7 |
|  |  | 5 | 47.607 | Variable |  |  |
| G2 | L4 | 6 | ∞* | 1.000 | 1.80470 | 41.0 |
|  |  | 7 | 4.853* | 3.478 |  |  |
|  | L5 | 8 | −9.469 | 0.700 | 1.64000 | 60.2 |
|  |  | 9 | 134.781 | 0.282 |  |  |
|  | L6 | 10 | 23.257 | 1.640 | 1.92286 | 20.9 |
|  |  | 11 | −33.553 | Variable |  |  |
| Diaphragm |  | 12 | ∞ | 0.300 |  |  |
| G3 | L7 | 13 | 5.238 | 2.123 | 1.49700 | 81.6 |
|  |  | 14 | 2000.000 | 1.683 |  |  |
|  | L8 | 15 | 12.868* | 1.500 | 1.80359 | 40.8 |
|  | L9 | 16 | −500.000 | 0.600 | 1.84666 | 23.8 |
|  |  | 17 | 7.963 | Variable |  |  |
| G4 | L10 | 18 | 14.670 | 2.400 | 1.48749 | 70.4 |
|  | L11 | 19 | −15.860 | 0.670 | 1.84666 | 23.8 |
|  |  | 20 | −26.034 | Variable |  |  |
| G5 | L12 | 21 | −65.328 | 1.064 | 1.51680 | 64.2 |
|  |  | 22 | −15.959* | 1.188 |  |  |
|  | P | 23 | ∞ | 0.900 | 1.51680 | 64.2 |
|  |  | 24 | ∞ |  |  |  |

TABLE III-14

| Axial distance | Wide-angle limit | Middle position | Telephoto limit |
|---|---|---|---|
| d5 | 0.766 | 13.812 | 20.160 |
| d11 | 15.030 | 2.654 | 0.800 |
| d17 | 3.631 | 8.446 | 12.882 |
| d20 | 3.634 | 9.934 | 5.520 |
| f | 4.78 | 23.00 | 45.97 |
| F | 3.38 | 4.92 | 5.00 |
| ω | 38.37 | 8.72 | 4.39 |

TABLE III-15

| Surface | κ | D | E | F | G |
|---|---|---|---|---|---|
| 6 | 0.00E+00 | 5.48E−05 | 0.00E+00 | 0.00E+00 | 0.00E+00 |
| 7 | 0.00E+00 | −4.22E−04 | −1.54E−05 | 1.08E−06 | −7.30E−08 |
| 15 | 0.00E+00 | −1.18E−03 | −1.78E−05 | −6.66E−06 | 3.10E−07 |
| 22 | 0.00E+00 | 1.29E−03 | −1.26E−04 | 6.93E−06 | −1.52E−07 |

Example III-6

The zoom lens system of Example III-6 corresponds to Embodiment III-6 shown in FIG. 45. Table III-16 shows the lens data of the zoom lens system of Example III-6. Table III-17 shows the focal length, the F-number, the half view angle and the variable axial distance data, in the case that the shooting distance is infinity. Table III-18 shows the aspherical data.

TABLE III-16

| Lens unit | Lens element | Surface | r | d | nd | vd |
|---|---|---|---|---|---|---|
| G1 | L1 | 1 | 42.576 | 0.100 | 1.84666 | 23.8 |
|  | L2 | 2 | 26.452 | 3.300 | 1.49700 | 81.6 |
|  |  | 3 | −193.065 | 0.150 |  |  |
|  | L3 | 4 | 21.294 | 2.300 | 1.72916 | 54.7 |
|  |  | 5 | 48.237 | Variable |  |  |
| G2 | L4 | 6 | 45.716* | 1.000 | 1.80470 | 41.0 |
|  |  | 7 | 4.915* | 2.644 |  |  |
|  | L5 | 8 | −23.996 | 0.600 | 1.69680 | 55.5 |
|  |  | 9 | 9.775 | 0.573 |  |  |
|  | L6 | 10 | 9.775 | 1.430 | 1.92286 | 20.9 |
|  |  | 11 | 68.277 | Variable |  |  |
|  | Diaphragm | 12 | ∞ | 0.300 |  |  |
| G3 | L7 | 13 | 4.404 | 1.400 | 1.48749 | 70.4 |
|  |  | 14 | 138.917 | 1.713 |  |  |
|  | L8 | 15 | 11.807* | 0.900 | 1.80359 | 40.8 |

TABLE III-16-continued

| Lens unit | Lens element | Surface | r | d | nd | vd |
|---|---|---|---|---|---|---|
|  | L9 | 16 | −31.529 | 0.100 | 1.84666 | 23.8 |
|  |  | 17 | 7.429 | Variable |  |  |
| G4 | L10 | 18 | 12.290* | 1.500 | 1.51443 | 63.3 |
|  |  | 19 | −47.484 | Variable |  |  |
| P |  | 20 | ∞ | 0.780 | 1.51680 | 64.2 |
|  |  | 21 | ∞ |  |  |  |

TABLE III-17

| Axial distance | Wide-angle limit | Middle position | Telephoto limit |
|---|---|---|---|
| d5 | 0.600 | 11.774 | 20.546 |
| d11 | 15.215 | 5.513 | 1.300 |
| d17 | 5.951 | 6.171 | 12.314 |
| d19 | 5.012 | 9.008 | 6.397 |
| f | 4.78 | 14.72 | 45.11 |
| F | 3.47 | 4.08 | 4.61 |
| ω | 38.45 | 13.50 | 4.54 |

TABLE III-18

| Surface | κ | D | E | F | G |
|---|---|---|---|---|---|
| 6 | 0.00E+00 | −1.84E−05 | −9.62E−07 | −1.42E−08 | 4.93E−10 |
| 7 | 0.00E+00 | −2.08E−04 | −1.71E−05 | 9.62E−07 | −8.74E−08 |
| 15 | 0.00E+00 | −1.80E−03 | −6.09E−05 | −1.07E−05 | −2.95E−08 |
| 18 | 0.00E+00 | −1.04E−04 | 1.19E−05 | −7.10E−07 | 1.68E−08 |

The following Table III-19 shows values corresponding to the above-mentioned conditions (III-1) to (III-7) and (III-9). Here, in Table III-19, $Y_W$ is an amount of movement in a direction perpendicular to the optical axis at the time of maximum blur compensation in the third lens unit with a focal length $f_W$ of the entire system at a wide-angle limit, and in a state that the zoom lens system is at a wide-angle limit, a corresponding value $(Y_W/Y_T)/(f_W/f_T)$ at the time of $Y=Y_W$ ($f=f_W$) in the condition formula (III-9) is obtained.

TABLE III-19

| | | Example | | | | | |
|---|---|---|---|---|---|---|---|
| | Condition | III-1 | III-2 | III-3 | III-4 | III-5 | III-6 |
| (III-1) | $f_W \cdot f_3/(f_W \times \tan\omega_W)^2$ | 3.600 | 4.219 | 4.133 | 4.091 | 4.128 | 3.963 |
| (III-2) | $f_3/f_T$ | 0.241 | 0.280 | 0.270 | 0.267 | 0.269 | 0.264 |
| (III-3) | $f_{3a}/f_3$ | 0.852 | 0.811 | 0.869 | 0.809 | 0.853 | 0.780 |
| (III-4) | $R_{3a}/f_3$ | 0.413 | 0.390 | 0.431 | 0.422 | 0.423 | 0.369 |
| (III-5) | $f_{3a}/f_{3b}$ | −0.444 | −0.435 | −0.317 | −0.481 | −0.382 | −0.399 |
| (III-6-1) | $(D_{3T}/D_{3W})/(D_{4T}/D_{4W})$ | — | — | — | — | — | 1.621 |
| (III-6-2) | $(D_{3T}/D_{3W})/(D_{4T}/D_{4W})$ | 3.801 | 2.586 | 2.002 | 3.081 | 2.336 | — |
| (III-7) | $(D_{1T} - D_{1W})/D_1$ | 3.018 | 2.948 | 3.129 | 3.091 | 2.679 | 3.410 |
| (III-9) | $(Y_W/Y_T)/(f_W/f_T)$ | 1.445 | 1.412 | 1.390 | 1.472 | 1.473 | 1.315 |
| | $Y_W$ | 0.021 | 0.023 | 0.022 | 0.021 | 0.023 | 0.022 |
| | $Y_T$ | 0.137 | 0.154 | 0.152 | 0.137 | 0.150 | 0.158 |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for cameras such as a digital still camera and a digital video camera requiring high image quality.

Details of the present invention have been described above. However, the above-mentioned description is completely illustrative from every point of view, and does not limit the scope of the present invention. Obviously, various improvements and modifications can be performed without departing from the scope of the present invention.

What is claimed is:

1. A zoom lens system comprising a plurality of lens units each consisting of at least one lens element, wherein the zoom lens system, in order from the object side to the image side, comprises:

a first lens unit having positive optical power; a second lens unit having negative optical power; a third lens unit having positive optical power; a fourth lens unit; and a fifth lens unit, wherein:

in zooming from a wide-angle limit to a telephoto limit at the time of image taking, at least the first lens unit and the second lens unit move in an optical axis direction, the fourth lens unit and the fifth lens unit each consists of one lens element, and the following condition (I-2) is satisfied:

$$1.0 < (D_{3T}/D_{3W})/(D_{4T}/D_{4W}) < 9.0 \qquad (I-2)$$

(here, $Z = f_T/f_W > 9.0$)

where, $D_{3W}$ is an optical axial distance between the third lens unit and the fourth lens unit at a wide-angle limit, $D_{3T}$ is an optical axial distance between the third lens unit and the fourth lens unit at a telephoto limit, $D_{4W}$ is an optical axial distance between the fourth lens unit and the fifth lens unit at a wide-angle limit, $D_{4T}$ is an optical axial distance between the fourth lens unit and the fifth lens unit at a telephoto limit, $f_W$ is a focal length of the entire system at a wide-angle limit, and $f_T$ is a focal length of the entire system at a telephoto limit.

2. The zoom lens system as claimed in claim 1, wherein in zooming from a wide-angle limit to a telephoto limit at the time of image taking, the third lens unit moves in an optical axis direction.

3. The zoom lens system as claimed in claim 1, wherein in zooming from a wide-angle limit to a telephoto limit at the time of image taking, the fourth lens unit moves in an optical axis direction.

4. The zoom lens system as claimed in claim 1, satisfying the following condition (I-1):

$$0.1 < (R_{4R} + R_{4F})/(R_{4R} - R_{4F}) < 3.0 \qquad (I-1)$$

where, $R_{4F}$ is a radius of curvature of an object side lens surface of the lens element constituting the fourth lens unit, and $R_{4R}$ is a radius of curvature of an image side lens surface of the lens element constituting the fourth lens unit.

5. The zoom lens system as claimed in claim 1, satisfying the following condition (I-3):

$$3.0 < f_4/f_W < 6.0 \qquad (I-3)$$

(here, $Z = f_T/f_W > 9.0$)

where, $f_4$ is a focal length of the lens element constituting the fourth lens unit.

6. The zoom lens system as claimed in claim 1, wherein the fourth lens unit has positive optical power.

7. The zoom lens system as claimed in claim 1, wherein in zooming from a wide-angle limit to a telephoto limit at the time of image taking, the fifth lens unit does not move in an optical axis direction.

8. The zoom lens system as claimed in claim 1, wherein the fifth lens unit has positive optical power.

9. The zoom lens system as claimed in claim 1, wherein the third lens unit moves in a direction perpendicular to the optical axis.

10. The zoom lens system as claimed in claim 9, wherein the entire system satisfies the following conditions (I-4) and (I-5):

$$Y_T > Y \qquad (I-4)$$

$$1.0 < (Y/Y_T)/(f/f_T) < 2.0 \qquad (I-5)$$

(here, $Z = f_T/f_W > 9.0$)

where,

Y is an amount of movement in a direction perpendicular to the optical axis at the time of maximum blur compensation in the third lens unit with a focal length f of the entire system, $Y_T$ is an amount of movement in a direction perpendicular to the optical axis at the time of maximum blur compensation in the third lens unit with a focal length $f_T$ of the entire system at a telephoto limit, and f is a focal length of the entire system.

11. An imaging device capable of outputting an optical image of an object as an electric image signal, comprising:
a zoom lens system that forms the optical image of the object, and
an image sensor that converts the optical image formed by the zoom lens system into the electric image signal, wherein
in the zoom lens system, a plurality of lens units each consisting of at least one lens element are provided, wherein the zoom lens system, in order from the object side to the image side, comprises: a first lens unit having positive optical power; a second lens unit having negative optical power; a third lens unit having positive optical power; a fourth lens unit; and a fifth lens unit, wherein:
in zooming from a wide-angle limit to a telephoto limit at the time of image taking, at least the first lens unit and the second lens unit move in an optical axis direction,
the fourth lens unit and the fifth lens unit each consists of one lens element, and
the following condition (I-2) is satisfied:

$$1.0 < (D_{3T}/D_{3W})/(D_{4T}/D_{4W}) < 9.0 \quad (I\text{-}2)$$

(here, $Z = f_T/f_W > 9.0$)
where,
$D_{3W}$ is an optical axial distance between the third lens unit and the fourth lens unit at a wide-angle limit,
$D_{3T}$ is an optical axial distance between the third lens unit and the fourth lens unit at a telephoto limit,
$D_{4W}$ is an optical axial distance between the fourth lens unit and the fifth lens unit at a wide-angle limit,
$D_{4T}$ is an optical axial distance between the fourth lens unit and the fifth lens unit at a telephoto limit,
$f_W$ is a focal length of the entire system at a wide-angle limit, and
$f_T$ is a focal length of the entire system at a telephoto limit.

12. A camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein
in the zoom lens system, a plurality of lens units each consisting of at least one lens element are provided, wherein the zoom lens system, in order from the object side to the image side, comprises: a first lens unit having positive optical power; a second lens unit having negative optical power; a third lens unit having positive optical power; a fourth lens unit, and a fifth lens unit, wherein:
in zooming from a wide-angle limit to a telephoto limit at the time of image taking, at least the first lens unit and the second lens unit move in an optical axis direction,
the fourth lens unit and the fifth lens unit each consists of one lens element, and
the following condition (I-2) is satisfied:

$$1.0 < (D_{3T}/D_{3W})/(D_{4T}/D_{4W}) < 9.0 \quad (I\text{-}2)$$

(here, $Z = f_T/f_W > 9.0$)
where,
$D_{3W}$ is an optical axial distance between the third lens unit and the fourth lens unit at a wide-angle limit,
$D_{3T}$ is an optical axial distance between the third lens unit and the fourth lens unit at a telephoto limit,
$D_{4W}$ is an optical axial distance between the fourth lens unit and the fifth lens unit at a wide-angle limit,
$D_{4T}$ is an optical axial distance between the fourth lens unit and the fifth lens unit at a telephoto limit,
$f_W$ is a focal length of the entire system at a wide-angle limit, and
$f_T$ is a focal length of the entire system at a telephoto limit.

13. A zoom lens system comprising a plurality of lens units each consisting of at least one lens element, wherein the zoom lens system, in order from the object side to the image side, comprises at least:
a first lens unit having positive optical power; a second lens unit having negative optical power; a third lens unit having positive optical power; and a fourth lens unit having positive optical power, wherein:
in zooming from a wide-angle limit to a telephoto limit at the time of image taking, the first lens unit, the second lens unit, the third lens unit and the fourth lens unit move in an optical axis direction, and
the following condition (II-1) is satisfied:

$$3.0 < D_{a11}/(f_W \times \tan \omega_W) < 8.0 \quad (II\text{-}1)$$

(here, $9.0 < f_T/f_W < 13.0$ and $35 < \omega_W$)
where,
$D_{a11}$ is an optical axial total thickness of the lens units consisting of the first lens unit, the second lens unit, the third lens unit and the fourth lens unit,
$f_W$ is a focal length of the entire system at a wide-angle limit,
$f_T$ is a focal length of the entire system at a telephoto limit, and
$\omega_W$ is an incident half view angle at a wide-angle limit.

14. The zoom lens system as claimed in claim 13, wherein the first lens unit consists of three lens elements.

15. The zoom lens system as claimed in claim 14, satisfying the following condition (II-2):

$$1.5 < (D_{1T} - D_{1W})/D_1 < 4.0 \quad (II\text{-}2)$$

(here, $9.0 < f_T/f_W < 13.0$ and $35 < \omega_W$)
where,
$D_{1W}$ is an optical axial distance between the first lens unit and the second lens unit at a wide-angle limit,
$D_{1T}$ is an optical axial distance between the first lens unit and the second lens unit at a telephoto limit, and
$D_1$ is an optical axial distance from the most object side surface to the most image side surface of the first lens unit.

16. The zoom lens system as claimed in claim 13, wherein the second lens unit, in order from the object side to the image side, comprises at least: a most object side lens element 2a having negative optical power; a lens element 2b having negative optical power; and a lens element 2c having positive optical power, and wherein the two surfaces of the most object side lens element 2a are aspheric.

17. The zoom lens system as claimed in claim 13, wherein the image side surface of the most image side lens element of the third lens unit and the object side surface of the most object side lens element of the fourth lens unit are both convex to the object side, and wherein the following condition (II-3) is satisfied:

$$0.2 < D_{3W}/D_{3T} < 0.6 \quad (II\text{-}3)$$

(here, $9.0 < f_T/f_W < 13.0$ and $35 < \omega_W$)
where,
$D_{3W}$ is an optical axial distance from a position on the most image side on the optical axis of the third lens unit to a position on the most object side on the optical axis of the fourth lens unit at a wide-angle limit, and $D_{3T}$ is an optical axial distance from a position on the most image side on the optical axis of the third lens unit to a position on the most object side on the optical axis of the fourth lens unit at a telephoto limit.

18. The zoom lens system as claimed in claim 13, wherein the third lens unit moves in a direction perpendicular to the optical axis.

19. The zoom lens system as claimed in claim 18, wherein the entire system satisfies the following conditions (II-4) and (II-5):

$$Y_T > Y \qquad (\text{II-4})$$

$$1.0 < (Y/Y_T)/(f/f_T) < 2.0 \qquad (\text{II-5})$$

(here, $9.0 < f_T/f_W < 13.0$ and $35 < \omega_W$)
where,
Y is an amount of movement in a direction perpendicular to the optical axis at the time of maximum blur compensation in the third lens unit with a focal length f of the entire system,
$Y_T$ is an amount of movement in a direction perpendicular to the optical axis at the time of maximum blur compensation in the third lens unit with a focal length $f_T$ of the entire system at a telephoto limit, and
f is a focal length of the entire system.

20. The zoom lens system as claimed in claim 13 only a fifth lens unit having positive optical power is provided adjacent to the image side of the fourth lens unit.

21. The zoom lens system as claimed in claim 20, wherein in zooming from a wide-angle limit to a telephoto limit at the time of image taking, the fifth lens unit does not move in an optical axis direction.

22. The zoom lens system as claimed in claim 13, consisting of 12 or fewer lens elements, wherein the first lens unit, the second lens unit and the third lens unit each consists of three or fewer lens elements.

23. An imaging device capable of outputting an optical image of an object as an electric image signal, comprising:
a zoom lens system that forms the optical image of the object, and
an image sensor that converts the optical image formed by the zoom lens system into the electric image signal, wherein
in the zoom lens system, a plurality of lens units each consisting of at least one lens element are provided, wherein the zoom lens system, in order from the object side to the image side, comprises at least: a first lens unit having positive optical power; a second lens unit having negative optical power; a third lens unit having positive optical power; and a fourth lens unit having positive optical power, wherein:
in zooming from a wide-angle limit to a telephoto limit at the time of image taking, the first lens unit, the second lens unit, the third lens unit and the fourth lens unit move in an optical axis direction, and
the following condition (II-1) is satisfied:

$$3.0 < D_{a11}/(f_W \times \tan \omega_W) < 8.0 \qquad (\text{II-1})$$

(here, $9.0 < f_T/f_W < 13.0$ and $35 < \omega_W$)
where,
$D_{a11}$ is an optical axial total thickness of the lens units consisting of the first lens unit, the second lens unit, the third lens unit and the fourth lens unit,
$f_W$ is a focal length of the entire system at a wide-angle limit,
$f_T$ is a focal length of the entire system at a telephoto limit, and
$\omega_W$ is an incident half view angle at a wide-angle limit.

24. A camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein
in the zoom lens system, a plurality of lens units each consisting of at least one lens element are provided, wherein the zoom lens system, in order from the object side to the image side, comprises at least: a first lens unit having positive optical power; a second lens unit having negative optical power; a third lens unit having positive optical power; and a fourth lens unit having positive optical power, wherein:
in zooming from a wide-angle limit to a telephoto limit at the time of image taking, the first lens unit, the second lens unit, the third lens unit and the fourth lens unit move in an optical axis direction, and
the following condition (II-1) is satisfied:

$$3.0 < D_{a11}/(f_W \times \tan \omega_W) < 8.0 \qquad (\text{II-1})$$

(here, $9.0 < f_T/f_W < 13.0$ and $35 < \omega_W$)
where,
$D_{a11}$ is an optical axial total thickness of the lens units consisting of the first lens unit, the second lens unit, the third lens unit and the fourth lens unit,
$f_W$ is a focal length of the entire system at a wide-angle limit,
$f_T$ is a focal length of the entire system at a telephoto limit, and
$\omega_W$ is an incident half view angle at a wide-angle limit.

25. A zoom lens system comprising a plurality of lens units each consisting of at least one lens element, wherein the zoom lens system, in order from the object side to the image side, comprises:
a first lens unit having positive optical power; a second lens unit having negative optical power; a third lens unit having positive optical power; and a subsequent lens unit including at least one lens unit having positive optical power, wherein:
in zooming from a wide-angle limit to a telephoto limit at the time of image taking, at least the first lens unit, the second lens unit and the third lens unit move in an optical axis direction, while the second lens unit moves such that a position at a wide-angle limit is located on the object side relative to a position at a telephoto limit, and
the following conditions (III-1) and (III-2) are satisfied:

$$1.0 < f_W \cdot f_3/(f_W \times \tan \omega_W)^2 < 5.0 \qquad (\text{III-1})$$

$$0.1 < f_3/f_T < 0.4 \qquad (\text{III-2})$$

(here, $Z = f_T/f_W > 9.0$)
where,
$f_3$ is a composite focal length of the third lens unit,
$f_W$ is a focal length of the entire system at a wide-angle limit,
$f_T$ is a focal length of the entire system at a telephoto limit, and
$\omega_W$ is an incident half view angle at a wide-angle limit.

26. The zoom lens system as claimed in claim 25, wherein the third lens unit consists of a plurality of lens elements, and wherein at least one of the intervals of these lens elements is an air space.

27. The zoom lens system as claimed in claim 25, wherein the third lens unit, in order from the object side to the image side, comprises: a most object side lens element 3a having positive optical power; and at least one subsequent lens element.

28. The zoom lens system as claimed in claim 27, satisfying the following condition (III-3):

$$0.5 < f_{3a}/f_3 < 1.0 \qquad \text{(III-3)}$$

where, $f_3a$ is a focal length of the most object side lens element 3a.

29. The zoom lens system as claimed in claim 27, satisfying the following condition (III-4):

$$0.3 < R_{3a}/f_3 < 0.5 \qquad \text{(III-4)}$$

where, $R_{3a}$ is a radius of curvature of the object side lens surface of the most object side lens element 3a.

30. The zoom lens system as claimed in claim 27, wherein the number of subsequent lens elements is at least two.

31. The zoom lens system as claimed in claim 30, satisfying the following condition (III-5):

$$-0.6 < f_{3a}/f_{3b} < -0.3 \qquad \text{(III-5)}$$

where, $f_{3a}$ is a focal length of the most object side lens element 3a, and $f_{3b}$ is a composite focal length of the subsequent lens elements.

32. The zoom lens system as claimed in claim 31, wherein the subsequent lens elements are two elements of, in order from the object side to the image side, a lens element having positive optical power and a lens element having negative optical power.

33. The zoom lens system as claimed in claim 32, wherein the lens element having positive optical power and the lens element having negative optical power are cemented with each other.

34. The zoom lens system as claimed in claim 25, wherein the third lens unit includes at least one lens element having an aspheric surface.

35. The zoom lens system as claimed in claim 25, wherein the subsequent lens unit comprises solely a fourth lens unit having positive optical power.

36. The zoom lens system as claimed in claim 35, satisfying the following condition (III-6-1):

$$1.0 < (D_{3T}/D_{3W})/(D_{4T}/D_{4W}) < 5.0 \qquad \text{(III-6-1)}$$

(here, $Z = f_T/f_W > 9.0$)

where, $D_{3W}$ is an optical axial distance between the third lens unit and the fourth lens unit at a wide-angle limit, $D_{3T}$ is an optical axial distance between the third lens unit and the fourth lens unit at a telephoto limit, $D_{4W}$ is an optical axial distance between the fourth lens unit and an optical element having no optical power located on the image side of the fourth lens unit at a wide-angle limit, and $D_{4T}$ is an optical axial distance between the fourth lens unit and an optical element having no optical power located on the image side of the fourth lens unit at a telephoto limit.

37. The zoom lens system as claimed in claim 25, wherein the subsequent lens unit comprises a fourth lens unit having positive optical power and a fifth lens unit having positive optical power.

38. The zoom lens system as claimed in claim 37, wherein in zooming from a wide-angle limit to a telephoto limit at the time of image taking, the fourth lens unit moves in an optical axis direction.

39. The zoom lens system as claimed in claim 37, satisfying the following condition (III-6-2):

$$1.0 < (D_{3T}/D_{3W})/(D_{4T}/D_{4W}) < 5.0 \qquad \text{(III-6-2)}$$

(here, $Z = f_T/f_W > 9.0$)

where, $D_{3W}$ is an optical axial distance between the third lens unit and the fourth lens unit at a wide-angle limit, $D_{3T}$ is an optical axial distance between the third lens unit and the fourth lens unit at a telephoto limit, $D_{4W}$ is an optical axial distance between the fourth lens unit and the fifth lens unit at a wide-angle limit, and $D_{4T}$ is an optical axial distance between the fourth lens unit and the fifth lens unit at a telephoto limit.

40. The zoom lens system as claimed in claim 37, wherein in zooming from a wide-angle limit to a telephoto limit at the time of image taking, the fifth lens unit does not move in an optical axis direction.

41. The zoom lens system as claimed in claim 25, wherein the first lens unit consists of three lens elements.

42. The zoom lens system as claimed in claim 41, satisfying the following condition (III-7):

$$2.0 < (D_{1T} - D_{1W})/D_1 < 3.5 \qquad \text{(III-7)}$$

(here, $Z = f_T/f_W > 9.0$)

where, $D_{1W}$ is an optical axial distance between the first lens unit and the second lens unit at a wide-angle limit, $D_{1T}$ is an optical axial distance between the first lens unit and the second lens unit at a telephoto limit, and $D_1$ is an optical axial distance from the most object side surface to the most image side surface of the first lens unit.

43. The zoom lens system as claimed in claim 25, wherein the third lens unit moves in a direction perpendicular to the optical axis.

44. The zoom lens system as claimed in claim 43, wherein the entire system satisfies the following conditions (III-8) and (III-9):

$$Y_T > Y \qquad \text{(III-8)}$$

$$1.0 < (Y/Y_T)/(f/f_T) < 2.0 \qquad \text{(III-9)}$$

(here, $Z = f_T/f_W > 9.0$)

where, $f_T$ is a focal length of the entire system at a telephoto limit,

Y is an amount of movement in a direction perpendicular to the optical axis at the time of maximum blur compensation in the third lens unit with a focal length f of the entire system, and $Y_T$ is an amount of movement in a direction perpendicular to the optical axis at the time of maximum blur compensation in the third lens unit with a focal length $f_T$ of the entire system at a telephoto limit.

45. An imaging device capable of outputting an optical image of an object as an electric image signal, comprising:

a zoom lens system that forms the optical image of the object, and an image sensor that converts the optical image formed by the zoom lens system into the electric image signal, wherein in the zoom lens system, a plurality of lens units each consisting of at least one lens element are provided, wherein the zoom lens system, in order from the object side to the image side, comprises: a first lens unit having positive optical power; a second lens unit having negative optical power; a third lens unit having positive optical power; and a subsequent lens unit including at least one lens unit having positive optical power, wherein:

in zooming from a wide-angle limit to a telephoto limit at the time of image taking, at least the first lens unit, the second lens unit and the third lens unit move in an optical axis direction, while the second lens unit moves such that a position at a wide-angle limit is located on the object side relative to a position at a telephoto limit, and the following conditions (III-1) and (III-2) are satisfied:

$$1.0 < f_W \cdot f_8 / (f_W \times \tan \omega_W)^2 < 5.0 \quad \text{(III-1)}$$

$$0.1 < f_8 / f_T < 0.4 \quad \text{(III-2)}$$

(here, $Z = f_T/f_W > 9.0$)
where,
$f_8$ is a composite focal length of the third lens unit,
$f_W$ is a focal length of the entire system at a wide-angle limit, and
$f_T$ is a focal length of the entire system at a telephoto limit, and
$\omega_W$ is an incident half view angle at a wide-angle limit.

46. A camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, a plurality of lens units each consisting of at least one lens element are provided, wherein the zoom lens system, in order from the object side to the image side, comprises: a first lens unit having positive optical power; a second lens unit having negative optical power; a third lens unit having positive optical power; and a subsequent lens unit including at least one lens unit having positive optical power, wherein:

in zooming from a wide-angle limit to a telephoto limit at the time of image taking, at least the first lens unit, the second lens unit and the third lens unit move in an optical axis direction, while the second lens unit moves such that a position at a wide-angle limit is located on the object side relative to a position at a telephoto limit, and the following conditions (III-1) and (III-2) are satisfied:

$$1.0 < f_W \cdot f_8 / (f_W \times \tan \omega_W)^2 < 5.0 \quad \text{(III-1)}$$

$$0.1 < f_8 / f_T < 0.4 \quad \text{(III-2)}$$

(here, $Z = f_T/f_W > 9.0$)
where,
$f_8$ is a composite focal length of the third lens unit,
$f_W$ is a focal length of the entire system at a wide-angle limit,
$f_T$ is a focal length of the entire system at a telephoto limit, and
$\omega_W$ is an incident half view angle at a wide-angle limit.

* * * * *